US012769091B2

(12) United States Patent
Li et al.

(10) Patent No.: US 12,769,091 B2
(45) Date of Patent: Oct. 20, 2026

(54) OPTICAL LENS DEVICE, CAMERA MODULE, AND ELECTRONIC DEVICE

(71) Applicant: Honor Device Co., Ltd., Shenzhen (CN)

(72) Inventors: Yang Li, Shenzhen (CN); Xinquan Wang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 237 days.

(21) Appl. No.: 18/683,674

(22) PCT Filed: Aug. 31, 2023

(86) PCT No.: PCT/CN2023/116326
§ 371 (c)(1),
(2) Date: Feb. 14, 2024

(87) PCT Pub. No.: WO2024/098911
PCT Pub. Date: May 16, 2024

(65) Prior Publication Data
US 2025/0138285 A1 May 1, 2025

(30) Foreign Application Priority Data
Nov. 10, 2022 (CN) ........................ 202211405002.X

(51) Int. Cl.
*G02B 13/00* (2006.01)
*G02B 27/64* (2006.01)

(52) U.S. Cl.
CPC ....... *G02B 13/0045* (2013.01); *G02B 13/006* (2013.01); *G02B 13/007* (2013.01); *G02B 27/646* (2013.01)

(58) Field of Classification Search
CPC ............. G02B 13/0045; G02B 13/007; G02B 13/006; G02B 27/646; G02B 9/12;
(Continued)

(56) References Cited

U.S. PATENT DOCUMENTS

| | | | |
|---|---|---|---|
| 8,964,302 | B2 | 2/2015 | Kawamura et al. |
| 2011/0096416 | A1 | 4/2011 | Obama |

(Continued)

FOREIGN PATENT DOCUMENTS

| | | | |
|---|---|---|---|
| CN | 103885161 | A | 6/2014 |
| CN | 106338812 | A | 1/2017 |

(Continued)

OTHER PUBLICATIONS

Warren J. Smith: “Modern Lens Design” In: “Modern Lens Design”, Jan. 1, 1992, McGraw-Hill, Inc, XP055152035, ISBN: 978-0-07-059178-3, pp. 25-27.

(Continued)

*Primary Examiner* — Jia X Pan
(74) *Attorney, Agent, or Firm* — Slater Matsil, LLP

(57) ABSTRACT

Embodiments of this application relate to the field of electronic device technologies, and provide an optical lens device, a camera module, and an electronic device. The optical lens device includes a first lens group, a second lens group, and a third lens group that are arranged from an object side to an image side. The first lens group has positive focal power, the second lens group has negative focal power, the third lens group has focal power, and an effective focal length fg1 of the first lens group and an effective focal length f of the optical lens device meet 0.65<fg1/f<5.6.

20 Claims, 34 Drawing Sheets

(58) Field of Classification Search
CPC ........ G02B 15/143105; G02B 27/0025; G02B 9/64; G02B 15/1431; G02B 15/143; G02B 13/0065
See application file for complete search history.

(56) References Cited

U.S. PATENT DOCUMENTS

| | | | | |
|---|---|---|---|---|
| 2013/0286276 | A1* | 10/2013 | Kawamura | G02B 15/1461 348/345 |
| 2014/0176782 | A1 | 6/2014 | Yokoyama | |
| 2017/0010441 | A1 | 1/2017 | Kondo et al. | |
| 2017/0184825 | A1* | 6/2017 | Yokoyama | G02B 27/0025 |
| 2022/0390710 | A1* | 12/2022 | Chuang | G02B 13/0065 |
| 2022/0390815 | A1* | 12/2022 | Hsu | G02B 13/0065 |
| 2023/0176346 | A1* | 6/2023 | Niu | G03B 30/00 359/689 |
| 2024/0134169 | A1 | 4/2024 | Lu et al. | |

FOREIGN PATENT DOCUMENTS

| | | | |
|---|---|---|---|
| CN | 109358410 | A | 2/2019 |
| CN | 110780422 | A | 2/2020 |
| CN | 111812806 | A | 10/2020 |
| CN | 112034595 | A | 12/2020 |
| CN | 114966919 | A | 8/2022 |
| CN | 115437128 | A | 12/2022 |
| JP | 4845492 | B2 | 12/2011 |
| JP | 5959294 | B2 | 8/2016 |
| JP | 2017116703 | A | 6/2017 |

OTHER PUBLICATIONS

"Handbook of optical systems, Aberration theory and correction of optical systems, Chapter 31: Correction of Aberrations ED—Gross H", Jan. 1, 2007, Handbook of Optical Systems, Aberration Theory and Correction of Optical Systems, Wileyvch, Weinheim, DE, pp. 215-221,225, XP002719371, ISBN: 978-3-527-40379-0.

* cited by examiner

OPTICAL LENS DEVICE, CAMERA MODULE, AND ELECTRONIC DEVICE

CROSS-REFERENCE TO RELATED APPLICATIONS

This application is a national stage of International Application No. PCT/CN2023/116326, filed on Aug. 31, 2023, which claims priority to Chinese Patent Application No. 202211405002.X, filed on Nov. 10, 2022. The disclosures of both of the aforementioned applications are hereby incorporated by reference in their entireties.

TECHNICAL FIELD

This application relates to the field of electronic device technologies, and in particular, to an optical lens device, a camera module, and an electronic device.

BACKGROUND

In recent years, with popularity of portable electronic devices such as a mobile phone, a computer, and a digital camera, users have increasingly high requirements for photographing performance of camera modules of the electronic devices. For example, a requirement for long-shot photographing is inevitably involved in common photographing applications. Because of a pursuit of a reduction in a device thickness, a longitudinal size of an optical lens device in the camera module of the electronic device is limited to a relatively large extent, and consequently, a focal length of the optical lens device is excessively small, and it is difficult to achieve a good photographing effect. Therefore, how to enable the electronic device to have a long-focus characteristic and high imaging quality while having a relatively small thickness has become an important topic in the industry.

SUMMARY

Embodiments of this application provide an optical lens device, a camera module, and an electronic device, to provide an optical lens device that can well take both a long-focus characteristic and high imaging quality into account.

To achieve the foregoing objectives, the following technical solutions are used in embodiments of this application:

According to a first aspect, an embodiment of this application provides an optical lens device, including: including a first lens group, a second lens group, and a third lens group that are arranged from an object side to an image side. The first lens group has positive focal power, the second lens group has negative focal power, the third lens group has focal power, and an effective focal length fg1 of the first lens group and an effective focal length f of the optical lens device meet $0.65<fg1/f<5.6$.

According to the foregoing technical solution, the effective focal length of the first lens group and the effective focal length of the optical lens device are properly controlled, so that the focal power of the first lens group and the negative focal power generated by the second lens group are balanced conveniently, thereby reducing aberration and improving imaging quality.

In some embodiments, the effective focal length fg1 of the first lens group and the effective focal length f of the optical lens device meet $fg1/f<1$.

According to the foregoing technical solution, the focal power of the first lens group, the second lens group, and the third lens group can be further balanced, so that spherical aberration can be well corrected, thereby further improving imaging quality.

In some embodiments, an effective focal length fg2 of the second lens group and the effective focal length f of the optical lens device meet $-3.5<fg2/f<0$.

According to the foregoing technical solution, the following problem can be effectively avoided to facilitate miniaturization design of the optical lens device: Because the effective focal length of the second lens group and the effective focal length of the optical lens device are excessively small, spherical aberration of the first lens group cannot be well balanced, and therefore a length of the optical lens device increases.

In some embodiments, a total track length TTL of the optical lens device and the effective focal length f of the optical lens device meet $TTL/f<2.1$.

According to the foregoing technical solution, the following problem can be avoided: Because a ratio of the total track length to the effective focal length of the optical lens device is excessively large, the total track length increases, and therefore miniaturization of the optical lens device is affected.

In some embodiments, an entrance pupil diameter EPD of the optical lens device and the effective focal length f of the optical lens device meet $f/EPD\leq 2.1$.

The effective focal length and the entrance pupil diameter are controlled to be within a specific range, so that large luminous flux of an optical system can be increased while the optical lens device has a long-focus characteristic, thereby improving imaging performance. In other words, a clear imaging effect can be achieved even if photographing is performed in a relatively dark environment.

In some embodiments, a spacing AT12 between the first lens group and the second lens group on an optical axis and a spacing AT23 between the second lens group and the third lens group on the optical axis meet $0.1<AT12/AT23<4.76$.

According to the foregoing technical solution, spacings between the first lens group, the second lens group, and the third lens group on the optical axis are properly controlled, so that sensitivity in affecting curvature of field by the intervals between the lens groups can be effectively reduced, and curvature of field of the optical lens device can be effectively corrected.

In some embodiments, the second lens group and the third lens group each include a plurality of lenses; and a sum ct2 of center thicknesses of lenses in the second lens group and a sum ct3 of center thicknesses of lenses in the third lens group meet $ct2/ct3\leq 1.3$.

When the foregoing relationship is met, degrees to which performance such as distortion and curvature of field of the optical lens device is affected when one or more lenses in the second lens group and the third lens group become thinner can be effectively reduced.

In some embodiments, the third lens group includes four lenses, and in the four lenses, in a direction from the object side to the image side, both the first lens and the fourth lens have focal power, the second lens has negative focal power, and the third lens has positive focal power; and a sum f' of effective focal lengths of the third lens and the fourth lens and an effective focal length fg2 of the second lens group meet $-1.2<fg2/f'<8.5$.

The focal power of the lens groups of the optical lens device is properly allocated, so that when the foregoing relationship is met, positive and negative spherical aberration of the first lens group, the second lens group, and the third lens group can be offset against each other, thereby improving imaging quality. In addition, a length of the optical lens device is reduced conveniently, so that miniaturization design of the optical lens device is implemented.

In some embodiments, a sum R2 of curvature radiuses of an object-side surface and an image-side surface of the second lens in the third lens group and a sum R3 of curvature radiuses of an object-side surface and an image-side surface of the third lens in the third lens group meet $-1.5<R2/R3<12.5$.

When the foregoing relationship is met, a deflection angle of edge light of the third lens group can be effectively controlled, in other words, light at a circumference that passes through the third lens group does not deflect toward an optical axis or an edge to an excessively large extent, so that the light at the circumference that passes through the third lens group is relatively smooth, a beam diameter is effectively controlled, and a size of the fourth lens in the third lens group in a direction perpendicular to the optical axis is effectively controlled, thereby reducing a size of the optical lens device in the direction perpendicular to the optical axis. In addition, the lenses in the third lens group are not excessively thin, and therefore are easy to process.

In some embodiments, the second lens group may move relative to the first lens group in a direction perpendicular to the optical axis.

According to the foregoing technical solution, an offset in the direction perpendicular to the optical axis that is caused by a jitter during photographing can be well compensated for, so that the optical lens device has an optical image stabilization function, thereby improving imaging quality.

In some embodiments, the second lens group includes two lenses, the two lenses are cemented together, and the two lenses are spherical lenses.

According to the foregoing technical solution, because the spherical lens is easy to process, and is cost-effective, the two spherical lenses are cemented to form the second lens group, so that the second lens group is easy to process, and chromatic aberration and spherical aberration are effectively eliminated.

In some embodiments, the first lens group includes a curved prism, the curved prism includes an incident surface, an emergent surface, and a reflective surface, an included angle between the reflective surface and the emergent surface is an acute angle, the incident surface is connected between the reflective surface and the emergent surface, and the incident surface is a convex surface.

According to the foregoing technical solution, incident light can be deflected after passing through the prism, so that a length of the optical lens device is effectively reduced, thereby facilitating miniaturization of the optical lens device. In addition, the incident surface is designed as a convex surface, in other words, protrudes toward an object side, so that a clear aperture of the optical lens device is increased conveniently, and a large aperture diaphragm is implemented, and therefore the optical lens device can well correct aberration while being relatively small and thin, thereby improving imaging quality.

In some embodiments, the incident surface is an aspherical surface.

According to the foregoing technical solution, the incident surface of the curved prism is designed as an aspherical surface to reduce a size of the optical lens device in an optical axis direction, so that a clear aperture of the optical lens device is further increased conveniently, and a large aperture diaphragm is implemented, and therefore the optical lens device can well correct aberration while being relatively small and thin, thereby improving imaging quality.

In some embodiments, the curved prism is a glass prism, the first lens group further includes at least one lens disposed on an image side of the emergent surface, and a lens closest to the curved prism in the at least one lens is a spherical lens.

According to the foregoing technical solution, the lens closest to the curved prism is designed as a spherical lens, so that processing difficulty is reduced conveniently, and the lens can be cemented to an image-side surface of the curved prism when necessary, thereby effectively eliminating chromatic aberration and spherical aberration.

According to a second aspect, an embodiment of this application provides a camera module, including a photosensitive element and the optical lens device in the first aspect. The photosensitive element is disposed on an image side of the optical lens device.

The camera module in this embodiment of this application achieves same technical effects as the optical lens device in the first aspect, and details are not described herein again.

According to a third aspect, an embodiment of this application provides an electronic device, including a housing and the camera module in the second aspect. The camera module is mounted on the housing.

The electronic device in this embodiment of this application achieves same technical effects as the camera module in the second aspect, and details are not described herein again.

DETAILED DESCRIPTION OF ILLUSTRATIVE EMBODIMENTS

Figure 1:
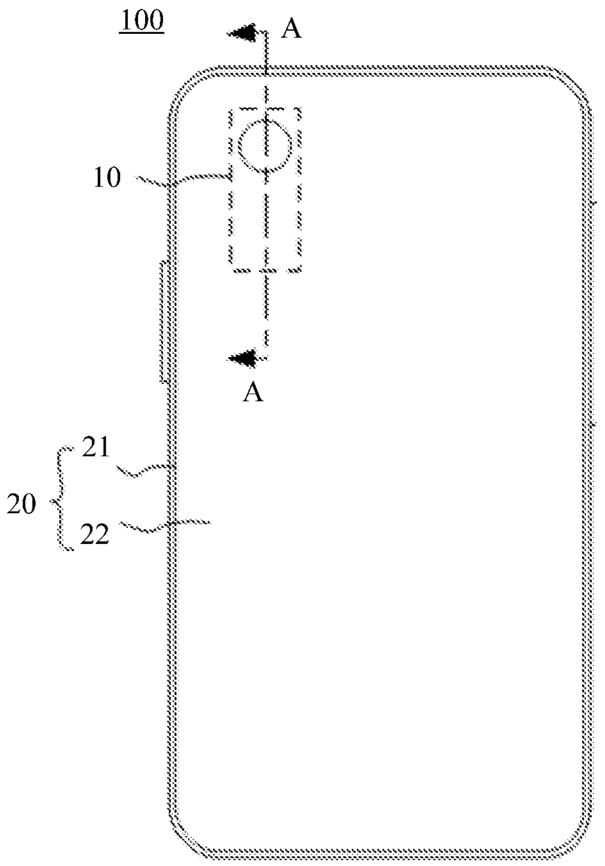
FIG. 1 is a schematic diagram of a structure of an electronic device according to some embodiments of this application.

For ease of understanding, the following first explains and describes English acronyms and related technical terms in embodiments of this application.

Focal power (focal power) is equal to a difference between a degree of image-side light beam convergence and a degree of object-side light beam convergence, and represents a capability of deflecting light by an optical lens device.

A lens or a lens group with positive focal power means that the lens or the lens group has a positive focal length, and has an effect of converging light.

A lens or a lens group with negative focal power means that the lens or the lens group has a negative focal length, and has an effect of diverging light.

A focal length (focal length), also referred to as a focal length, is a measurement form of measuring light convergence or divergence in an optical lens device, and refers to a vertical distance from an optical center to a focal plane of a lens or a lens group when an infinite scene is formed into a clear image on the focal plane by using the lens or the lens group. From a practical perspective, the focal length may be understood as a distance from a center of the lens device to a plane when an object is at infinity. A position of an optical center of a fixed-focus lens device is fixed, and a change of an optical center of a long-focus lens device causes a change in a focal length of the lens device.

An effective focal length (effective focal length, EFL) of a lens device refers to a distance from a center of the lens device to a focal point.

In terms of an object-side surface, taking a lens as a boundary, a side on which a photographed object is located is an object side, and a surface of the lens close to the object side is referred to as an object-side surface.

In terms of an image-side surface, taking a lens as a boundary, a side on which an image of a photographed object is located is an image side, and a surface of the lens close to the image side is referred to as an image-side surface.

An aperture diaphragm (aperture diaphragm) is an apparatus used for controlling an amount of light that passes through a lens device and that enters a photosensitive surface of a body, and is usually in the lens device.

An aperture diaphragm value, also referred to as an F-number (FNO), is a relative value (a reciprocal of a relative aperture) obtained by dividing a focal length of a lens device by an entrance pupil diameter of the lens device. A smaller aperture diaphragm value indicates a larger amount of incident light in a same unit of time. A larger aperture diaphragm value indicates a smaller depth of field, which blurs photographing background content, and achieves an effect similar to that of a long-focus lens device.

A total track length (total track length, TTL) is a total length from a surface of a lens device closest to an object side to an image plane, and the TTL is a main factor that forms a camera height.

An image plane is located on image sides of all lenses in an optical lens device, and is a carrier surface of an image formed after light sequentially passes through the lenses in the optical lens device.

An optical axis is an axis that vertically passes through a center of a lens. An optical axis of a lens device is an axis that passes through centers of lenses of the lens device. When light parallel to the optical axis is incident into a convex lens, for an ideal convex lens, all light should converge at a point behind the lens. The point at which all the light converges is a focal point.

A focal point is a convergence point formed after parallel light is refracted by a lens or a lens group.

An image-side focal plane, also referred to as a rear focal plane or a second focal plane, is a plane that passes through an image-side focal point (also referred to as a rear focal point or a second focal point) and that is perpendicular to an optical axis of a system.

An Abbe (Abbe) number, namely, a dispersion coefficient, is a difference ratio of refractive indexes of an optical material at different wavelengths, and represents a dispersion degree of the material.

In terms of aberration, an optical lens device has a property of an ideal optical system at an optical axis, and light that is emitted from a point on an object and that is close to the axis intersects with an image plane at a point (namely, an optical-axis image point). However, actually, it is difficult for light that passes through different apertures of the lens to perfectly intersect at a point, and there are specific deviations from a position of the paraxial image point. These differences are collectively referred to as aberration.

In terms of longitudinal chromatic aberration (longitudinal spherical aber), also referred to as longitudinal chromatic aberration or position chromatic aberration or longitudinal aberration, light of different wavelengths formed after a beam of light parallel to an optical axis passes through a lens device converges at different positions. Such aberration is referred to as position chromatic aberration or longitudinal chromatic aberration. The reason is as follows: Positions at which the lens device performs imaging for the light of the wavelengths are different, and therefore, image-side focal planes of light of different colors cannot coincide with each other during final imaging, and polychromatic light disperses to form dispersion.

Distortion (distortion), also referred to as distortion, is a degree of distortion of an image of an object that is formed by using an optical lens device relative to the object. Distortion is caused by aperture-diaphragm spherical aberration. Heights of intersection points between images formed after main light of different fields of view passes through an optical lens device and a Gaussian image plane are not equal to an ideal image height, and a difference between the two is distortion. Therefore, distortion changes only an imaging position of an off-axis object point on the ideal plane to make a shape of an image distorted, but does not affect definition of the image.

In terms of astigmatism (astigmatism), because an object point is not on an optical axis of an optical lens device, there is an inclination angle between a light beam emitted by the object point and the optical axis. After the light beam is refracted by a lens, convergence points of tangential pencil light beams and sagittal pencil light beams of the light beam are not a same point. In other words, the light beams cannot be concentrated on a point, and imaging is unclear, and therefore astigmatism is generated. The tangential pencil light beam and the sagittal pencil light beam are names of light beams in two vertical planes within a rotationally symmetric optical lens device.

In terms of a meridian plane (meridian plane), a plane formed by main light (a main light beam) of an object point outside an optical axis and an optical axis is referred to as a meridian plane.

In terms of a sagittal plane (sagittal surface), a plane that passes through main light (a main light beam) of an object point outside an optical axis and that is perpendicular to the meridian plane is referred to as a sagittal plane.

In terms of curvature of field (curvature of field), the curvature of field is used to indicate a difference between a position of a clearest image point formed after light of a non-center field of view passes through an optical lens device group and a position of a clearest image point of a center field of view in an optical axis direction. When a lens has curvature of field, an intersection point of an entire light beam does not coincide with an ideal image point. Although a clear image point can be obtained at each specific point, an entire image plane is a curved surface.

The following clearly and completely describes the technical solutions in embodiments of this application with reference to the accompanying drawings in embodiments of this application. Clearly, the described embodiments are merely some rather than all of embodiments of this application. Based on embodiments of this application, all other embodiments obtained by persons of ordinary skill in the art without creative efforts fall within the protection scope of this application.

In embodiments of this application, the terms “first” and “second” are merely used for the purpose of description, and should not be understood as an indication or implication of relative importance or an implicit indication of a quantity of indicated technical features. Therefore, features defined with “first” or “second” may explicitly or implicitly include one or more of the features. In the descriptions of this application, unless otherwise stated, “a plurality of” means two or more.

Figure 2:
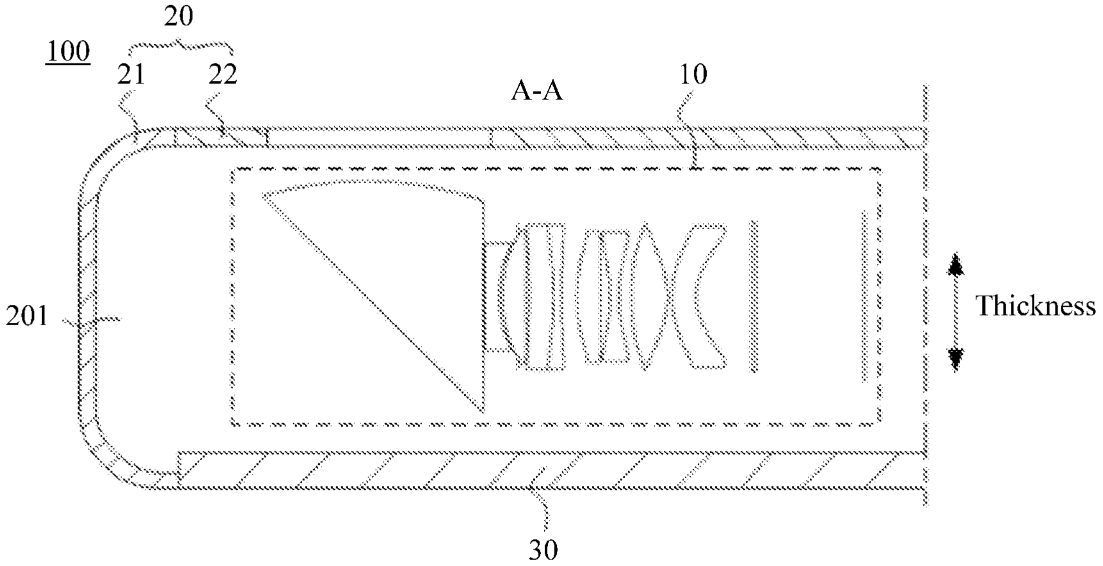
FIG. 2 is a sectional view along A-A in FIG. 1.
Figure 3:
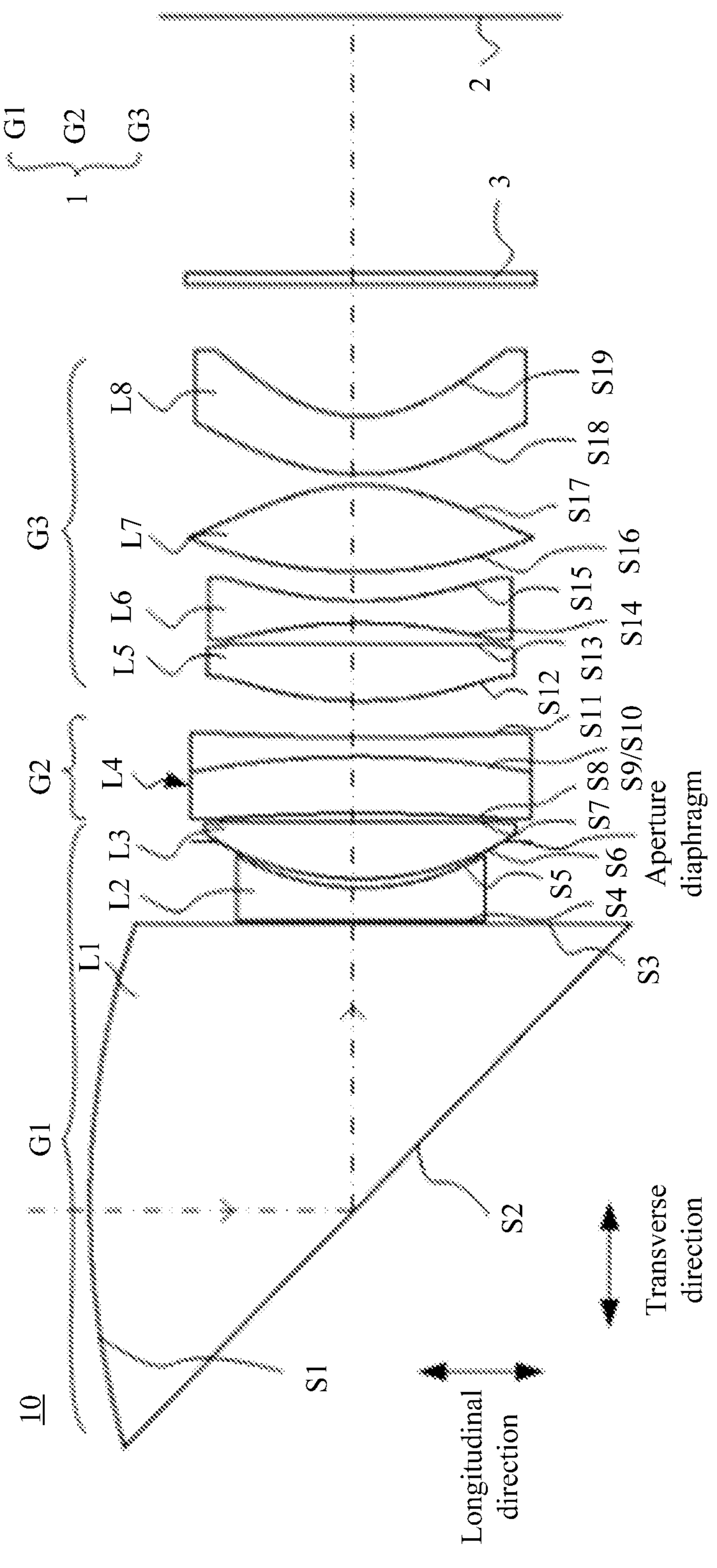
FIG. 3 is a schematic diagram of a structure of an optical lens device according to a first embodiment of this application.

As shown in FIG. 1~FIG. 3, an embodiment of this application provides an electronic device 100, including a housing 20 and a camera module 10. The camera module 10 is mounted on the housing 20, the camera module 10 includes an optical lens device 1 and a photosensitive element 2, and the photosensitive element 2 is disposed on an image side of the optical lens device 1.

The electronic device 100 may be a device that has a photo or video function, for example, a mobile phone, a tablet computer, a laptop computer, or a wearable device. In this embodiment, an example in which the electronic device 100 is a mobile phone is used for description.

The electronic device 100 includes the housing 20, a display screen 30, and the camera module 10. In some embodiments, the housing 20 includes a frame 21 and a rear cover 22. The frame 21 and the rear cover 22 may be an integrally formed structure, or may form an integrated structure through assembling. The display screen 30 and the rear cover 22 are respectively mounted on two sides of the frame 21, to jointly enclose accommodating space 201, and the camera module 10 is accommodated in the accommodating space 201.

In some embodiments, the electronic device 100 further includes a processor (not shown in the figure), and the processor is accommodated in the accommodating space 201. The processor is communicatively connected to the camera module 10, and the processor is configured to: obtain image data from the camera module 10, process the image data, and then transmit a signal obtained after the processing to a display. The communication connection between the camera module 10 and the processor may include performing data transmission through an electrical connection such as cabling, and may also include implementing data transmission through coupling or the like. It may be understood that the camera module 10 and the processor may alternatively implement a communication connection in another manner that can implement data transmission.

In this embodiment, a camera hole is disposed on the rear cover 22, the camera module 10 collects light by using the camera hole, and the camera module 10 serves as a rear-facing camera of the electronic device 100. Specifically, the camera module 10 in this application may be mounted at an upper left corner, the middle of an upper part, or an upper right corner of the back of the electronic device 100. This is not specifically limited herein.

In addition to being mounted on the back of the electronic device 100 to serve as a rear-facing camera, the camera module 10 may serve as a front-facing camera of the electronic device 100. This is not specifically limited herein.

Certainly, in addition to being directly disposed in the electronic device 100, the camera module 10 may be detachably connected to the electronic device 100 through an auxiliary component. This facilitates disassembly or assembly of the camera module 10. The auxiliary component may rotate or move relative to the electronic device 100. The auxiliary component and the electronic device 100 may use a card detaching connection manner such as screwing or clamping. This is not specifically limited herein.

As shown in FIG. 3, in some embodiments, the camera module 10 includes an optical lens device 1, a photosensitive element 2, and a filter 3. The photosensitive element 2 is located on an image side of the optical lens device 1. The filter 3 may be located between the optical lens device 1 and the photosensitive element 2, so that light can pass through the optical lens device 1 and irradiate to a photosensitive surface of the photosensitive element 2.

A working principle of the camera module 10 is as follows: Light reflected by a photographed scene passes through the optical lens device 1 to generate an optical image, the optical image is projected onto the photosensitive surface of the photosensitive element 2, and the photosensitive element 2 converts the optical image into an electrical signal, namely, an analog image signal, and transmits the electrical signal to the processor.

The photosensitive element 2 (also referred to as an image sensor) is a semiconductor chip, includes hundreds of thousands to millions of photodiodes on the surface, and generates charges when being irradiated by light. The photosensitive element 2 may be a charge coupled device (charge coupled device, CCD), or may be a complementary metal-oxide semiconductor (complementary metal-oxide semiconductor, CMOS). The CCD is made of a highly photosensitive semiconductor material, and can convert light into charges. The charge coupled device includes many photosensitive units, and is usually measured in megapixels. When the surface of the photosensitive element 2 is irradiated by light, each photosensitive unit reflects charges on a component, and signals generated by all photosensitive units are superimposed together to form a complete picture.

The filter 3 is configured to filter out a wavelength band that is not required in light, to prevent the photosensitive element 2 from generating a false color or a ripple, so that effective resolution and color reproduction of the photosensitive element 2 are improved. Specifically, the filter 3 may be an infrared cut-off filter. In this embodiment, the filter 3 is an independent component, or the structural member named the filter 3 may be canceled. A filter film layer is attached or a filter material is used on at least one surface of one lens or prism of the optical lens device 1 to implement filtering. This is not specifically limited herein.

The optical lens device 1 mainly performs imaging by using a lens refraction principle. To be specific, light of a scene passes through the optical lens device 1 to form a clear image on a focal plane, and the image of the scene is recorded by using the photosensitive element 2 located on the focal plane.

Specifically, the optical lens device 1 may be a telephoto lens device or a periscope lens device. In this embodiment, an example in which the optical lens device 1 is a periscope lens device is used for description. When the optical lens device 1 is a periscope lens device, a longitudinal size of the optical lens device 1 along an optical axis can be effectively reduced, and when the optical lens device 1 is placed in the accommodating space 201 of the housing 20, the optical lens device 1 occupies a space size of the accommodating space 201 in a thickness direction of the electronic device 100, so that the optical lens device 1 is better applicable to the thin electronic device 100.

FIG. 3~FIG. 5, FIG. 6A, FIG. 6B, and FIG. 6C are diagrams of structures and simulation effect diagrams of an optical lens device 1 in a camera module 10 in a first embodiment.

As shown in FIG. 3, the optical lens device 1 includes a first lens group G1, a second lens group G2, and a third lens group G3 that are arranged from an object side to an image side. The first lens group G1 has positive focal power, the second lens group G2 has negative focal power, and the third lens group G3 has negative focal power. An effective focal length fg1 of the first lens group G1 and an effective focal length f of the optical lens device 1 are properly controlled, so that the effective focal length fg1 of the first lens group G1 and the negative focal power of the effective focal length fg2 of the second lens group G2 are balanced conveniently, thereby reducing aberration and improving imaging quality while the optical lens device 1 has a long-focus characteristic.

As shown in FIG. 2 and FIG. 3, in some embodiments, the first lens group G1 of the optical lens device 1 includes a curved prism, the curved prism of the optical lens device 1 includes an incident surface S1, an emergent surface S3, and a reflective surface S2, an included angle between the reflective surface S2 of the optical lens device 1 and the emergent surface S3 of the optical lens device 1 is an acute angle, the incident surface S1 of the optical lens device 1 is connected between the reflective surface S2 of the optical lens device 1 and the emergent surface S3 of the optical lens device 1, and the incident surface S1 of the optical lens device 1 is a convex surface.

In this way, incident light can be deflected after passing through the reflective surface S2 of the curved prism, so that a length of the optical lens device is effectively reduced, thereby facilitating miniaturization of the optical lens device. In addition, the incident surface is designed as a convex surface, in other words, protrudes toward an object side, so that a clear aperture of the optical lens device is increased conveniently, and a large aperture diaphragm is implemented, and therefore the optical lens device can well correct aberration while being relatively small and thin, thereby improving imaging quality.

In this embodiment of this application, the curved prism may be an integrally formed odd-form triangular prism, for example, an odd-form right-angled triangular prism with a curved surface. In this case, incident light can be deflected by 90°, so that while the optical lens device 1 has the long-focus characteristic, a length, for example, a transverse size shown in FIG. 3, of the optical lens device 1 along an optical axis is effectively reduced, and miniaturization design of the optical lens device 1 is implemented conveniently. The optical lens device 1 is disposed in the accommodating space 201 with a limited thickness in the electronic device 100, so that a thickness of the electronic device 100 is reduced, thereby lightening and thinning the electronic device 100. Certainly, in addition to being integrally formed, the curved prism can form the foregoing prism with positive focal power through cementation or combination of a lens and a right-angled triangular prism when the accommodating space 201 of the electronic device 100 is sufficient. Materials of the right-angled triangular prism and the lens may be the same or different, and may be selected and designed based on an actual case. This is not specifically limited herein.

Certainly, in addition to being a curved prism, the curved prism can alternatively be a telephoto lens when the accommodating space 201 of the electronic device 100 is sufficient, and has positive focal power. This is not specifically limited herein.

Certainly, in the first lens group G1, in addition to the curved prism, a lens 2 L2, and a lens 3 L3, one or more lenses may be disposed on an image side of the curved prism or no lens may be disposed behind the curved prism with reference to performance parameters such as focal power and the long-focus characteristic of the optical lens device 1. This is not specifically limited herein.

As shown in FIG. 3, in some embodiments, the incident surface S1 is an aspherical surface. The incident surface S1 of the curved prism is designed as an aspherical surface to reduce a size of the optical lens device 1 in an optical axis direction, so that a clear aperture of the optical lens device 1 is further increased conveniently, and a large aperture diaphragm is implemented, and therefore the optical lens device 1 can well correct aberration while being relatively small and thin, thereby improving imaging quality.

As shown in FIG. 3, in some embodiments, the curved prism of the optical lens device 1 is a glass prism, and the first lens group G1 of the optical lens device 1 further includes at least one lens disposed on an image side of the emergent surface of the optical lens device 1. A lens closest to the curved prism of the optical lens device 1 in the at least one lens of the optical lens device 1 is a spherical lens.

The lens closest to the curved prism is designed as a spherical lens, so that processing difficulty is reduced conveniently, and the lens can be cemented to an image-side surface of the curved prism when necessary, thereby effectively eliminating chromatic aberration and spherical aberration and improving imaging quality.

Specifically, the first lens group G1 includes a lens 1 L1, namely, the curved prism, with positive focal power, the lens 2 L2 with negative focal power, and the lens 3 L3 with positive focal power. The lens 2 L2 is a glass spherical lens. Because the glass spherical lens has a high refractive index, a high Abbe number, and is easy to process and shape, designing the lens 2 L2 close to the curved prism to be made of same glass as the curved prism makes it convenient for connecting object-side surfaces of the lens 2 L2 and the curved prism through cementation, to eliminate chromatic aberration and spherical aberration of the optical lens device 1, so that the optical lens device 1 has relatively high imaging quality and low control costs. In this way, it is convenient to cement the object-side surfaces of the lens 2 L2 and the lens 1 L1, namely, the curved prism, to eliminate chromatic aberration and spherical aberration of the first lens group G1, so that aberration of the optical lens device 1 is reduced on the whole, and imaging quality is improved. Certainly, in addition to being a glass spherical lens, the lens 2 L2 may alternatively be designed as another transparent material such as a resin or a synthetic material. In this case, the optical lens device 1 is relatively light. A shape parameter and a material of the lens 2 L2 may be selected and designed based on an actual case. This is not specifically limited herein.

Similarly, a material of the lens 3 L3 may be glass, or may be another transparent material such as a resin or a synthetic material. A shape parameter and a material of the lens 3 L3 may be selected and designed based on an actual case. This is not specifically limited herein.

As shown in FIG. 3, in some embodiments, the second lens group G2 of the optical lens device 1 and the third lens group G3 of the optical lens device 1 each include a plurality of lenses. A proper arrangement of a plurality of lenses in the second lens group G2 and the third lens group G3 helps properly allocate focal power of the optical lens device 1, balance the focal power of the first lens group G1, and take all of the long-focus characteristic, high imaging quality, and miniaturization of the optical lens device 1 into account.

As shown in FIG. 3, in some embodiments, the second lens group G2 includes two lenses, the two lenses of the optical lens device 1 are cemented together, and the two lenses in the second lens group G2 of the optical lens device 1 are glass spherical lenses. Because glass has a high refractive index and Abbe number, chromatic aberration is well eliminated, and imaging quality is improved. In addition, because the glass spherical lens is easy to process, precision of processing and assembling such as cementing the two lenses in the second lens group G2 is high, and costs are low. Cementing the two lenses together can not only eliminate chromatic aberration and spherical aberration but also make an incident angle of light at a cementation surface quite large. In this way, more higher-order aberration can be generated to offset primary aberration, to achieve aberration balance.

Refractive indexes of the two lenses in the second lens group G2 may be the same or different. Certainly, in addition to being glass spherical lenses, the two lenses in the second lens group G2 may alternatively be spherical lenses of different materials. Alternatively, a plurality of lens may be selected and combined to form the second lens group G2 with negative focal power based on an actual case, to balance the positive focal power of the first lens group G1. This is not specifically limited herein.

When the optical lens device 1 has the long-focus characteristic, during long-shot photographing, image blurring is prone to occur due to a jitter, and a larger zoom ratio causes a more obvious jitter. This is most intuitively reflected in taking videos, followed by a success image ratio. If image stabilization is higher, the success image ratio is higher, and a user can take a screenshot of successful photos. The success image ratio can be improved through optical image stabilization. Therefore, when miniaturization design of the optical lens device 1 with the long-focus characteristic is taken into account, optical image stabilization is particularly important for imaging quality of the miniaturized long-focus lens device.

Figure 4:
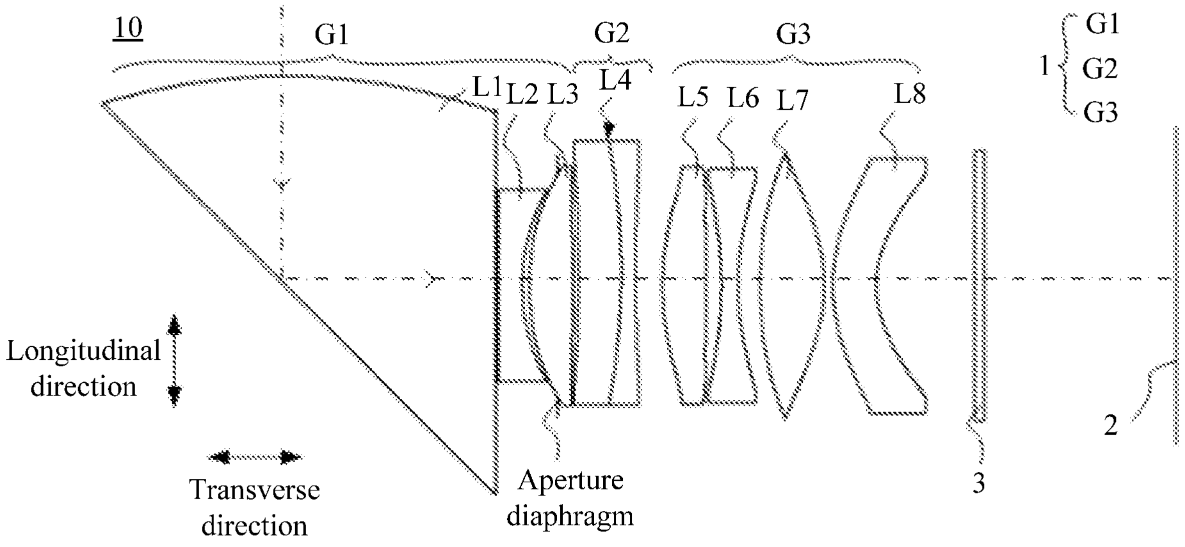
FIG. 4 is a schematic diagram of a structure of an optical lens device in which a second lens group in FIG. 3 moves in a direction.
Figure 5:
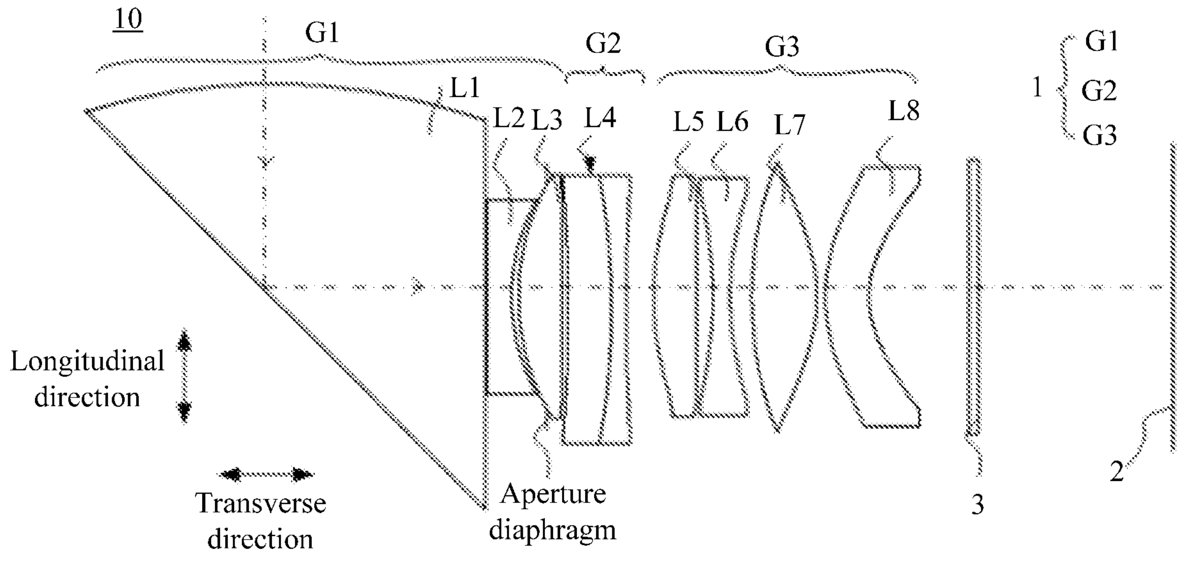
FIG. 5 is a schematic diagram of a structure of an optical lens device in which a second lens group in FIG. 3 moves in another direction.

As shown in FIG. 3~FIG. 5, in some embodiments, the second lens group G2 of the optical lens device 1 may move relative to the first lens group G1 of the optical lens device 1 in a direction perpendicular to the optical axis, in other words, the second lens group G2 may move in a longitudinal direction in FIG. 2. In this way, the optical lens device 1 has an optical image stabilization function. To be specific, when a hand of the user jitters during photographing, the optical lens device 1 can offset a light offset caused by the hand jitter in this direction by moving the second lens group G2, to improve imaging quality.

It should be noted that optical image stabilization mainly compensates for a jitter of a camera by moving a lens device, and depends on a precision gyroscope and a group of movable lens devices, for example, the second lens group G2 in this embodiment, that are built in the camera. The precision gyroscope can accurately detect a hand jitter, and convert the hand jitter into an electrical signal. After passing through a processor built in the lens device, the electrical signal controls the second lens group G2 to move, to correct a light offset caused by the hand jitter and avoid blurring, so that imaging quality is improved.

Certainly, an image stabilization effect can alternatively be achieved by using a high photosensitivity technology. A principle of the high photosensitivity technology is relatively simple. To be specific, a speed of a shutter is increased by increasing a photosensitivity ISO value, to achieve the image stabilization effect. Alternatively, optical image stabilization and high photosensitivity may be combined, so that the optical lens device 1 has a dual image stabilization function, so that imaging quality is further improved. This is not specifically limited herein.

As shown in FIG. 3, in some embodiments, the third lens group G3 of the optical lens device 1 includes four lenses, which are a lens 5 L5, a lens 6 L6, a lens 7 L7, and a lens 8 L8. In the four lenses of the optical lens device 1, in a direction from the object side to the image side, both the first lens, namely, the lens 5 L5 in the third lens group G3, and the fourth lens, namely, the lens 8 L8 in the third lens group G3, have focal power, the second lens, namely, the lens 6 L6 in the third lens group G3, has negative focal power, and the third lens, namely, the lens 7 L7 in the third lens group G3, has positive focal power.

In conclusion, as shown in FIG. 3, in the first embodiment, the optical lens device 1 includes the lens 1 L1 with positive focal power, the lens 2 L2 with negative focal power, the lens 3 L3 with positive focal power, the lens 4 L4 with negative focal power, the lens 5 L5 with positive focal power, the lens 6 L6 with negative focal power, the lens 7 L7 with positive focal power, and the lens 8 L8 with negative focal power that are arranged from the object side to the image side.

The lens 1 L1 includes the object-side surface S1, the reflective surface S2, and the image-side surface S3. The lens 2 L2 includes an object-side surface S4 and an image-side surface S5. The lens 3 L3 includes an object-side surface S6 and an image-side surface S7. The lens 4 L4 includes two object-side surfaces S8 and S10 and two image-side surfaces S9 and S11, and the object-side surfaces and the image-side surfaces are alternately arranged along the optical axis. The lens 5 L5 includes an object-side surface S12 and an image-side surface S13. The lens 6 L6 includes an object-side surface S14 and an image-side surface S15. The lens 7 L7 includes an object-side surface S16 and an image-side surface S17. The lens 8 L8 includes an object-side surface S18 and an image-side surface S19. In addition, the camera module 10 further has a virtual image plane and an aperture diaphragm STO. The image plane is located on an image side of the lens 8 L8, and the aperture diaphragm STO is located on the first object-side surface of the second lens group G2, namely, the object-side surface S8 of the lens 4 L4. Generally, the image plane of the camera module 10 coincides with a photosensitive surface of the photosensitive element 2.

An object-side surface and an image-side surface of a lens each may be radially divided into an optical-axis area and a circumferential area from a center of the surface. When a surface of a lens is described as a convex surface at the optical axis (a center area of the surface), it may be understood that an area of the surface of the lens near the optical axis is a convex surface. When a surface of a lens is described as a concave surface at a circumference, it may be understood that an area of the surface near a maximum effective radius is a concave surface. For example, when the surface is a convex surface at the optical axis and is also a convex surface at a circumference, a shape of the surface in a direction from a center (the optical axis) to an edge may be a pure convex surface, or the shape may be a convex-surface shape at the center, transit to a concave-surface shape, and then become a convex surface when approaching a maximum effective radius. This is merely an example for describing relationships at the optical axis and the circumference, and a plurality of shape structures (concave/convex relationships) of a surface are not completely embodied. However, other cases in some embodiments may be derived based on the foregoing example, and details are not described herein.

As shown in FIG. 3, the object-side surface S1 of the lens 1 L1 protrudes toward an image side at the optical axis (briefly referred to as a concave surface), the reflective surface S2 is a plane at the optical axis, and the image-side surface S3 is a plane at the optical axis. The object-side surface S1 protrudes toward an object side at a circumference (briefly referred to as a convex surface), the reflective surface S2 is a plane at the circumference, and the image-side surface S3 is a plane at the circumference.

The object-side surface S4 of the lens 2 L2 is a plane at the optical axis, and the image-side surface S5 is a convex surface at the optical axis. The object-side surface S4 is a plane at a circumference, and the image-side surface S5 is a convex surface at the circumference. The object-side surface S6 of the lens 3 L3 is a convex surface at the optical axis, and the image-side surface S7 is a concave surface at the optical axis. The object-side surface S6 is a convex surface at a circumference, and the image-side surface S7 is a concave surface at the circumference. The object-side surface S8 of the lens 4 L4 is a concave surface at the optical axis, and the image-side surface S11 is a convex surface at the optical axis. The object-side surface S8 is a concave surface at a circumference, and the image-side surface S11 is a convex surface at the circumference. The object-side surface S12 of the lens 5 L5 is a convex surface at the optical axis, and the image-side surface S13 is a concave surface at the optical axis. The object-side surface S12 is a convex surface at a circumference, and the image-side surface S13 is a concave surface at the circumference. The object-side surface S14 of the lens 6 L6 is a concave surface at the optical axis, and the image-side surface S15 is a convex surface at the optical axis. The object-side surface S14 is a concave surface at a circumference, and the image-side surface S15 is a convex surface at the circumference. The object-side surface S16 of the lens 7 L7 is a convex surface at the optical axis, and the image-side surface S17 is a concave surface at the optical axis. The object-side surface S16 is a convex surface at a circumference, and the image-side surface S17 is a concave surface at the circumference. The object-side surface S18 of the lens 8 L8 is a convex surface at the optical axis, and the image-side surface S19 is a convex surface at the optical axis. The object-side surface S18 is a convex surface at a circumference, and the image-side surface S19 is a convex surface at the circumference.

In conclusion, for details of concave/convex statuses of a surface of each of the eight lens devices in this embodiment at the optical axis and a circumference, refer to the following Table 9~Table 11.

As shown in FIG. 3, FIG. 6A, FIG. 6B, and FIG. 6C, FIG. 6A, FIG. 6B, and FIG. 6C are respectively a longitudinal spherical aberration (Longitudinal Spherical Aberration) graph, a graph of astigmatic field curves (Astigmatic Field Curves), and a distortion (Distortion) graph of the optical lens device 1 in the first embodiment of this application. Reference wavelengths of astigmatism graphs and distortion graphs in the following embodiments (the first embodiment to an eighth embodiment) are 546 nm.

With reference to data of main parameters and results of simulation effect diagrams of the optical lens device 1, the following presents parameters such as curvature radiuses, intervals, refractive indexes (Nd), Abbe numbers, and focal lengths of the lenses and the filter 3 in the optical lens device 1 in the camera module 10 in the first embodiment. The intervals include thicknesses of the lenses and spacings between the lenses. A dispersion coefficient is the Abbe number. Table 1b shows aspherical coefficients of the lenses in the first embodiment.

It should be noted that a curvature radius in Table 1a is a curvature radius, at the optical axis, of an object-side surface or an image-side surface of a lens device with a corresponding surface number, namely, a lens device corresponding to each surface number, "infinite" of the lens device in a "curvature radius" parameter column means that an object-side surface or an image-side surface of the lens device is a plane. The first value of each lens device in a "thickness" parameter column is a thickness of the lens device on the optical axis, and the second value is a distance from an image-side surface of the lens device to an object-side surface of a next lens device on the optical axis. A value of the aperture diaphragm STO in the "thickness" parameter column is a distance from a center of the aperture diaphragm STO and an object-side surface of a next lens device on the optical axis.

The aspherical surface of the optical lens device 1 in the following embodiments may be limited by using the following aspherical-surface curve equation, for example:

$$z = \frac{cr^2}{1 + \sqrt{1 - (1 + k)c^2 r^2}} + \sum_{i=1}^{N} a_i r^{2i},$$

where z is a relative distance between a point that is r away from the optical axis on the aspherical surface and a tangent plane tangent to an intersection point of the aspherical surface and the optical axis, r is a vertical distance between a point on an aspherical-surface curve and the optical axis, c is curvature, k is a cone coefficient, and $a_i$ is an aspherical coefficient of the $i^{th}$ order. Refer to Table 1b.

In the first embodiment, an effective focal length f of the optical lens device 1 is equal to 14.95 mm, a combined focal length fg1 of the first lens group G1 is equal to 84.39 mm, an effective focal length fg2 of the second lens group G2 is equal to −40.82 mm, an aperture diaphragm FNO is equal to 2.0, a field of view FOV is equal to 27.2°, and a total track length TTL of the optical lens device 1 is equal to 25.63 mm. Parameters of the optical lens device 1 in the first embodiment meet relationships shown in Table 1c.

TABLE 1a

EFL = 14.95 FNO = 2.0 FOV = 27.2 TTL = 25.63

| Surface number | Surface name | Surface type | Curvature radius | Thickness | Refractive index | Abbe number | Focal length | Combined focal length |
|---|---|---|---|---|---|---|---|---|
| Object plane | Object plane | Spherical surface | Infinite | Infinite | | | | |
| S1 | L1 | Aspherical surface | −14.22 | −4.90 | 1.76 | 51.17 | 18.72 | 84.39 |
| S2 | | Spherical surface | Infinite | 4.90 | | | | |
| S3 | | Spherical surface | Infinite | 0.05 | | | | |
| S4 | L2 | Spherical surface | Infinite | 0.56 | 1.69 | 31.16 | −6.79 | |
| S5 | | Spherical surface | 4.71 | 0.81 | | | | |
| STO | Aperture diaphragm | Spherical surface | Infinite | −0.65 | | | | |
| S6 | L3 | Aspherical surface | 5.77 | 1.00 | 1.55 | 56.13 | 10.32 | |
| S7 | | Aspherical surface | −246.32 | 0.14 | | | | |
| S8 | L4 | Spherical surface | −39.53 | 1.00 | 1.96 | 17.94 | −40.82 | |
| S9 | | Spherical surface | −17.25 | 0.00 | | | | |
| S10 | | Spherical surface | −17.25 | 0.33 | 1.69 | 31.16 | | |
| S11 | | Spherical surface | 44.69 | 0.64 | | | | |
| S12 | L5 | Aspherical surface | 6.92 | 1.00 | 1.57 | 37.4 | 11.26 | |
| S13 | | Aspherical surface | −84.94 | 0.36 | | | | |

TABLE 1a-continued

EFL = 14.95 FNO = 2.0 FOV = 27.2 TTL = 25.63

| Surface number | Surface name | Surface type | Curvature radius | Thickness | Refractive index | Abbe number | Focal length | Combined focal length |
|---|---|---|---|---|---|---|---|---|
| S14 | L6 | Aspherical surface | −10.24 | 0.39 | 1.59 | 28.24 | −6.55 | |
| S15 | | Aspherical surface | 6.29 | 0.51 | | | | |
| S16 | L7 | Aspherical surface | 8.64 | 1.51 | 1.57 | 37.4 | 4.63 | |
| S17 | | Aspherical surface | −3.56 | 0.19 | | | | |
| S18 | L8 | Aspherical surface | 4.15 | 1.00 | 1.645 | 23.52 | −9.58 | |
| S19 | | Aspherical surface | 2.25 | 2.30 | | | | |
| S20 | Filter 3 | Spherical surface | Infinite | 0.21 | 1.52 | 64.17 | | |
| S21 | | Spherical surface | Infinite | 4.48 | | | | |
| Image plane | Image plane | Spherical surface | Infinite | 0.00 | | | | |

Note:
A reference wavelength is 546 nm

TABLE 1b

| Surface number | K | A4 | A6 | A8 | A10 |
|---|---|---|---|---|---|
| S1 | 0.00000E+00 | 6.09662E−05 | 7.88882E−07 | −8.71371E−08 | 7.60876E−09 |
| S6 | 9.16360E−01 | 2.54513E−04 | −2.83649E−06 | −2.10599E−05 | 4.31021E−06 |
| S7 | 0.00000E+00 | 1.36699E−04 | 1.33936E−05 | −3.49418E−05 | 7.01667E−06 |
| S12 | 0.00000E+00 | −1.21973E−03 | 3.92711E−04 | −7.18536E−05 | 4.76816E−08 |
| S13 | 0.00000E+00 | −1.89926E−03 | 9.44284E−04 | 2.67038E−04 | −2.01989E−04 |
| S14 | 0.00000E+00 | −2.44839E−03 | −3.94557E−06 | 5.38717E−04 | −2.25462E−04 |
| S15 | −8.00496E+00 | 1.48303E−03 | −8.06230E−04 | 2.15571E−04 | −2.93688E−05 |
| S16 | 0.00000E+00 | −1.90228E−03 | 8.08986E−04 | −1.03468E−04 | 3.06547E−06 |
| S17 | −4.59169E+00 | −7.25380E−04 | 2.87063E−04 | −3.46483E−05 | 5.24849E−07 |
| S18 | −9.24831E−02 | −5.53678E−03 | 1.43681E−03 | −3.82570E−04 | 4.21990E−05 |
| S19 | −4.48877E−01 | −2.61451E−02 | 5.00370E−03 | −1.14565E−03 | 1.33713E−04 |

| Surface number | A12 | A14 | A16 | A18 | A20 |
|---|---|---|---|---|---|
| S1 | −3.12587E−10 | 4.92188E−12 | 0.00000E+00 | 0.00000E+00 | 0.00000E+00 |
| S6 | −3.66940E−07 | 1.11841E−08 | 0.00000E+00 | 0.00000E+00 | 0.00000E+00 |
| S7 | −5.11739E−07 | 1.28558E−08 | 0.00000E+00 | 0.00000E+00 | 0.00000E+00 |
| S12 | 2.85193E−09 | −1.71695E−10 | 0.00000E+00 | 0.00000E+00 | 0.00000E+00 |
| S13 | 4.92658E−05 | −5.97921E−06 | 2.84110E−07 | 0.00000E+00 | 0.00000E+00 |

| Surface number | K | A4 | A6 | A8 | A10 |
|---|---|---|---|---|---|
| S14 | 5.01317E−05 | −5.96485E−06 | 2.84320E−07 | 0.00000E+00 | 0.00000E+00 |
| S15 | 1.52723E−06 | 0.00000E+00 | 0.00000E+00 | 0.00000E+00 | 0.00000E+00 |
| S16 | 1.37524E−07 | 0.00000E+00 | 0.00000E+00 | 0.00000E+00 | 0.00000E+00 |
| S17 | 1.03628E−07 | 0.00000E+00 | 0.00000E+00 | 0.00000E+00 | 0.00000E+00 |
| S18 | −1.76883E−06 | 0.00000E+00 | 0.00000E+00 | 0.00000E+00 | 0.00000E+00 |
| S19 | −7.16046E−06 | 0.00000E+00 | 0.00000E+00 | 0.00000E+00 | 0.00000E+00 |

TABLE 1c

| | Parameter | | | | | | |
|---|---|---|---|---|---|---|---|
| | fg1/f | fg2/f | fg2/f | TTL/f | AT12/AT23 | f/EPD | R2/R3 |
| Value | 5.64 | −2.73 | 8.25 | 1.71 | 0.21 | 2.01 | −0.78 |

Note: Explanations of relationships of the optical lens device 1 in the following embodiments:

f is the effective focal length of the optical lens device 1, and is equal to an EFL value of the optical lens device 1.

fg1 is the effective focal length of the first lens group G1, namely, a combined focal length of the lens 1 L1, the lens 2 L2, and the lens 3 L3 in the first lens group G1.

fg2 is the effective focal length of the second lens group G2, namely, a focal length of the lens 4 L4.

f is a sum of a focal length of the third lens and the fourth lens in the third lens group G3, namely, a sum of a focal length f7 of the lens 7 L7 and a focal length f8 of the lens 8 L8, in other words, f=f7+f8.

A TTL is a total track length, and refers to a distance from the first surface of the optical lens device 1 to an image plane.

AT12 is a spacing between the first lens group G1 and the second lens group G2 on the optical axis, and is a spacing between the lens 3 L3 and the lens 4 L4 on the optical axis herein.

AT23 is a spacing between the second lens group G2 and the third lens group G3 on the optical axis, and is a spacing between the lens 4 L4 and the lens 5 L5 on the optical axis herein.

An EPD is an entrance pupil diameter of the optical lens device 1, and is also referred to as an entrance pupil aperture.

A ratio f/EPD is equal to an aperture diaphragm FNO, and is used to determine brightness of the optical lens device 1. Generally, the aperture diaphragm FNO is 2.8, and an aperture diaphragm FNO in this application is 2.01, so that a clear aperture of the optical lens device 1 is increased, and imaging quality is good.

R2 is a sum of curvature radiuses of an object-side surface and an image-side surface of the second lens in the third lens group G3, namely, a sum of curvature radiuses of an object-side surface and an image-side surface of the lens 6 L6.

R3 is a sum of curvature radiuses of an object-side surface and an image-side surface of the third lens in the third lens group G3, namely, a sum of curvature radiuses of an object-side surface and an image-side surface of the lens 7 L7.

Figure 6A:
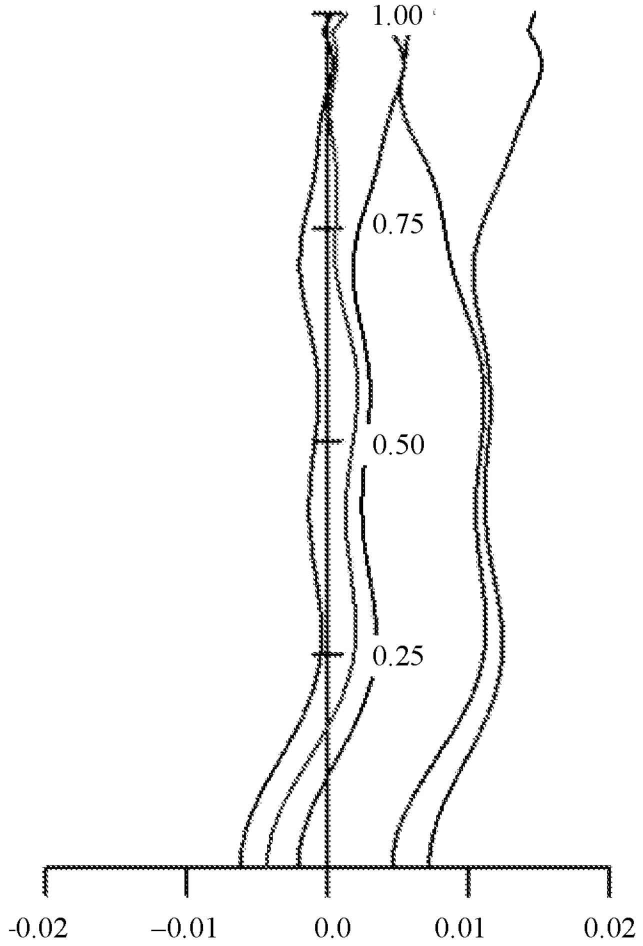
FIG. 6A is a simulation effect diagram 1 (a longitudinal spherical aberration graph) of an optical lens device according to a first embodiment of this application.
Figure 6B:
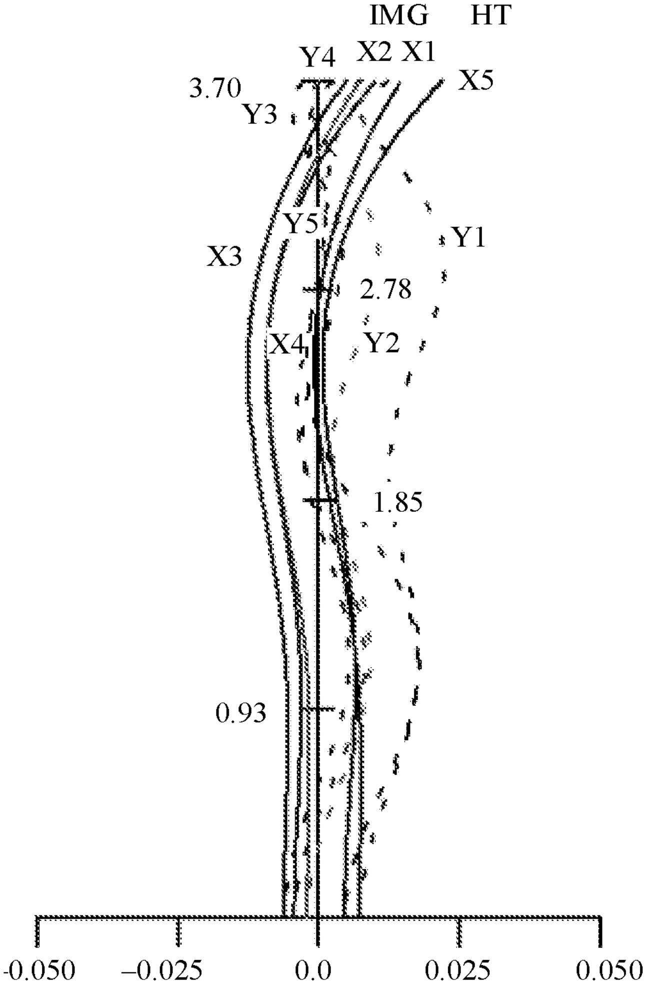
FIG. 6B is a simulation effect diagram 2 (a graph of astigmatic field curves) of an optical lens device according to a first embodiment of this application.
Figure 6C:
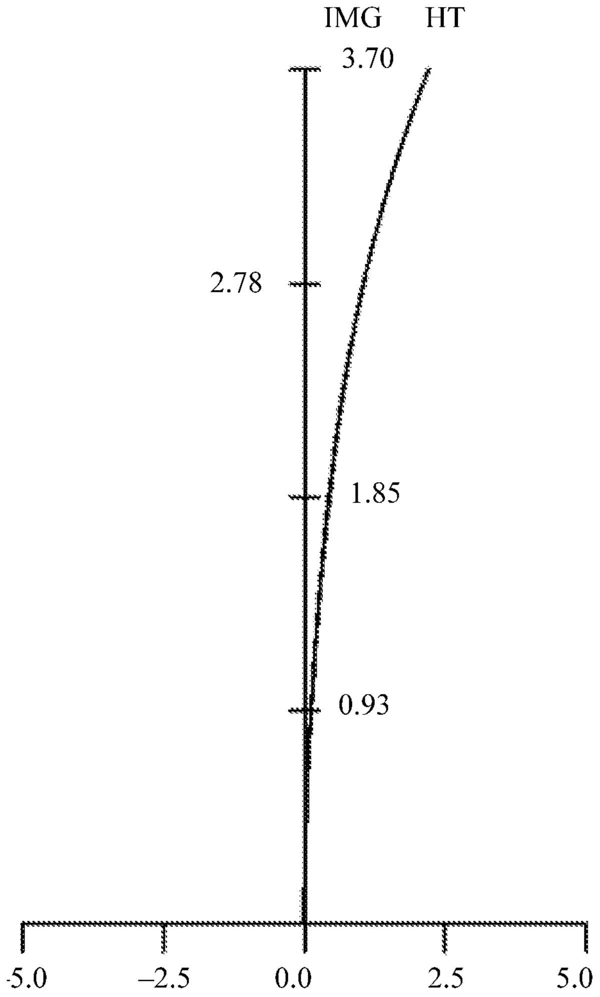
FIG. 6C is a simulation effect diagram 3 (a distortion graph) of an optical lens device according to a first embodiment of this application.

A schematic diagram of a structure of the optical lens device 1 in the first embodiment in FIG. 3 and simulation effect diagrams shown in FIG. 6A, FIG. 6B, and FIG. 6C that are obtained through simulation when main parameters of the optical lens device 1 in the first embodiment provided in Table 1a and Table 1b meet the relationships in Table 1c are used for reference.

The longitudinal spherical aberration graph in FIG. 6A represents deviations, from an ideal image plane, of convergence focal points formed after light of different wavelengths at the optical axis passes through the optical lens device 1. In the longitudinal spherical aberration graph, a vertical coordinate represents a normalized pupil coordinator (Normalized Pupil Coordinator) from an entrance pupil center to an entrance pupil edge, and a horizontal coordinate represents a deviation distance (in a unit of mm) between a light convergence image plane and the ideal image plane. It can be learned from the longitudinal spherical aberration graph that in the optical lens device 1 in the first embodiment, a degree of deviation of a convergence focal point of light of each wavelength and a deviation from the ideal image plane fall within quite small ranges, and spherical aberration in an imaged picture is better corrected. In the graph of astigmatic field curves in FIG. 6B, an X curve represents sagittal curvature of field, and a Y curve represents tangential curvature of field. It can be learned from the graph of astigmatic field curves in FIG. 6B that both sagittal curvature of field and tangential curvature of field are controlled to be within relatively small ranges, reflecting that bending of the image plane is better controlled. It can be learned from the distortion graph in FIG. 6C that distortion of the optical lens device 1 in the first embodiment is relatively small, which means that deformation of an image caused by a main light beam is relatively small, and an imaging distortion effect is low. In conclusion, the optical lens device 1 in the first embodiment achieves the long-focus characteristic and high imaging quality.

FIG. 7, FIG. 8A, FIG. 8B, and FIG. 8C are schematic diagrams of structures and simulation effect diagrams of an optical lens device 1 in a camera module 10 in a second embodiment.

Figure 7:
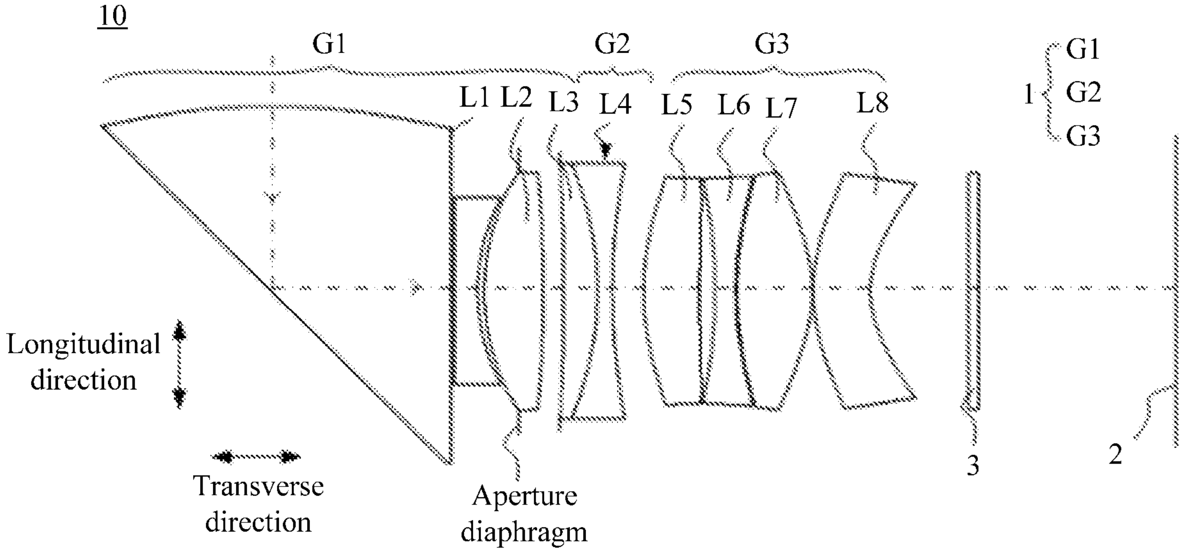
FIG. 7 is a schematic diagram of a structure of an optical lens device according to a second embodiment of this application.

As shown in FIG. 7, in the second embodiment, the optical lens device 1 includes a lens 1 L1 with positive focal power, a lens 2 L2 with negative focal power, a lens 3 L3 with positive focal power, a lens 4 L4 with negative focal power, a lens 5 L5 with positive focal power, a lens 6 L6 with negative focal power, a lens 7 L7 with positive focal power, and a lens 8 L8 with negative focal power that are arranged from an object side to an image side.

An object-side surface S1 of the lens 1 L1 protrudes toward an image side at an optical axis (briefly referred to as a concave surface), a reflective surface S2 is a plane at the optical axis, and an image-side surface S3 is a plane at the optical axis. The object-side surface S1 protrudes toward an object side at a circumference (briefly referred to as a convex surface), the reflective surface S2 is a plane at the circumference, and the image-side surface S3 is a plane at the circumference.

An object-side surface S4 of the lens 2 L2 is a plane at the optical axis, and an image-side surface S5 is a convex surface at the optical axis. The object-side surface S4 is a plane at a circumference, and the image-side surface S5 is a convex surface at the circumference. An object-side surface S6 of the lens 3 L3 is a convex surface at the optical axis, and an image-side surface S7 is a concave surface at the optical axis. The object-side surface S6 is a convex surface at a circumference, and the image-side surface S7 is a concave surface at the circumference. An object-side surface S8 of the lens 4 L4 is a concave surface at the optical axis, and an image-side surface S11 is a convex surface at the optical axis. The object-side surface S8 is a concave surface at a circumference, and the image-side surface S11 is a convex surface at the circumference. An object-side surface S12 of the lens 5 L5 is a convex surface at the optical axis, and an image-side surface S13 is a convex surface at the optical axis. The object-side surface S12 is a convex surface at a circumference, and the image-side surface S13 is a convex surface at the circumference. An object-side surface S14 of the lens 6 L6 is a concave surface at the optical axis, and an image-side surface S15 is a convex surface at the optical axis. The object-side surface S14 is a concave surface at a circumference, and the image-side surface S15 is a convex surface at the circumference. An object-side surface S16 of the lens 7 L7 is a convex surface at the optical axis, and an image-side surface S17 is a concave surface at the optical axis. The object-side surface S16 is a convex surface at a circumference, and the image-side surface S17 is a concave surface at the circumference. An object-side surface S18 of the lens 8 L8 is a convex surface at the optical axis, and an image-side surface S19 is a convex surface at the optical axis. The object-side surface S18 is a convex surface at a circumference, and the image-side surface S19 is a convex surface at the circumference.

In conclusion, for details of concave/convex statuses of a surface of each of the eight lens devices in this embodiment at the optical axis and a circumference, refer to the following Table 9~Table 11.

Table 2a and Table 2b provide parameters such as curvature radiuses, intervals, refractive indexes (Nd), Abbe numbers, and focal lengths of the lenses and a filter 3 in the optical lens device 1 in the camera module 10 in the second embodiment. The intervals include thicknesses of the lenses and spacings between the lenses. A dispersion coefficient is the Abbe number. Table 2b shows aspherical coefficients of the lenses in the second embodiment.

In the second embodiment, an effective focal length f of the optical lens device 1 is equal to 14.95 mm, a combined focal length fg1 of a first lens group G1 is equal to 41.23 mm, an effective focal length fg2 of a second lens group G2 is equal to −24.64 mm, an aperture diaphragm FNO is equal to 2.01, a field of view FOV is equal to 27.0°, and a total track length TTL of the optical lens device 1 is equal to 25.4 mm. Parameters of the optical lens device 1 in the second embodiment meet relationships shown in Table 2c.

TABLE 2a

EFL = 14.95 FNO = 2.01 FOV = 27.0 TTL = 25.4

| Surface number | Surface name | Surface type | Curvature radius | Thickness | Refractive index | Abbe number | Focal length | Combined focal length |
|---|---|---|---|---|---|---|---|---|
| Object plane | Object plane | Spherical surface | Infinite | Infinite | | | | |
| 1 | L1 | Aspherical surface | −15.64 | −4.30 | 1.756 | 52.09 | 20.58 | 41.23 |
| 2 | | Spherical surface | Infinite | 4.20 | | | | |
| 3 | | Spherical surface | Infinite | 0.06 | | | | |
| 4 | L2 | Spherical surface | Infinite | 0.55 | 1.69 | 31.16 | −7.12 | |
| 5 | | Spherical surface | 4.94 | 0.95 | | | | |
| STO | Aperture diaphragm | Spherical surface | Infinite | −0.80 | | | | |
| 6 | L3 | Aspherical surface | 5.87 | 1.36 | 1.55 | 56.13 | 9.47 | |
| 7 | | Aspherical surface | −40.29 | 0.50 | | | | |
| 8 | L4 | Spherical surface | −57.92 | 0.00 | 1.679 | 19.24 | −24.64 | |
| 9 | | Spherical surface | −57.92 | 0.78 | | | | |
| 10 | | Spherical surface | −7.91 | 0.35 | 1.61 | 28.28 | | |
| 11 | | Spherical surface | 16.12 | 0.72 | | | | |
| 12 | L5 | Aspherical surface | 6.49 | 1.31 | 1.57 | 37.4 | 12.41 | |
| 13 | | Aspherical surface | 71.80 | 0.37 | | | | |
| 14 | L6 | Aspherical surface | −11.88 | 0.46 | 1.59 | 28.24 | −7.74 | |
| 15 | | Aspherical surface | 7.50 | 0.05 | | | | |
| 16 | L7 | Aspherical surface | 9.00 | 1.74 | 1.57 | 37.4 | 4.78 | |
| 17 | | Aspherical surface | −3.64 | 0.03 | | | | |
| 18 | L8 | Aspherical surface | 4.65 | 1.32 | 1.645 | 23.52 | −9.2 | |
| 19 | | Aspherical surface | 2.32 | 2.30 | | | | |
| 20 | Filter 3 | Spherical surface | Infinite | 0.21 | 1.52 | 64.17 | | |
| 21 | | Spherical surface | Infinite | 4.62 | | | | |
| Image plane | Image plane | Spherical surface | Infinite | 0.00 | | | | |

Note:
A reference wavelength is 546 nm

TABLE 2b

| Surface number | K | A4 | A6 | A8 | A10 |
|---|---|---|---|---|---|
| S1 | 7.52583E+00 | 3.85615E−04 | −5.25111E−06 | 2.27811E−06 | −2.44757E−07 |
| S6 | 9.59376E−01 | 8.78048E−05 | 4.35793E−05 | −1.55602E−05 | 3.07226E−06 |
| S7 | 0.00000E+00 | −3.06345E−04 | 5.31011E−05 | −1.94373E−05 | 4.02210E−06 |
| S12 | 0.00000E+00 | −5.00755E−04 | 1.60681E−04 | −4.60354E−05 | 0.00000E+00 |
| S13 | 0.00000E+00 | −1.22668E−03 | 8.20571E−04 | 6.96963E−05 | −9.04924E−05 |
| S14 | 0.00000E+00 | −2.05776E−03 | −4.61421E−06 | 3.63729E−04 | −1.26353E−04 |
| S15 | −9.26778E+00 | 2.66857E−03 | −1.82906E−03 | 4.85244E−04 | −5.60273E−05 |
| S16 | 0.00000E+00 | −4.64040E−04 | −1.96441E−04 | 1.72584E−04 | −3.06132E−05 |
| S17 | −4.98042E+00 | −1.33610E−03 | 6.23960E−04 | −1.07825E−04 | 6.98644E−06 |
| S18 | −1.04683E−03 | −3.65720E−03 | 9.62753E−04 | −3.03006E−04 | 3.37752E−05 |
| S19 | −4.20254E−01 | −2.51728E−02 | 4.41018E−03 | −9.90402E−04 | 1.12307E−04 |

| Surface number | A12 | A14 | A16 | A18 | A20 |
|---|---|---|---|---|---|
| S1 | 1.62356E−08 | −5.62909E−10 | 8.27448E−12 | 0.00000E+00 | 0.00000E+00 |
| S6 | −2.95218E−07 | 1.09068E−08 | 0.00000E+00 | 0.00000E+00 | 0.00000E+00 |
| S7 | −3.87569E−07 | 1.44571E−08 | 0.00000E+00 | 0.00000E+00 | 0.00000E+00 |
| S12 | 0.00000E+00 | 0.00000E+00 | 0.00000E+00 | 0.00000E+00 | 0.00000E+00 |
| S13 | 1.99858E−05 | −2.18415E−06 | 9.63898E−08 | 0.00000E+00 | 0.00000E+00 |
| S14 | 2.34276E−05 | −2.42956E−06 | 1.04768E−07 | 0.00000E+00 | 0.00000E+00 |
| S15 | 2.31808E−06 | 0.00000E+00 | 0.00000E+00 | 0.00000E+00 | 0.00000E+00 |
| S16 | 1.60252E−06 | 0.00000E+00 | 0.00000E+00 | 0.00000E+00 | 0.00000E+00 |
| S17 | −6.40253E−08 | 0.00000E+00 | 0.00000E+00 | 0.00000E+00 | 0.00000E+00 |
| S18 | −1.36579E−06 | 0.00000E+00 | 0.00000E+00 | 0.00000E+00 | 0.00000E+00 |
| S19 | −5.90427E−06 | 0.00000E+00 | 0.00000E+00 | 0.00000E+00 | 0.00000E+00 |

TABLE 2c

| | Parameter | | | | | | |
|---|---|---|---|---|---|---|---|
| | fg1/f | fg2/f | fg2/f' | TTL/f | AT34/AT45 | f/EPD | R2/R3 |
| Value | 2.76 | −1.65 | 5.57 | 1.70 | 0.69 | 2.01 | −0.82 |

Figure 8A:
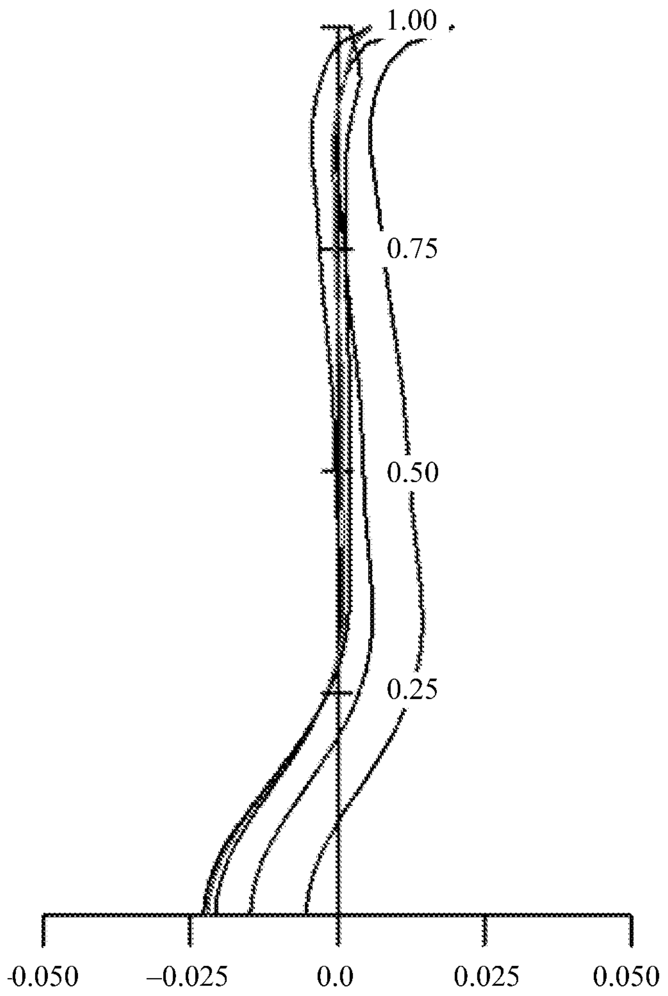
FIG. 8A is a simulation effect diagram 1 (a longitudinal spherical aberration graph) of an optical lens device according to a second embodiment of this application.
Figure 8B:
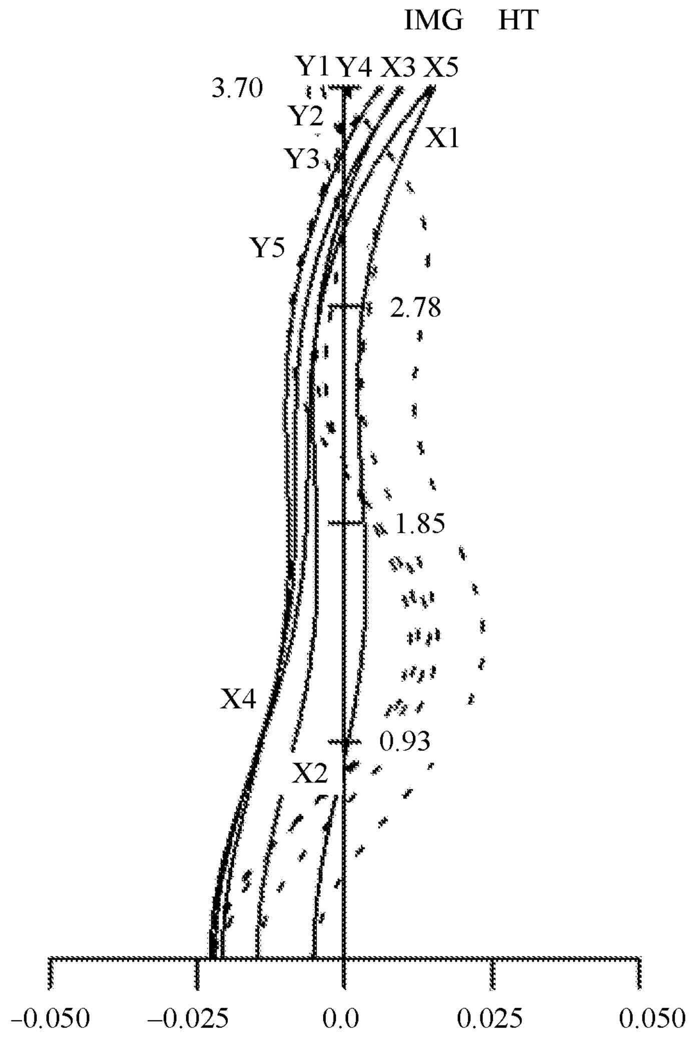
FIG. 8B is a simulation effect diagram 2 (a graph of astigmatic field curves) of an optical lens device according to a second embodiment of this application.
Figure 8C:
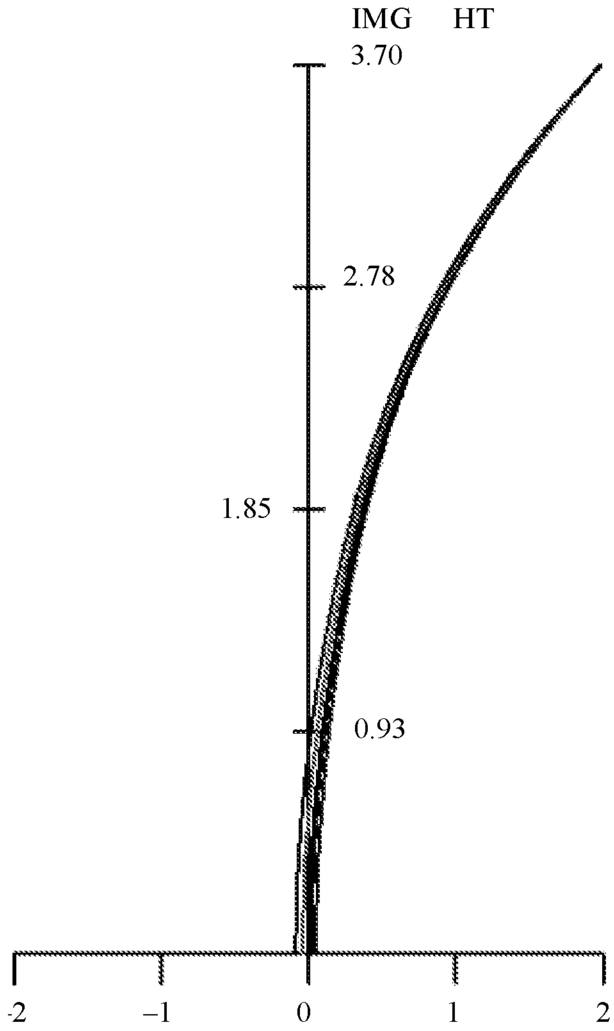
FIG. 8C is a simulation effect diagram 3 (a distortion graph) of an optical lens device according to a second embodiment of this application.

A schematic diagram of a structure of the optical lens device 1 in the second embodiment provided in FIG. 7 and simulation effect diagrams shown in FIG. 8A, FIG. 8B, and FIG. 8C that are obtained through simulation when main parameters of the optical lens device 1 in the second embodiment provided in Table 2a and Table 2b meet the relationships in Table 2c are used for reference. FIG. 8A, FIG. 8B, and FIG. 8C are respectively a longitudinal spherical aberration (Longitudinal Spherical Aberration) graph, a graph of astigmatic field curves (Astigmatic Field Curves), and a distortion (Distortion) graph of the optical lens device 1 in the second embodiment.

It can be learned from the longitudinal spherical aberration graph in FIG. 8A that in the optical lens device 1 in the second embodiment, a degree of deviation of a convergence focal point of light of each wavelength and a deviation from an ideal image plane fall within quite small ranges, and spherical aberration in an imaged picture is better corrected. It can be learned from the graph of astigmatic field curves and the distortion graph in FIG. 8B and FIG. 8C that both sagittal curvature of field and tangential curvature of field are controlled to be within relatively small ranges, reflecting that bending of an image plane is better controlled. It can be learned from the distortion graph in FIG. 8C that distortion of the optical lens device 1 in the second embodiment is relatively small, which means that deformation of an image caused by a main light beam is relatively small, and an imaging distortion effect is low. In conclusion, the optical lens device 1 in the second embodiment achieves a long-focus characteristic, structure miniaturization, and high imaging quality.

FIG. 9, FIG. 10A, FIG. 10B, and FIG. 10C are schematic diagrams of structures and simulation effect diagrams of an optical lens device 1 in a camera module 10 in a third embodiment.

Figure 9:
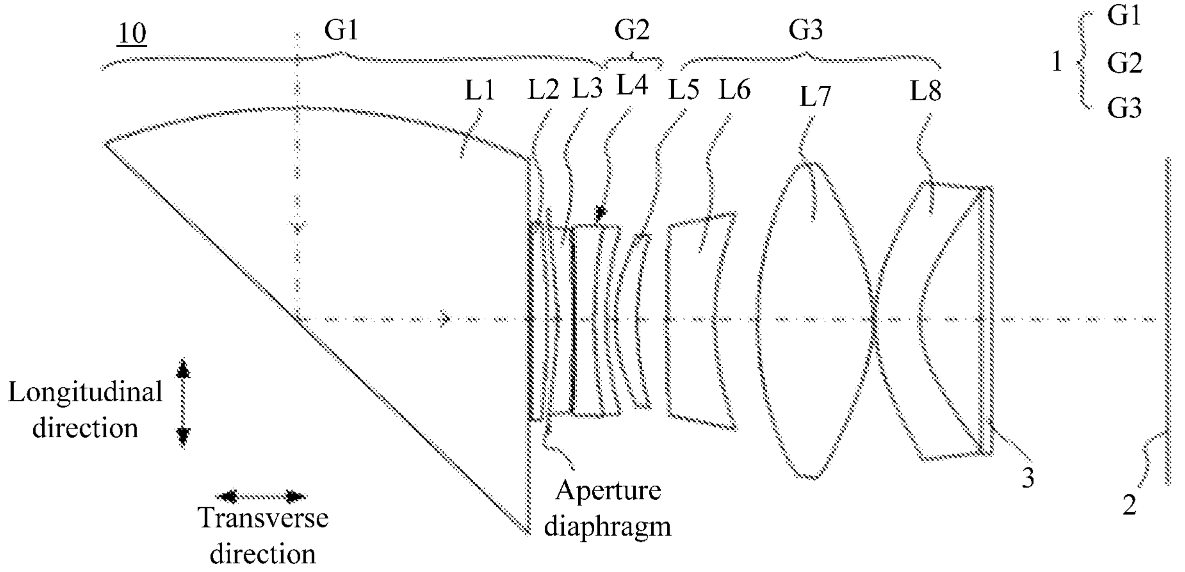
FIG. 9 is a schematic diagram of a structure of an optical lens device according to a third embodiment of this application.

As shown in FIG. 9, in the third embodiment, the optical lens device 1 includes a lens 1 L1 with positive focal power, a lens 2 L2 with positive focal power, a lens 3 L3 with negative focal power, a lens 4 L4 with negative focal power, a lens 5 L5 with positive focal power, a lens 6 L6 with negative focal power, a lens 7 L7 with positive focal power, and a lens 8 L8 with negative focal power that are arranged from an object side to an image side.

An object-side surface S1 of the lens 1 L1 protrudes toward an image side at an optical axis (briefly referred to as a concave surface), a reflective surface S2 is a plane at the optical axis, and an image-side surface S3 is a plane at the optical axis. The object-side surface S1 protrudes toward an object side at a circumference (briefly referred to as a convex surface), the reflective surface S2 is a plane at the circumference, and the image-side surface S3 is a plane at the circumference.

An object-side surface S4 of the lens 2 L2 is a concave surface at the optical axis, and an image-side surface S5 is a concave surface at the optical axis. The object-side surface S4 is a concave surface at a circumference, and the image-side surface S5 is a concave surface at the circumference. An object-side surface S6 of the lens 3 L3 is a concave surface at the optical axis, and an image-side surface S7 is a concave surface at the optical axis. The object-side surface S6 is a convex surface at a circumference, and the image-side surface S7 is a concave surface at the circumference. An object-side surface S8 of the lens 4 L4 is a concave surface at the optical axis, and an image-side surface S11 is a convex surface at the optical axis. The object-side surface S8 is a concave surface at a circumference, and the image-side surface S11 is a convex surface at the circumference. An object-side surface S12 of the lens 5 L5 is a convex surface at the optical axis, and an image-side surface S13 is a convex surface at the optical axis. The object-side surface S12 is a convex surface at a circumference, and the image-side surface S13 is a concave surface at the circumference. An object-side surface S14 of the lens 6 L6 is a convex surface at the optical axis, and an image-side surface S15 is a convex surface at the optical axis. The object-side surface S14 is a concave surface at a circumference, and the image-side surface S15 is a convex surface at the circumference. An object-side surface S16 of the lens 7 L7 is a convex surface at the optical axis, and an image-side surface S17 is a concave surface at the optical axis. The object-side surface S16 is a convex surface at a circumference, and the image-side surface S17 is a concave surface at the circumference. An object-side surface S18 of the lens 8 L8 is a convex surface at the optical axis, and an image-side surface S19 is a convex surface at the optical axis. The object-side surface S18 is a convex surface at a circumference, and the image-side surface S19 is a convex surface at the circumference.

In conclusion, for details of concave/convex statuses of a surface of each of the eight lens devices in this embodiment at the optical axis and a circumference, refer to the following Table 9~Table 11.

Table 3a and Table 3b provide parameters such as curvature radiuses, intervals, refractive indexes (Nd), Abbe numbers, and focal lengths of the lenses and a filter 3 in the optical lens device 1 in the camera module 10 in the third embodiment. The intervals include thicknesses of the lenses and spacings between the lenses. A dispersion coefficient is the Abbe number. Table 3b shows aspherical coefficients of the lenses in the third embodiment.

In the third embodiment, an effective focal length f of the optical lens device 1 is equal to 14.93 mm, a combined focal length fg1 of a first lens group G1 is equal to 15.97 mm, an effective focal length fg2 of a second lens group G2 is equal to −7.58 mm, an aperture diaphragm FNO is equal to 2.0, a field of view FOV is equal to 26.2°, and a total track length TTL of the optical lens device 1 is equal to 23-3 mm.

Parameters of the optical lens device 1 in the third embodiment meet relationships shown in Table 3c.

TABLE 3a

EFL = 14.93 FNO = 2.0 FOV = 26.2 TTL = 23.3

| Surface number | Surface name | Surface type | Curvature radius | Thickness | Refractive index | Abbe number | Focal length | Combined focal length |
|---|---|---|---|---|---|---|---|---|
| Object plane | Object plane | Spherical surface | Infinite | Infinite | | | | |
| 1 | L1 | Aspherical surface | −10.64 | −4.90 | 1.76 | 51.17 | 14.01 | 15.97 |
| 2 | | Spherical surface | Infinite | 4.90 | | | | |
| 3 | | Spherical surface | Infinite | 0.07 | | | | |
| 4 | L2 | Spherical surface | −128.04 | 0.32 | 1.69 | 31.16 | 38.79 | |
| 5 | | Spherical surface | −22.27 | 0.05 | | | | |
| STO | Aperture diaphragm | Spherical surface | Infinite | 0.16 | | | | |
| 6 | L3 | Aspherical surface | −10.26 | 0.34 | 1.55 | 56.13 | − 24.08 | |
| 7 | | Aspherical surface | −47.03 | 0.06 | | | | |
| 8 | L4 | Spherical surface | −48.88 | 0.40 | 1.96 | 17.94 | −7.58 | |
| 9 | | Spherical surface | 12.92 | 0.00 | | | | |
| 10 | | Spherical surface | 12.92 | 0.25 | 1.69 | 31.16 | | |
| 11 | | Spherical surface | 7.63 | 0.20 | | | | |
| 12 | L5 | Aspherical surface | 4.20 | 0.46 | 1.57 | 37.4 | 13.38 | |
| 13 | | Aspherical surface | 8.97 | 0.64 | | | | |
| 14 | L6 | Aspherical surface | 53.58 | 1.00 | 1.59 | 28.24 | −11.81 | |
| 15 | | Aspherical surface | 6.12 | 0.92 | | | | |
| 16 | L7 | Aspherical surface | 8.67 | 2.43 | 1.57 | 37.4 | 4.97 | |
| 17 | | Aspherical surface | 1−3.78 | 0.05 | | | | |
| 18 | L8 | Aspherical surface | 4.05 | 0.95 | 1.645 | 23.52 | −11.62 | |
| 19 | | Aspherical surface | 2.39 | 2.30 | | | | |

TABLE 3a-continued

| EFL = 14.93 FNO = 2.0 FOV = 26.2 TTL = 23.3 | | | | | | | | |
|---|---|---|---|---|---|---|---|---|
| Surface number | Surface name | Surface type | Curvature radius | Thickness | Refractive index | Abbe number | Focal length | Combined focal length |
| 20 | Filter 3 | Spherical surface | Infinite | 0.21 | 1.52 | 64.17 | | |
| 21 | | Spherical surface | Infinite | 2.74 | | | | |
| Image plane | Image plane | Spherical surface | Infinite | 0.00 | | | | |

Note:
A reference wavelength is 546 nm

TABLE 3b

| Surface number | K | A4 | A6 | A8 | A10 |
|---|---|---|---|---|---|
| S1 | 0.00000E+00 | −6.44899E−16 | 1.68830E−06 | −1.68181E−07 | 7.89798E−09 |
| S6 | −1.79217E+01 | 1.84981E−03 | −4.83898E−04 | 5.64848E−05 | −1.16301E−05 |
| S7 | 0.00000E+00 | 1.41498E−03 | −1.93230E−04 | −9.58529E−05 | −5.78620E−06 |
| S12 | 0.00000E+00 | −2.18734E−03 | 2.24872E−04 | −1.00042E−04 | −1.12092E−06 |
| S13 | 0.00000E+00 | 2.04323E−03 | −1.83910E−04 | −1.73730E−05 | 1.81351E−04 |
| S14 | 0.00000E+00 | −3.77514E−03 | 8.71544E−04 | −7.50818E−04 | 6.19479E−04 |
| S15 | −6.51080E+00 | −1.77187E−03 | 7.87436E−04 | −4.31040E−05 | −1.57404E−05 |
| S16 | 0.00000E+00 | −2.41183E−03 | 1.13324E−03 | −1.96775E−04 | 1.54615E−05 |
| S17 | −4.60844E+00 | 9.99907E−05 | 2.17765E−04 | −8.13615E−05 | 9.60320E−06 |
| S18 | −1.05825E−01 | −7.02647E−03 | 1.71441E−03 | −4.01372E−04 | 4.07631E−05 |
| S19 | −4.76346E−01 | −2.48897E−02 | 4.63622E−03 | −9.40062E−04 | 9.67798E−05 |

| Surface number | A12 | A14 | A16 | A18 | A20 |
|---|---|---|---|---|---|
| S1 | −1.41982E−10 | 4.43184E−13 | 0.00000E+00 | 0.00000E+00 | 0.00000E+00 |
| S6 | 3.69714E−06 | −3.20780E−07 | 0.00000E+00 | 0.00000E+00 | 0.00000E+00 |
| S7 | 9.84346E−06 | −1.03848E−06 | 0.00000E+00 | 0.00000E+00 | 0.00000E+00 |
| S12 | 2.07430E−07 | −1.30412E−06 | 0.00000E+00 | 0.00000E+00 | 0.00000E+00 |
| S13 | −5.71559E−05 | 3.27626E−06 | 4.27806E−08 | 0.00000E+00 | 0.00000E+00 |

| Surface number | K | A4 | A6 | A8 | A10 |
|---|---|---|---|---|---|
| S14 | −1.98568E−04 | 2.97957E−05 | −1.81169E−06 | 0.00000E+00 | 0.00000E+00 |
| S15 | 1.84559E−06 | 0.00000E+00 | 0.00000E+00 | 0.00000E+00 | 0.00000E+00 |
| S16 | −4.42189E−07 | 0.00000E+00 | 0.00000E+00 | 0.00000E+00 | 0.00000E+00 |
| S17 | −3.70780E−07 | 0.00000E+00 | 0.00000E+00 | 0.00000E+00 | 0.00000E+00 |
| S18 | −1.56504E−06 | 0.00000E+00 | 0.00000E+00 | 0.00000E+00 | 0.00000E+00 |
| S19 | −4.30181E−06 | 0.00000E+00 | 0.00000E+00 | 0.00000E+00 | 0.00000E+00 |

TABLE 3c

| | Parameter | | | | | | |
|---|---|---|---|---|---|---|---|
| | fg1/f | fg2/f | fg2/f | TTL/f | AT34/AT45 | f/EPD | R2/R3 |
| Value | 1.07 | −0.51 | 1.14 | 1.56 | 0.28 | 2.00 | 12.21 |

Figure 10A:
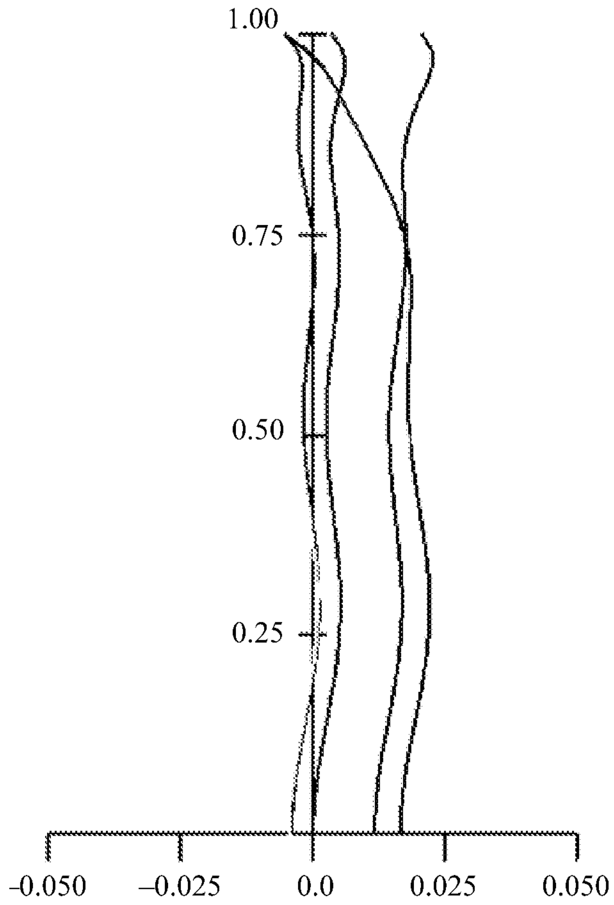
FIG. 10A is a simulation effect diagram 1 (a longitudinal spherical aberration graph) of an optical lens device according to a third embodiment of this application.
Figure 10B:
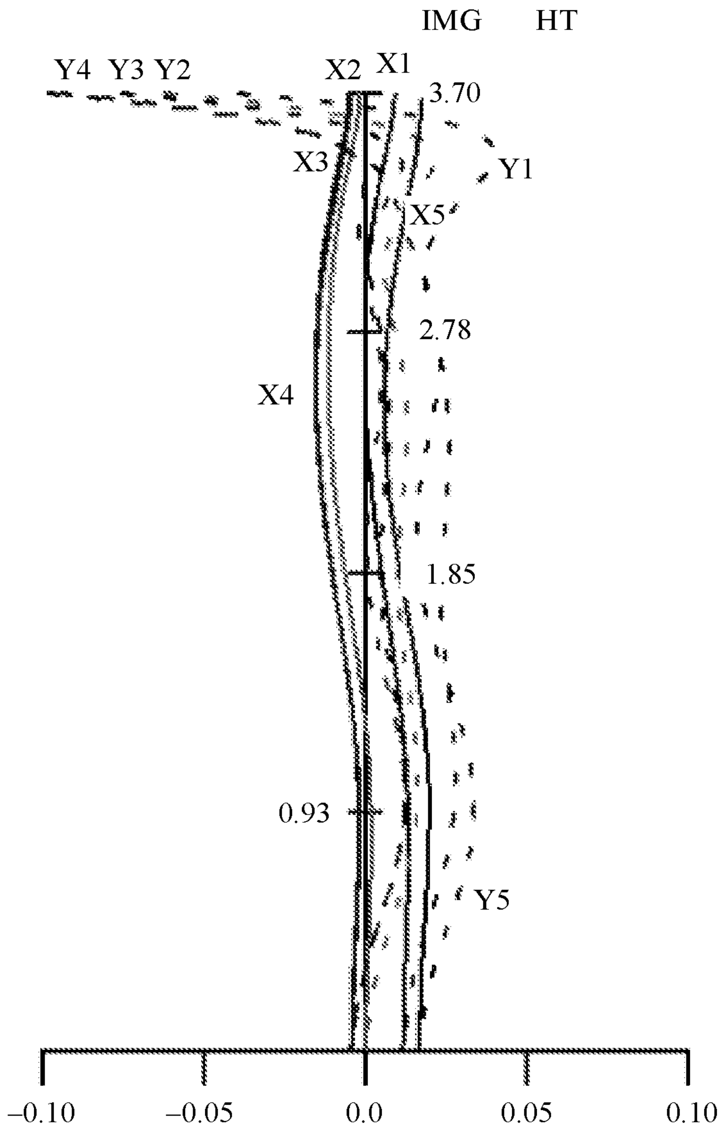
FIG. 10B is a simulation effect diagram 2 (a graph of astigmatic field curves) of an optical lens device according to a third embodiment of this application.
Figure 10C:
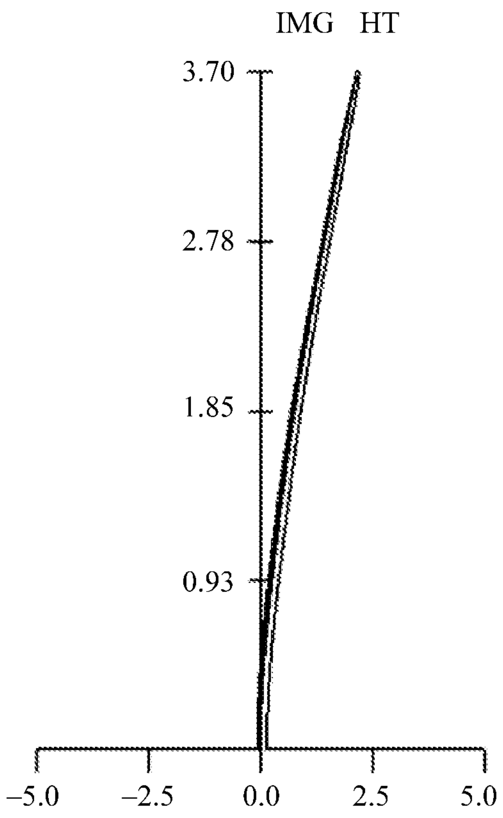
FIG. 10C is a simulation effect diagram 3 (a distortion graph) of an optical lens device according to a third embodiment of this application.

A schematic diagram of a structure of the optical lens device 1 in the third embodiment provided in FIG. 9 and simulation effect diagrams shown in FIG. 10A, FIG. 10B, and FIG. 10C that are obtained through simulation when main parameters of the optical lens device 1 in the third embodiment provided in Table 3a and Table 3b meet the relationships in Table 3c are used for reference. FIG. 10A, FIG. 10B, and FIG. 10C are respectively a longitudinal spherical aberration (Longitudinal Spherical Aberration) graph, a graph of astigmatic field curves (Astigmatic Field Curves), and a distortion (Distortion) graph of the optical lens device 1 in the third embodiment.

It can be learned from the longitudinal spherical aberration graph in FIG. 10A that in the optical lens device 1 in the third embodiment, a degree of deviation of a convergence focal point of light of each wavelength and a deviation from an ideal image plane fall within quite small ranges, and spherical aberration in an imaged picture is better corrected. It can be learned from the graph of astigmatic field curves and the distortion graph in FIG. 10B and FIG. 10C that both sagittal curvature of field and tangential curvature of field are controlled to be within relatively small ranges, reflecting that bending of an image plane is better controlled. It can be learned from the distortion graph in FIG. 10C that distortion of the optical lens device 1 in the third embodiment is relatively small, which means that deformation of an image caused by a main light beam is relatively small, and an imaging distortion effect is low. In conclusion, the optical lens device 1 in the third embodiment achieves a long-focus characteristic, structure miniaturization, and high imaging quality.

FIG. 11, FIG. 12A, FIG. 12B, and FIG. 12C are schematic diagrams of structures and simulation effect diagrams of an optical lens device 1 in a camera module 10 in a fourth embodiment. In the fourth embodiment, the optical lens device 1 includes a lens 1 L1 with positive focal power, a lens 2 L2 with negative focal power, a lens 3 L3 with positive focal power, a lens 4 L4 with negative focal power, a lens 5 L5 with positive focal power, a lens 6 L6 with negative focal power, a lens 7 L7 with positive focal power, and a lens 8 L8 with negative focal power that are arranged from an object side to an image side.

An object-side surface S1 of the lens 1 L1 protrudes toward an image side at an optical axis (briefly referred to as a concave surface), a reflective surface S2 is a plane at the optical axis, and an image-side surface S3 is a plane at the optical axis. The object-side surface S1 protrudes toward an object side at a circumference (briefly referred to as a convex surface), the reflective surface S2 is a plane at the circumference, and the image-side surface S3 is a plane at the circumference. An object-side surface S4 of the lens 2 L2 is a convex surface at the optical axis, and an image-side surface S5 is a convex surface at the optical axis. The object-side surface S4 is a convex surface at a circumference, and the image-side surface S5 is a convex surface at the circumference. An object-side surface S6 of the lens 3 L3 is a convex surface at the optical axis, and an image-side surface S7 is a concave surface at the optical axis. The object-side surface S6 is a convex surface at a circumference, and the image-side surface S7 is a concave surface at the circumference.

An object-side surface S8 of the lens 4 L4 is a concave surface at the optical axis, and an image-side surface S11 is a convex surface at the optical axis. The object-side surface S8 is a concave surface at a circumference, and the image-side surface S11 is a convex surface at the circumference. An object-side surface S12 of the lens 5 L5 is a convex surface at the optical axis, and an image-side surface S13 is a convex surface at the optical axis. The object-side surface S12 is a convex surface at a circumference, and the image-side surface S13 is a convex surface at the circumference. An object-side surface S14 of the lens 6 L6 is a concave surface at the optical axis, and an image-side surface S15 is a convex surface at the optical axis. The object-side surface S14 is a concave surface at a circumference, and the image-side surface S15 is a convex surface at the circumference. An object-side surface S16 of the lens 7 L7 is a concave surface at the optical axis, and an image-side surface S17 is a concave surface at the optical axis. The object-side surface S16 is a concave surface at a circumference, and the image-side surface S17 is a concave surface at the circumference. An object-side surface S18 of the lens 8 L8 is a convex surface at the optical axis, and an image-side surface S19 is a convex surface at the optical axis. The object-side surface S18 is a convex surface at a circumference, and the image-side surface S19 is a convex surface at the circumference.

In conclusion, for details of concave/convex statuses of a surface of each of the eight lens devices in this embodiment at the optical axis and a circumference, refer to the following Table 9~Table 11.

Table 4a and Table 4b provide parameters such as curvature radiuses, intervals, refractive indexes (Nd), Abbe numbers, and focal lengths of the lenses and a filter 3 in the optical lens device 1 in the camera module 10 in the fourth embodiment. The intervals include thicknesses of the lenses and spacings between the lenses. A dispersion coefficient is the Abbe number. Table 4b shows aspherical coefficients of the lenses in the fourth embodiment.

In the fourth embodiment, an effective focal length f of the optical lens device 1 is equal to 14.95 mm, a combined focal length fg1 of a first lens group G1 is equal to 20.65 mm, an effective focal length fg2 of a third lens group G3 is equal to −8.84 mm, an aperture diaphragm FNO is equal to 2.0, a field of view FOV is equal to 27.0°, and a total track length TTL of the optical lens device 1 is equal to 24.4 mm.

The optical lens device 1 in the fourth embodiment mainly differs from the optical lens devices 1 in the first embodiment to the third embodiment in that parameters of the optical lens device 1 in the fourth embodiment meet relationships shown in Table 4c.

TABLE 4a

EFL = 15.2 FNO = 2.0 FOV = 26.7 TTL = 24.4

| Surface number | Surface name | Surface type | Curvature radius | Thickness | Refractive index | Abbe number | Focal length | Combined focal length |
|---|---|---|---|---|---|---|---|---|
| Object plane | Object plane | Spherical surface | Infinite | Infinite | | | | |
| 1 | L1 | Aspherical surface | −12.51 | −4.90 | 1.76 | 51.17 | 16.47 | 20.65 |
| 2 | | Spherical surface | Infinite | 4.90 | | | | |
| 3 | | Spherical surface | Infinite | 0.05 | | | | |
| 4 | L2 | Spherical surface | 89.60 | 0.31 | 1.69 | 31.16 | −9.15 | |
| 5 | | Spherical surface | 5.92 | 0.62 | | | | |
| STO | Aperture diaphragm | Spherical surface | Infinite | −0.45 | | | | |
| 6 | L3 | Aspherical surface | 9.12 | 0.92 | 1.55 | 56.13 | 11.14 | |
| 7 | | Aspherical surface | −17.63 | 0.20 | | | | |
| 8 | L4 | Spherical surface | −20.76 | 0.32 | 1.96 | 17.94 | −8.84 | |
| 9 | | Spherical surface | −12.25 | 0.00 | | | | |

TABLE 4a-continued

EFL = 15.2 FNO = 2.0 FOV = 26.7 TTL = 24.4

| Surface number | Surface name | Surface type | Curvature radius | Thickness | Refractive index | Abbe number | Focal length | Combined focal length |
|---|---|---|---|---|---|---|---|---|
| 10 | | Spherical surface | −12.25 | 0.29 | 1.69 | 31.16 | | |
| 11 | | Spherical surface | 7.92 | 0.29 | | | | |
| 12 | L5 | Aspherical surface | 3.72 | 0.86 | 1.57 | 37.4 | 6.81 | |
| 13 | | Aspherical surface | 79.12 | 0.44 | | | | |
| 14 | L6 | Aspherical surface | −6.37 | 0.92 | 1.59 | 28.24 | −9.09 | |
| 15 | | Aspherical surface | 35.41 | 0.87 | | | | |
| 16 | L7 | Aspherical surface | −20.89 | 1.00 | 1.57 | 37.4 | 6.46 | |
| 17 | | Aspherical surface | −3.19 | 0.05 | | | | |
| 18 | L8 | Aspherical surface | 9.96 | 0.89 | 1.645 | 23.52 | −16.73 | |
| 19 | | Aspherical surface | 5.00 | 230 | | | | |
| 20 | Filter 3 | Spherical surface | Infinite | 0.21 | 1.52 | 64.17 | | |
| 21 | | Spherical surface | Infinite | 4.53 | | | | |
| Image plane | Image plane | Spherical surface | Infinite | 0.00 | | | | |

Note:
A reference wavelength is 546 nm

TABLE 4b

| Surface number | K | A4 | A6 | A8 | A10 |
|---|---|---|---|---|---|
| S1 | 0.00000E+00 | 1.06786E−04 | −2.57243E−05 | 6.36269E−06 | −8.92174E−07 |
| S6 | 0.00000E+00 | 2.14126E−03 | 9.45234E−04 | −6.76209E−04 | 2.88866E−04 |
| S7 | 0.00000E+00 | −9.49419E−04 | 1.38108E−03 | −6.69634E−04 | 1.44432E−04 |
| S12 | 0.00000E+00 | −2.39324E−03 | 1.80719E−04 | 1.66025E−04 | −2.53664E−04 |
| S13 | 0.00000E+00 | 4.08280E−03 | −2.43036E−03 | 1.79134E−03 | −7.83644E−04 |
| S14 | 0.00000E+00 | −2.45722E−03 | −1.51940E−03 | 1.38429E−03 | −3.52295E−04 |
| S15 | 0.00000E+00 | −7.80657E−03 | 8.85436E−04 | 5.42126E−04 | −2.70122E−04 |
| S16 | 0.00000E+00 | −6.30962E−04 | −3.13142E−04 | 8.41737E−04 | −3.85879E−04 |
| S17 | 0.00000E+00 | 1.60770E−02 | −5.75985E−03 | 4.17388E−03 | −1.91587E−03 |
| S18 | 0.00000E+00 | −1.00103E−02 | 3.47756E−03 | −1.16516E−03 | 2.19296E−04 |
| S19 | −1.00000E+00 | −2.14793E−02 | 6.08344E−03 | −1.54057E−03 | 2.79395E−04 |

| Surface number | A12 | A14 | A16 | A18 | A20 |
|---|---|---|---|---|---|
| S1 | 7.48516E−08 | −3.78894E−09 | 1.11067E−10 | −1.66760E−12 | 9.01652E−15 |
| S6 | −8.33870E−05 | 1.48374E−05 | −1.42492E−06 | 5.70040E−08 | 0.00000E+00 |
| S7 | −1.68734E−05 | 1.16265E−06 | −3.36774E−08 | 0.00000E+00 | 0.00000E+00 |
| S12 | 1.12902E−04 | −2.71204E−05 | 2.97031E−06 | −1.36239E−07 | 0.00000E+00 |
| S13 | 2.33302E−04 | −4.14299E−05 | 2.80532E−06 | 0.00000E+00 | 0.00000E+00 |
| S14 | 7.44551E−05 | −2.79751E−05 | 8.93037E−06 | −1.48409E−06 | 9.54672E−08 |
| S15 | 4.76010E−05 | −3.79979E−06 | 3.08642E−07 | −5.26799E−08 | 3.74273E−09 |
| S16 | 8.13396E−05 | −8.68948E−06 | 4.02648E−07 | 3.65293E−10 | −4.46478E−10 |
| S17 | 5.30424E−04 | −8.93047E−05 | 8.99688E−06 | −4.99179E−07 | 1.17640E−08 |
| S18 | −1.96978E−05 | −1.37081E−08 | 1.37776E−07 | −7.78699E−09 | 4.89299E−11 |
| S19 | −3.07762E−05 | 8.98312E−07 | 2.29828E−07 | −2.84425E−08 | 1.01366E−09 |

TABLE 4c

| | Parameter | | | | | | |
|---|---|---|---|---|---|---|---|
| | fg1/f | fg2/f | fg2/f | TTL/f | AT34/AT45 | f/TEPD | R2/R3 |
| Value | 1.36 | −0.58 | 0.86 | 1.61 | 0.68 | 2.00 | −1.21 |

Figure 11:
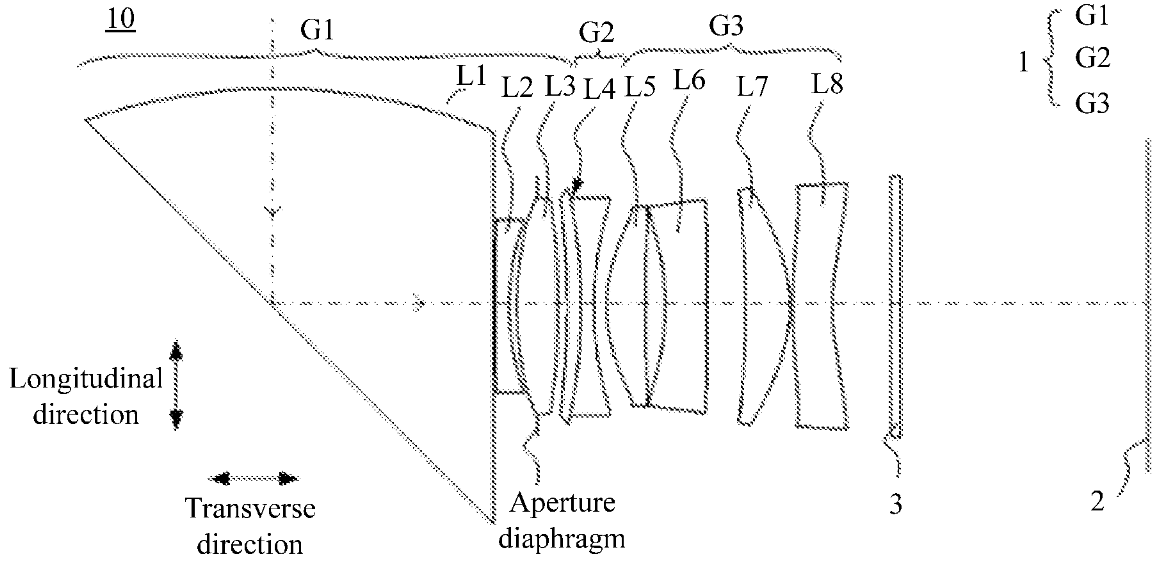
FIG. 11 is a schematic diagram of a structure of an optical lens device according to a fourth embodiment of this application.
Figure 12A:
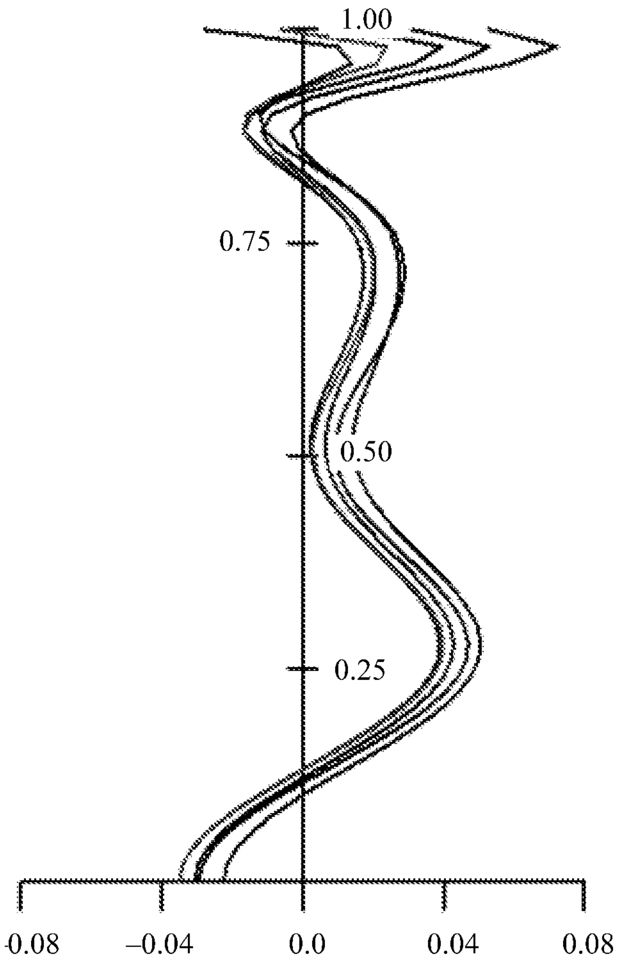
FIG. 12A is a simulation effect diagram 1 (a longitudinal spherical aberration graph) of an optical lens device according to a fourth embodiment of this application.
Figure 12B:
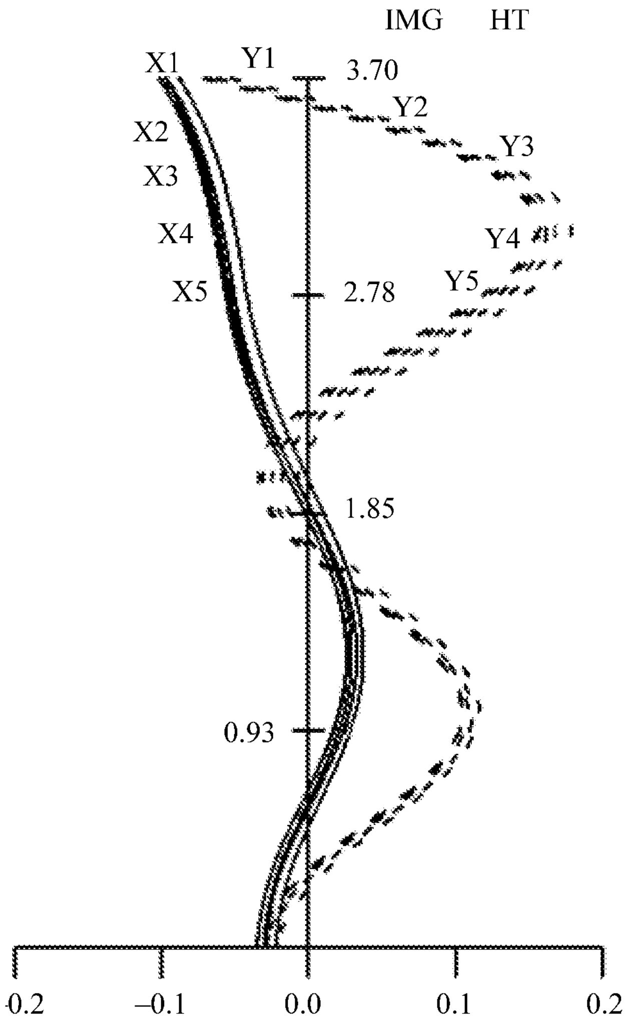
FIG. 12B is a simulation effect diagram 2 (a graph of astigmatic field curves) of an optical lens device according to a fourth embodiment of this application.
Figure 12C:
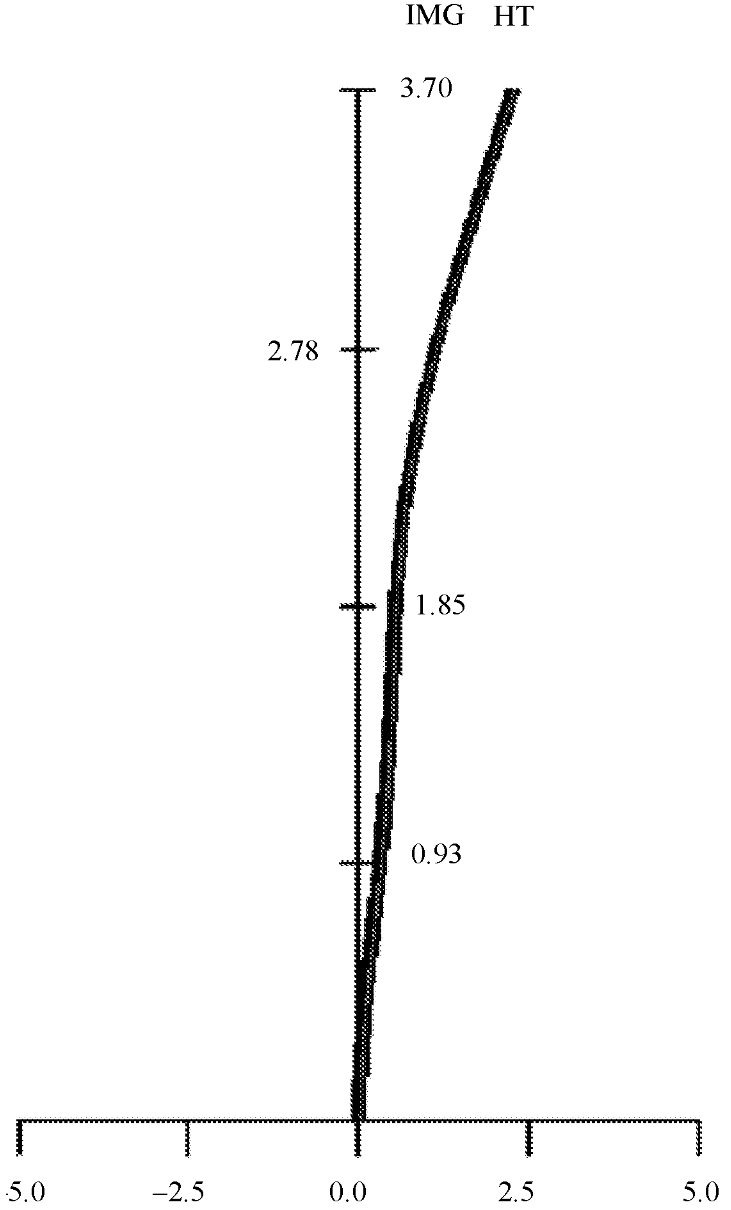
FIG. 12C is a simulation effect diagram 3 (a distortion graph) of an optical lens device according to a fourth embodiment of this application.

A schematic diagram of a structure of the optical lens device 1 in the fourth embodiment provided in FIG. 11 and simulation effect diagrams shown in FIG. 12A, FIG. 12B, and FIG. 12C that are obtained through simulation when main parameters of the optical lens device 1 in the fourth embodiment provided in Table 4a and Table 4b meet the relationships in Table 2c are used for reference. FIG. 12A, FIG. 12B, and FIG. 12C are respectively a longitudinal spherical aberration (Longitudinal Spherical Aberration) graph, a graph of astigmatic field curves (Astigmatic Field Curves), and a distortion (Distortion) graph of the optical lens device 1 in the second embodiment.

It can be learned from the longitudinal spherical aberration graph in FIG. 12A that in the optical lens device 1 in the fourth embodiment, a degree of deviation of a convergence focal point of light of each wavelength and a deviation from an ideal image plane fall within quite small ranges, and spherical aberration in an imaged picture is better corrected. It can be learned from the graph of astigmatic field curves and the distortion graph in FIG. 12B and FIG. 12C that both sagittal curvature of field and tangential curvature of field are controlled to be within relatively small ranges, reflecting that bending of an image plane is better controlled. It can be learned from the distortion graph in FIG. 12C that distortion of the optical lens device 1 in the fourth embodiment is relatively small, which means that deformation of an image caused by a main light beam is relatively small, and an imaging distortion effect is low. In conclusion, the optical lens device 1 in the fourth embodiment achieves a long-focus characteristic, structure miniaturization, and high imaging quality.

FIG. 13, FIG. 14A, FIG. 14B, and FIG. 14C are schematic diagrams of structures and simulation effect diagrams of an optical lens device in a camera module 10 in a fifth embodiment.

Figure 13:
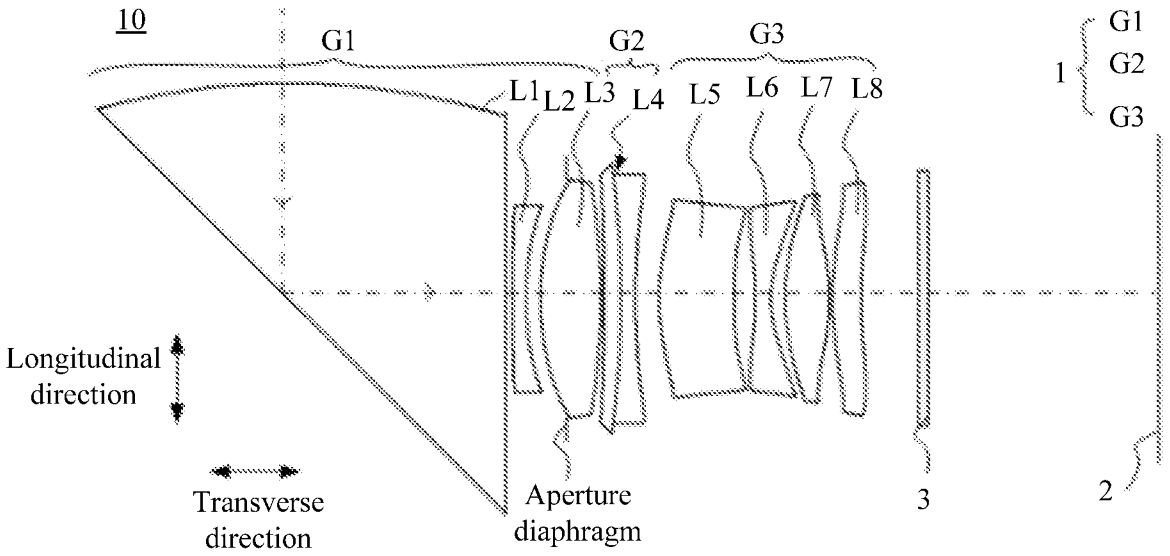
FIG. 13 is a schematic diagram of a structure of an optical lens device according to a fifth embodiment of this application.

As shown in FIG. 13, in the fifth embodiment, the optical lens device 1 includes a lens 1 L1 with positive focal power, a lens 2 L2 with negative focal power, a lens 3 L3 with positive focal power, a lens 4 L4 with negative focal power, a lens 5 L5 with positive focal power, a lens 6 L6 with negative focal power, a lens 7 L7 with positive focal power, and a lens 8 L8 with positive focal power that are arranged from an object side to an image side.

An object-side surface S1 of the lens 1 L1 protrudes toward an image side at an optical axis (briefly referred to as a concave surface), a reflective surface S2 is a plane at the optical axis, and an image-side surface S3 is a plane at the optical axis. The object-side surface S1 protrudes toward an object side at a circumference (briefly referred to as a convex surface), the reflective surface S2 is a plane at the circumference, and the image-side surface S3 is a plane at the circumference.

An object-side surface S4 of the lens 2 L2 is a convex surface at the optical axis, and an image-side surface S5 is a convex surface at the optical axis. The object-side surface S4 is a convex surface at a circumference, and the image-side surface S5 is a convex surface at the circumference. An object-side surface S6 of the lens 3 L3 is a convex surface at the optical axis, and an image-side surface S7 is a concave surface at the optical axis. The object-side surface S6 is a convex surface at a circumference, and the image-side surface S7 is a concave surface at the circumference. An object-side surface S8 of the lens 4 L4 is a concave surface at the optical axis, and an image-side surface S11 is a convex surface at the optical axis. The object-side surface S8 is a concave surface at a circumference, and the image-side surface S11 is a convex surface at the circumference. An object-side surface S12 of the lens 5 L5 is a convex surface at the optical axis, and an image-side surface S13 is a convex surface at the optical axis. The object-side surface S12 is a convex surface at a circumference, and the image-side surface S13 is a convex surface at the circumference. An object-side surface S14 of the lens 6 L6 is a concave surface at the optical axis, and an image-side surface S15 is a convex surface at the optical axis. The object-side surface S14 is a concave surface at a circumference, and the image-side surface S15 is a convex surface at the circumference. An object-side surface S16 of the lens 7 L7 is a concave surface at the optical axis, and an image-side surface S17 is a concave surface at the optical axis. The object-side surface S16 is a concave surface at a circumference, and the image-side surface S17 is a concave surface at the circumference. An object-side surface S18 of the lens 8 L8 is a convex surface at the optical axis, and an image-side surface S19 is a convex surface at the optical axis. The object-side surface S18 is a convex surface at a circumference, and the image-side surface S19 is a convex surface at the circumference.

In conclusion, for details of concave/convex statuses of a surface of each of the eight lens devices in this embodiment at the optical axis and a circumference, refer to the following Table 9~Table 11.

Table 5a and Table 5b provide parameters such as curvature radiuses, intervals, refractive indexes (Nd), Abbe numbers, and focal lengths of the lenses and a filter 3 in the optical lens device 1 in the camera module 10 in the fifth embodiment. The intervals include thicknesses of the lenses and spacings between the lenses. A dispersion coefficient is the Abbe number. Table 5b shows aspherical coefficients of the lenses in the fifth embodiment.

In the fifth embodiment, an effective focal length f of the optical lens device 1 is equal to 15.1 mm, a combined focal length fg1 of a first lens group G1 is equal to 14.63 mm, an effective focal length fg2 of a second lens group G2 is equal to −23.05 mm, an aperture diaphragm FNO is equal to 2.01, a field of view FOV is equal to 26.8°, and a total track length TTL of the optical lens device 1 is equal to 24.5 mm. Parameters of the optical lens device 1 in the fifth embodiment meet relationships shown in Table 5c.

TABLE 5a

| EFL = 15.1 FNO = 2.01 FOV = 26.8 TTL = 24.5 | | | | | | | | |
|---|---|---|---|---|---|---|---|---|
| Surface number | Surface name | Surface type | Curvature radius | Thickness | Refractive index | Abbe number | Focal length | Combined length focal |
| Object plane | Object plane | Spherical surface | Infinite | Infinite | | | | |
| 1 | L1 | Aspherical surface | −15.44 | −4.90 | 1.76 | 51.17 | 20.32 | 14.63 |
| 2 | | Spherical surface | Infinite | 4.90 | | | | |
| 3 | | Spherical surface | Infinite | 0.12 | | | | |
| 4 | L2 | Spherical surface | 40.53 | 0.31 | 1.69 | 31.16 | −11.04 | |
| 5 | | Spherical surface | 6.42 | 0.92 | | | | |
| STO | Aperture diaphragm | Spherical surface | Infinite | −0.58 | | | | |
| 6 | L3 | Aspherical surface | 6.48 | 1.37 | 1.55 | 56.13 | 8.60 | |
| 7 | | Aspherical surface | −15.89 | 0.07 | | | | |
| 8 | L4 | Spherical surface | −63.50 | 0.38 | 1.96 | 17.94 | −23.05 | |
| 9 | | Spherical surface | −23.26 | 0.00 | | | | |
| 10 | | Spherical surface | −23.26 | 0.33 | 1.69 | 31.16 | | |
| 11 | | Spherical surface | 17.56 | 0.54 | | | | |
| 12 | L5 | Aspherical surface | 5.57 | 1.68 | 1.57 | 37.4 | 12.00 | |
| 13 | | Aspherical surface | 26.43 | 0.48 | | | | |
| 14 | L6 | Aspherical surface | −6.56 | 0.34 | 1.59 | 28.24 | −2.78 | |
| 15 | | Aspherical surface | 2.23 | 0.32 | | | | |
| 16 | L7 | Aspherical surface | 4.26 | 1.00 | 1.57 | 37.4 | 4.83 | |
| 17 | | Aspherical surface | −7.15 | 0.06 | | | | |
| 18 | L8 | Aspherical surface | 4.41 | 0.65 | 1.645 | 23.52 | 14.86 | |
| 19 | | Aspherical surface | 7.69 | 2.30 | | | | |
| 20 | Filter 3 | Spherical surface | Infinite | 0.21 | 1.52 | 64.17 | | |
| 21 | | Spherical surface | Infinite | 4.21 | | | | |
| Image plane | Image plane | Spherical surface | Infinite | 0.00 | | | | |

Note:
A reference wavelength is 546 nm

TABLE 5b

| Surface number | K | A4 | A6 | A8 | A10 |
|---|---|---|---|---|---|
| S1 | −7.01285E−02 | 9.31470E−05 | −1.41779E−05 | 4.05139E−06 | −7.08091E−07 |
| S6 | −2.32298E−01 | 7.40798E−04 | −1.08553E−05 | −1.00062E−05 | 2.82113E−05 |
| S7 | −1.28055E+01 | −9.33878E−04 | −7.08109E−04 | 4.12249E−04 | −1.04070E−04 |
| S12 | −139688E−01 | −5.64118E−05 | −2.22294E−03 | 2.16488E−04 | 1.72199E−04 |
| S13 | −8.85284E+01 | 4.18552E−02 | −2.07314E−02 | 8.79431E−03 | −3.47721E−03 |
| S14 | 2.65064E−01 | 2.12812E−02 | −9.33961E−03 | 6.24584E−03 | −4.62921E−03 |
| S15 | −9.78000E−01 | −7.95870E−02 | 4.42818E−02 | −1.68267E−02 | 1.40557E−03 |
| S16 | −9.22720E−02 | −2.76559E−02 | 6.48516E−04 | 1.86023E−02 | −1.69987E−02 |
| S17 | −3.22530E−01 | −5.99275E−02 | 6.50935E−02 | −3.52224E−02 | 1.25367E−02 |
| S18 | 9.93110E−02 | −7.85686E−02 | 6.70665E−02 | −3.91991E−02 | 1.51516E−02 |
| S19 | −1.00000E+00 | −2.07108E−02 | 6.01990E−03 | −1.54369E−03 | 2.78786E−04 |

TABLE 5b-continued

| Surface number | A12 | A14 | A16 | A18 | A20 |
|---|---|---|---|---|---|
| S1 | 7.91423E−08 | −5.57517E−09 | 2.38354E−10 | −5.63359E−12 | 5.63669E−14 |
| S6 | −1.06358E−05 | 1.94619E−06 | −1.76094E−07 | 6.25175E−09 | 0.00000E+00 |
| S7 | 1.56368E−05 | −1.29708E−06 | 4.44120E−08 | 0.00000E+00 | 0.00000E+00 |
| S12 | −1.03400E−04 | 2.54896E−05 | −3.12889E−06 | 1.54522E−07 | 0.00000E+00 |

| Surface number | K | A4 | A6 | A8 | A10 |
|---|---|---|---|---|---|
| S13 | 1.16651E−03 | −2.64940E−04 | 3.30600E−05 | −1.69601E−06 | 0.00000E+00 |
| S14 | 2.78071E−03 | −1.01908E−03 | 2.13811E−04 | −2.39252E−05 | 1.11360E−06 |
| S15 | 1.86960E−03 | −9.37167E−04 | 2.04104E−04 | −2.20966E−05 | 9.67998E−07 |
| S16 | 7.64829E−03 | −2.01473E−03 | 3.15420E−04 | −2.72176E−05 | 9.97430E−07 |
| S17 | −3.08314E−03 | 5.21094E−04 | −5.74715E−05 | 3.72020E−06 | −1.08212E−07 |
| S18 | −3.93509E−03 | 6.79425E−04 | −7.47089E−05 | 4.72802E−06 | −1.30995E−07 |
| S19 | −3.07298E−05 | 8.49847E−07 | 2.31708E−07 | −2.84425E−08 | 1.01366E−09 |

TABLE 5c

| | Parameter | | | | | | |
|---|---|---|---|---|---|---|---|
| | fg1/f | fg2/f | fg2/f | TTL/f | AT34/AT45 | f/TEPD | R2/R3 |
| Value | 0.97 | −1.53 | −1.17 | 1.74 | 0.12 | 2.00 | 1.50 |

Figure 14A:
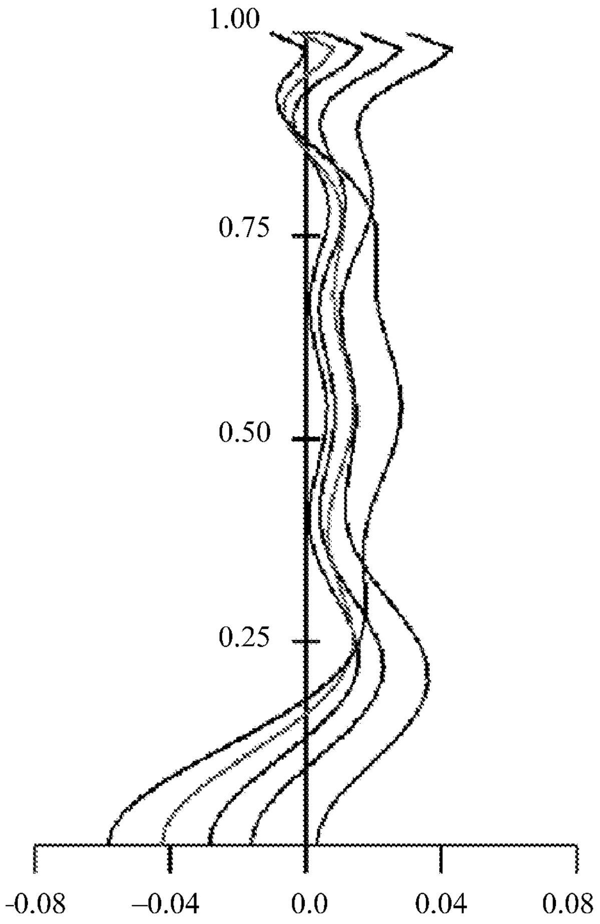
FIG. 14A is a simulation effect diagram 1 (a longitudinal spherical aberration graph) of an optical lens device according to a fifth embodiment of this application.
Figure 14B:
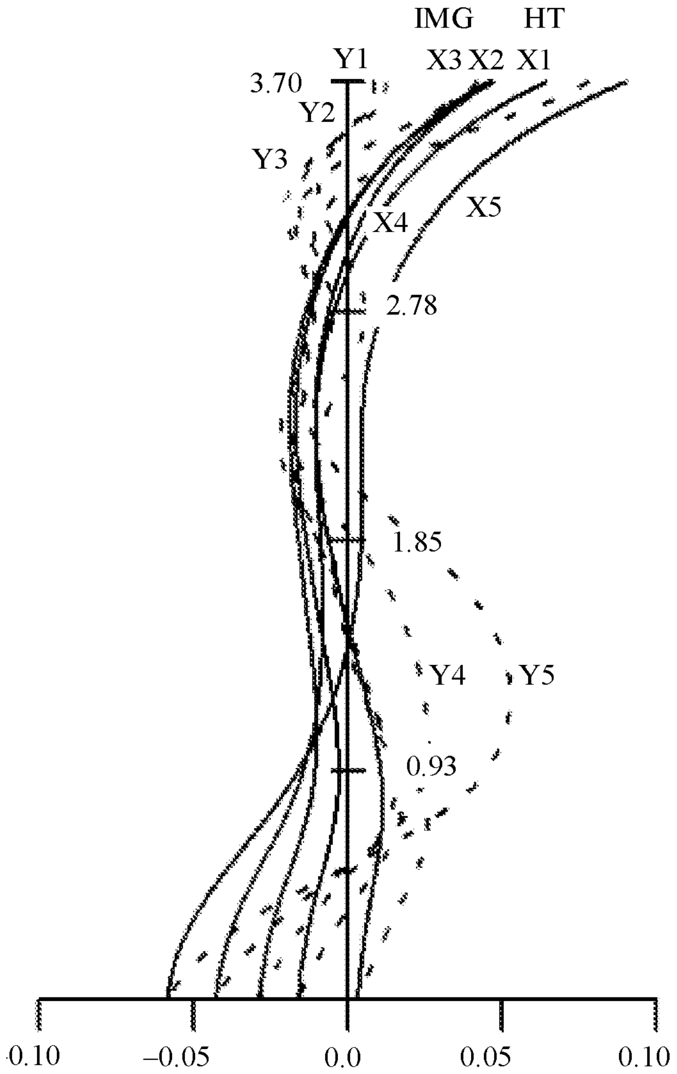
FIG. 14B is a simulation effect diagram 2 (a graph of astigmatic field curves) of an optical lens device according to a fifth embodiment of this application.
Figure 14C:
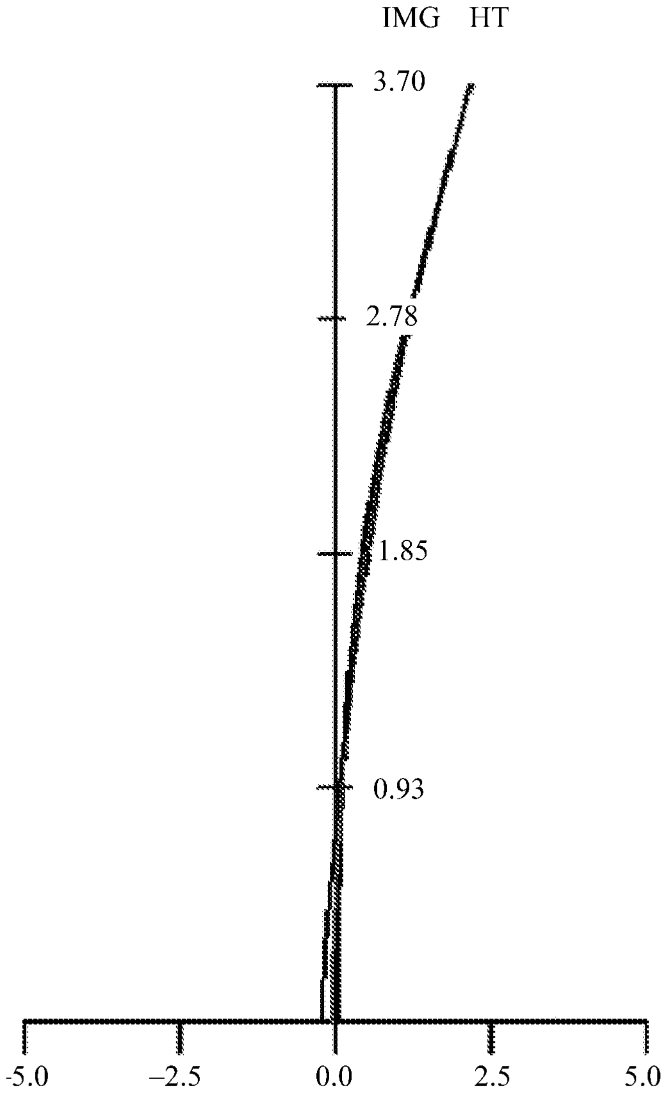
FIG. 14C is a simulation effect diagram 3 (a distortion graph) of an optical lens device according to a fifth embodiment of this application.

A schematic diagram of a structure of the optical lens device 1 in the fifth embodiment provided in FIG. 13 and simulation effect diagrams shown in FIG. 14A, FIG. 14B, and FIG. 14C that are obtained through simulation when main parameters of the optical lens device 1 in the fifth embodiment provided in Table 5a and Table 5b meet the relationships in Table 5c are used for reference. FIG. 14A, FIG. 14B, and FIG. 14C are respectively a longitudinal spherical aberration (Longitudinal Spherical Aberration) graph, a graph of astigmatic field curves (Astigmatic Field Curves), and a distortion (Distortion) graph of the optical lens device 1 in the fifth embodiment.

It can be learned from the longitudinal spherical aberration graph in FIG. 14A that in the optical lens device 1 in the fifth embodiment, a degree of deviation of a convergence focal point of light of each wavelength and a deviation from an ideal image plane fall within quite small ranges, and spherical aberration in an imaged picture is better corrected. It can be learned from the graph of astigmatic field curves and the distortion graph in FIG. 14B and FIG. 14C that both sagittal curvature of field and tangential curvature of field are controlled to be within relatively small ranges, reflecting that bending of an image plane is better controlled. It can be learned from the distortion graph in FIG. 14C that distortion of the optical lens device 1 in the fifth embodiment is relatively small, which means that deformation of an image caused by a main light beam is relatively small, and an imaging distortion effect is low. In conclusion, the optical lens device 1 in the fifth embodiment achieves a long-focus characteristic, structure miniaturization, and high imaging quality.

FIG. 15, FIG. 16A, FIG. 16B, and FIG. 16C are schematic diagrams of structures and simulation effect diagrams of an optical lens device in a camera module 10 in a sixth embodiment.

Figure 15:
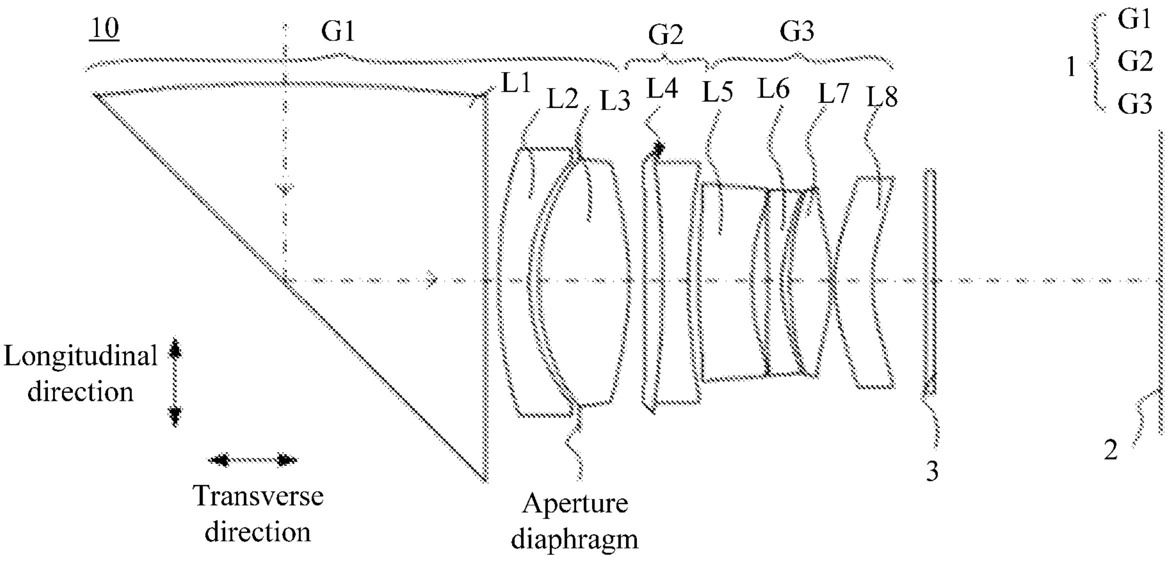
FIG. 15 is a schematic diagram of a structure of an optical lens device according to a sixth embodiment of this application.

As shown in FIG. 15, in the sixth embodiment, the optical lens device 1 includes a lens 1 L1 with positive focal power, a lens 2 L2 with negative focal power, a lens 3 L3 with positive focal power, a lens 4 L4 with negative focal power, a lens 5 L5 with negative focal power, a lens 6 L6 with negative focal power, a lens 7 L7 with positive focal power, and a lens 8 L8 with positive focal power that are arranged from an object side to an image side.

An object-side surface S1 of the lens 1 L1 protrudes toward an image side at an optical axis (briefly referred to as a concave surface), a reflective surface S2 is a plane at the optical axis, and an image-side surface S3 is a plane at the optical axis. The object-side surface S1 protrudes toward an object side at a circumference (briefly referred to as a convex surface), the reflective surface S2 is a plane at the circumference, and the image-side surface S3 is a plane at the circumference.

An object-side surface S4 of the lens 2 L2 is a convex surface at the optical axis, and an image-side surface S5 is a convex surface at the optical axis. The object-side surface S4 is a convex surface at a circumference, and the image-side surface S5 is a convex surface at the circumference. An object-side surface S6 of the lens 3 L3 is a convex surface at the optical axis, and an image-side surface S7 is a concave surface at the optical axis. The object-side surface S6 is a convex surface at a circumference, and the image-side surface S7 is a concave surface at the circumference. An object-side surface S8 of the lens 4 L4 is a concave surface at the optical axis, and an image-side surface S11 is a convex surface at the optical axis. The object-side surface S8 is a concave surface at a circumference, and the image-side surface S11 is a convex surface at the circumference. An object-side surface S12 of the lens 5 L5 is a convex surface at the optical axis, and an image-side surface S13 is a convex surface at the optical axis. The object-side surface S12 is a convex surface at a circumference, and the image-side surface S13 is a convex surface at the circumference. An object-side surface S14 of the lens 6 L6 is a concave surface at the optical axis, and an image-side surface S15 is a convex surface at the optical axis. The object-side surface S14 is a concave surface at a circumference, and the image-side surface S15 is a convex surface at the circumference. An object-side surface S16 of the lens 7 L7 is a concave surface at the optical axis, and an image-side surface S17 is a concave surface at the optical axis. The object-side surface S16 is a concave surface at a circumference, and the image-side surface S17 is a concave surface at the circumference. An object-side surface S18 of the lens 8 L8 is a convex surface at the optical axis, and an image-side surface S19 is a convex surface at the optical axis. The object-side surface S18 is a convex surface at a circumference, and the image-side surface S19 is a convex surface at the circumference.

In conclusion, for details of concave/convex statuses of a surface of each of the eight lens devices in this embodiment at the optical axis and a circumference, refer to the following Table 9~Table 11.

Table 6a and Table 6b provide parameters such as curvature radiuses, intervals, refractive indexes (Nd), Abbe numbers, and focal lengths of the lenses and a filter 3 in the optical lens device 1 in the camera module 10 in the sixth embodiment. The intervals include thicknesses of the lenses and spacings between the lenses. A dispersion coefficient is the Abbe number. Table 6b shows aspherical coefficients of the lenses in the sixth embodiment.

In the sixth embodiment, an effective focal length f of the optical lens device 1 is equal to 14.95 mm, a combined focal length fg1 of a first lens group G1 is equal to 9.27 mm, an effective focal length fg2 of a second lens group G2 is equal to −23.28 mm, an aperture diaphragm FNO is equal to 2.1, a field of view FOV is equal to 27.2°, and a total track length TTL of the optical lens device 1 is equal to 26.2 mm. Parameters of the optical lens device 1 in the sixth embodiment meet relationships shown in Table 6c.

TABLE 6a

EFL = 14.95 FNO = 2.1 FOV = 27.2 TTL = 26.2

| Surface number | Surface name | Surface type | Curvature radius | Thickness | Refractive index | Abbe number | Focal length | Combined focal length |
|---|---|---|---|---|---|---|---|---|
| Object plane | Object plane | Spherical surface | Infinite | Infinite | | | | |
| 1 | L1 | Aspherical surface | −29.26 | −4.90 | 1.76 | 51.17 | 38.52 | 9.72 |
| 2 | | Spherical surface | Infinite | 4.90 | | | | |
| 3 | | Spherical surface | Infinite | 0.30 | | | | |
| 4 | L2 | Spherical surface | 10.82 | 0.74 | 1.69 | 31.16 | −13.32 | |
| 5 | | Spherical surface | 4.84 | 1.24 | | | | |
| STO | Aperture diaphragm | Spherical surface | Infinite | −1.00 | | | | |
| 6 | L3 | Aspherical surface | 5.45 | 2.20 | 1.55 | 56.13 | 6.08 | |
| 7 | | Aspherical surface | −7.28 | 0.39 | | | | |
| 8 | L4 | Spherical surface | −117.43 | 0.42 | 1.96 | 17.94 | −23.28 | |
| 9 | | Spherical surface | −23.19 | 0.00 | | | | |
| 10 | | Spherical surface | −23.19 | 0.63 | 1.69 | 31.16 | | |
| 11 | | Spherical surface | 15.03 | 0.24 | | | | |
| 12 | L5 | Aspherical surface | 14.71 | 1.30 | 1.57 | 37.4 | −25.00 | |
| 13 | | Aspherical surface | 7.01 | 0.38 | | | | |
| 14 | L6 | Aspherical surface | −15.39 | 034 | 1.59 | 28.24 | −3.98 | |
| 15 | | Aspherical surface | 2.79 | 0.20 | | | | |
| 16 | L7 | Aspherical surface | 4.82 | 1.00 | 1.57 | 37.4 | 4.79 | |
| 17 | | Aspherical surface | −5.83 | 0.09 | | | | |
| 18 | L8 | Aspherical surface | 3.23 | 0.92 | 1.645 | 23.52 | 24.64 | |
| 19 | | Aspherical surface | 3.60 | 2.30 | | | | |
| 20 | Filter 3 | Spherical surface | Infinite | 0.21 | 1.52 | 64.17 | | |
| 21 | | Spherical surface | Infinite | 4.50 | | | | |
| Image plane | Image plane | Spherical surface | Infinite | 0.00 | | | | |

Note:
A reference wavelength is 546 nm

TABLE 6b

| Surface number | K | A4 | A6 | A8 | A10 |
|---|---|---|---|---|---|
| S1 | −1.29769E+00 | 1.06642E−04 | −6.50767E−06 | 2.30144E−06 | −4.57732E−07 |
| S6 | −5.67637E−01 | 9.48573E−04 | 2.67605E−05 | −2.07546E−05 | 9.46796E−06 |
| S7 | −1.44118E+01 | −5.52127E−04 | −1.00986E−04 | 6.09739E−05 | −1.53188E−05 |
| S12 | 8.39363E+00 | 3.66124E−03 | −2.70822E−03 | 3.17117E−04 | 9.06779E−05 |
| S13 | −7.27152E+01 | 4.88645E−02 | −2.14818E−02 | 6.14640E−03 | −1.72286E−03 |
| S14 | 1.09331E+01 | −3.00536E−03 | 3.63502E−02 | −3.72667E−02 | 1.97278E−02 |
| S15 | −7.25000E−01 | −8.16845E−02 | 4.61612E−02 | −4.30730E−03 | −1.51434E−02 |
| S16 | 2.74892E−01 | −3.33861E−02 | −2.08375E−02 | 5.81857E−02 | −4.80636E−02 |
| S17 | −6.12120E−01 | −5.16744E−02 | 5.03280E−02 | −2.26689E−02 | 5.64431E−03 |
| S18 | −1.65980E−01 | −6.97082E−02 | 5.83779E−02 | −3.50013E−02 | 1.38338E−02 |
| S19 | −1.00000E+00 | −2.13283E−02 | 5.74657E−03 | −1.54774E−03 | 2.80894E−04 |

| Surface number | A12 | A14 | A16 | A18 | A20 |
|---|---|---|---|---|---|
| S1 | 5.50380E−08 | −4.07419E−09 | 1.81657E−10 | −4.47621E−12 | 4.68399E−14 |
| S6 | −2.23730E−06 | 2.99696E−07 | −2.08399E−08 | 5.84755E−10 | 0.00000E+00 |
| S7 | 2.26989E−06 | −1.76216E−07 | 5.47407E−09 | 0.00000E+00 | 0.00000E+00 |
| S12 | −5.21809E−05 | 1.13801E−05 | −1.22605E−06 | 5.26671E−08 | 0.00000E+00 |
| S13 | 5.05909E−04 | −1.02730E−04 | 1.01789E−05 | −3.45782E−07 | 0.00000E+00 |
| S14 | −6.13151E−03 | 1.16832E−03 | −1.34433E−04 | 8.43028E−06 | −2.10364E−07 |
| S15 | 1.12928E−02 | −3.85157E−03 | 7.12655E−04 | −6.91033E−05 | 2.75214E−06 |
| S16 | 2.15285E−02 | −5.72896E−03 | 9.01798E−04 | −7.73884E−05 | 2.78049E−06 |
| S17 | −4.53639E−04 | −1.45432E−04 | 4.74862E−05 | −5.51948E−06 | 2.38089E−07 |
| S18 | −3.67123E−03 | 6.44948E−04 | −7.17740E−05 | 4.57871E−06 | −1.27469E−07 |
| S19 | −3.02533E−05 | 8.69563E−07 | 2.31708E−07 | −2.84425E−08 | 1.01366E−09 |

TABLE 6c

| | Parameter | | | | | | |
|---|---|---|---|---|---|---|---|
| | fg1/f | fg2/f | fg2/f' | TTL/f | AT34/AT45 | f/EPD | R2/R3 |
| Value | 0.65 | −1.56 | −0.79 | 1.75 | 1.63 | 2.10 | 12.50 |

Figure 16A:
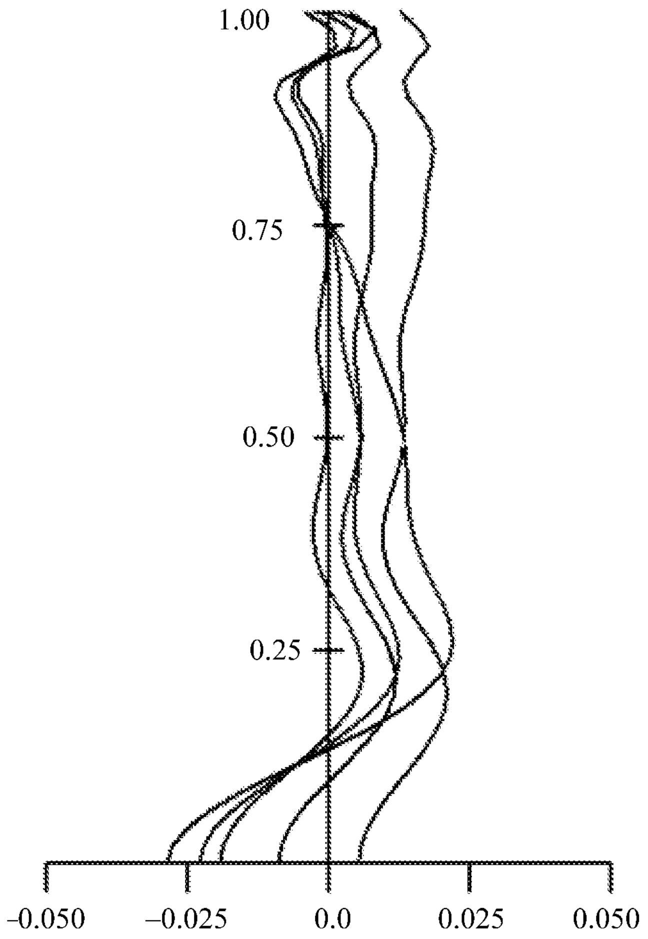
FIG. 16A is a simulation effect diagram 1 (a longitudinal spherical aberration graph) of an optical lens device according to a sixth embodiment of this application.
Figure 16B:
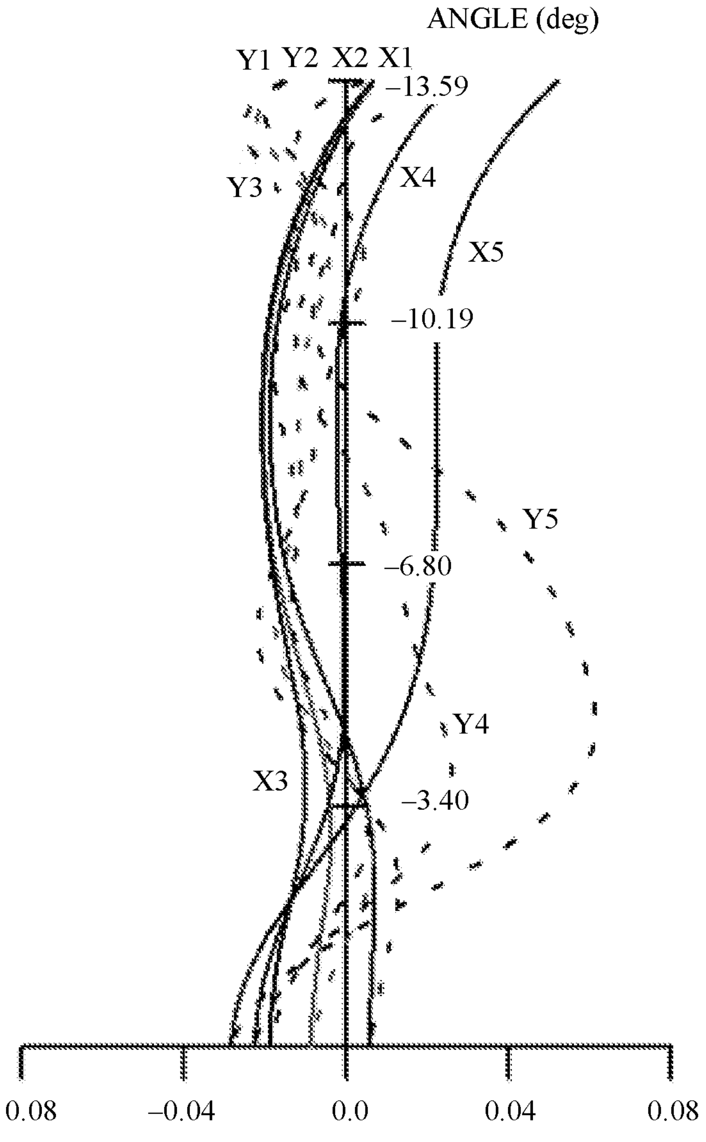
FIG. 16B is a simulation effect diagram 2 (a graph of astigmatic field curves) of an optical lens device according to a sixth embodiment of this application.
Figure 16C:
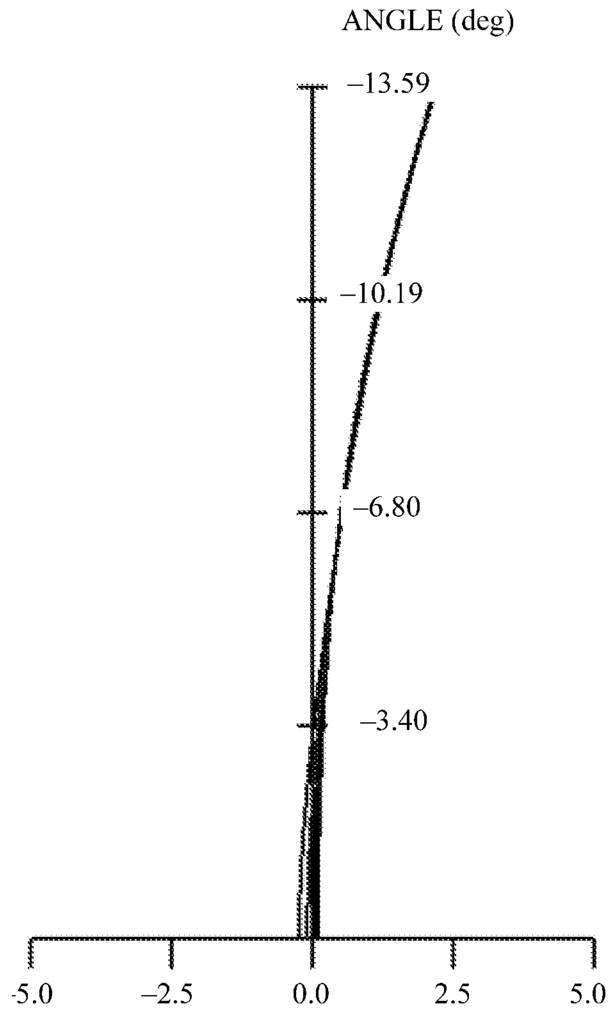
FIG. 16C is a simulation effect diagram 3 (a distortion graph) of an optical lens device according to a sixth embodiment of this application.

A schematic diagram of a structure of the optical lens device 1 in the sixth embodiment provided in FIG. 15 and simulation effect diagrams shown in FIG. 16A, FIG. 16B, and FIG. 16C that are obtained through simulation when main parameters of the optical lens device 1 in the second embodiment provided in Table 6a and Table 6b meet the relationships in Table 6c are used for reference. FIG. 16A, FIG. 16B, and FIG. 16C are respectively a longitudinal spherical aberration (Longitudinal Spherical Aberration) graph, a graph of astigmatic field curves (Astigmatic Field Curves), and a distortion (Distortion) graph of the optical lens device 1 in the sixth embodiment.

It can be learned from the longitudinal spherical aberration graph in FIG. 16A that in the optical lens device 1 in the sixth embodiment, a degree of deviation of a convergence focal point of light of each wavelength and a deviation from an ideal image plane fall within quite small ranges, and spherical aberration in an imaged picture is better corrected. It can be learned from the graph of astigmatic field curves and the distortion graph in FIG. 16B and FIG. 16C that both sagittal curvature of field and tangential curvature of field are controlled to be within relatively small ranges, reflecting that bending of an image plane is better controlled. It can be learned from the distortion graph in FIG. 16C that distortion of the optical lens device 1 in the sixth embodiment is relatively small, which means that deformation of an image caused by a main light beam is relatively small, and an imaging distortion effect is low. In conclusion, the optical lens device 1 in the sixth embodiment achieves a long-focus characteristic, structure miniaturization, and high imaging quality.

FIG. 17, FIG. 18A, FIG. 18B, and FIG. 18C are schematic diagrams of structures and simulation effect diagrams of an optical lens device in a camera module 10 in a seventh embodiment.

Figure 17:
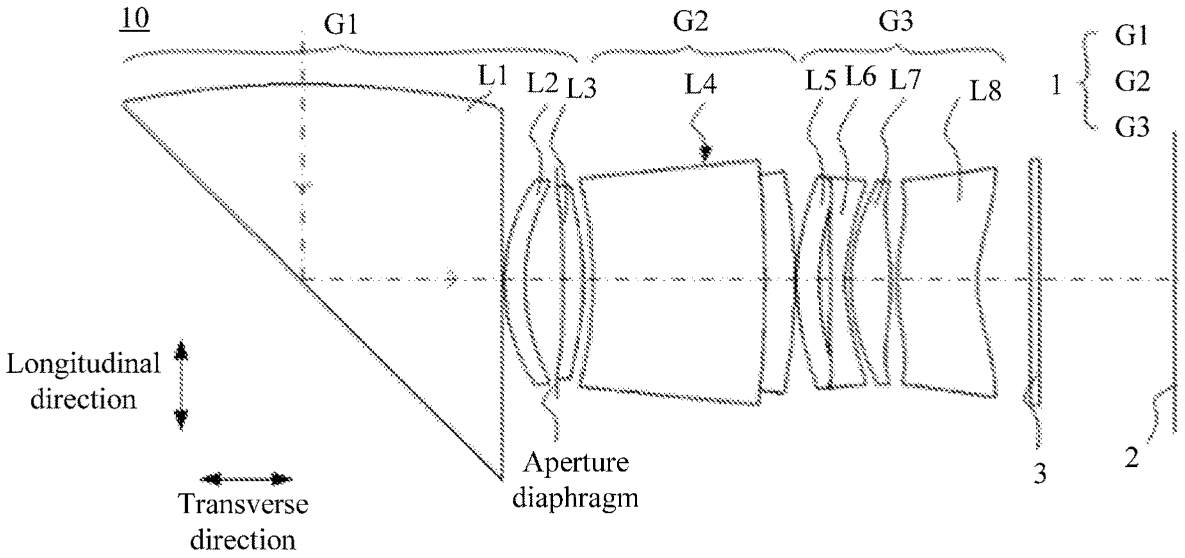
FIG. 17 is a schematic diagram of a structure of an optical lens device according to a seventh embodiment of this application.

As shown in FIG. 17, in the seventh embodiment, the optical lens device 1 includes a lens 1 L1 with positive focal power, a lens 2 L2 with positive focal power, a lens 3 L3 with negative focal power, a lens 4 L4 with negative focal power, a lens 5 L5 with positive focal power, a lens 6 L6 with negative focal power, a lens 7 L7 with positive focal power, and a lens 8 L8 with positive focal power that are arranged from an object side to an image side.

An object-side surface S1 of the lens 1 L1 protrudes toward an image side at an optical axis (briefly referred to as a concave surface), a reflective surface S2 is a plane at the optical axis, and an image-side surface S3 is a plane at the optical axis. The object-side surface S1 protrudes toward an object side at a circumference (briefly referred to as a convex surface), the reflective surface S2 is a plane at the circumference, and the image-side surface S3 is a plane at the circumference.

An object-side surface S4 of the lens 2 L2 is a convex surface at the optical axis, and an image-side surface S5 is a convex surface at the optical axis. The object-side surface S4 is a convex surface at a circumference, and the image-side surface S5 is a convex surface at the circumference. An object-side surface S6 of the lens 3 L3 is a concave surface at the optical axis, and an image-side surface S7 is a concave surface at the optical axis. The object-side surface S6 is a convex surface at a circumference, and the image-side surface S7 is a concave surface at the circumference. An object-side surface S8 of the lens 4 L4 is a concave surface at the optical axis, and an image-side surface S11 is a concave surface at the optical axis. The object-side surface S8 is a concave surface at a circumference, and the image-side surface S11 is a concave surface at the circumference. An object-side surface S12 of the lens 5 L5 is a convex surface at the optical axis, and an image-side surface S13 is a convex surface at the optical axis. The object-side surface S12 is a convex surface at a circumference, and the image-side surface S13 is a convex surface at the circumference. An object-side surface S14 of the lens 6 L6 is a concave surface at the optical axis, and an image-side surface S15 is a convex surface at the optical axis. The object-side surface S14 is a convex surface at a circumference, and the image-side surface S15 is a convex surface at the circumference. An object-side surface S16 of the lens 7 L7 is a convex surface at the optical axis, and an image-side surface S17 is a concave surface at the optical axis. The object-side surface S16 is a concave surface at a circumference, and the image-side surface S17 is a convex surface at the circumference. An object-side surface S18 of the lens 8 L8 is a convex surface at the optical axis, and an image-side surface S19 is a convex surface at the optical axis. The object-side surface S18 is a convex surface at a circumference, and the image-side surface S19 is a convex surface at the circumference.

In conclusion, for details of concave/convex statuses of a surface of each of the eight lens devices in this embodiment at the optical axis and a circumference, refer to the following Table 9~Table 11.

Table 7a and Table 7b provide parameters such as curvature radiuses, intervals, refractive indexes (Nd), Abbe numbers, and focal lengths of the lenses and a filter 3 in the optical lens device 1 in the camera module 10 in the seventh embodiment. The intervals include thicknesses of the lenses and spacings between the lenses. A dispersion coefficient is the Abbe number. Table 7b shows aspherical coefficients of the lenses in the seventh embodiment.

In the seventh embodiment, an effective focal length f of the optical lens device 1 is equal to 12.95 mm, a combined focal length fg1 of a first lens group G1 is equal to 11.52 mm, an effective focal length fg2 of a second lens group G2 is equal to −44.98 mm, an aperture diaphragm FNO is equal to 2.0, a field of view FOV is equal to 31.3°, and a total track length TTL of the optical lens device 1 is equal to 26.3 mm. Parameters of the optical lens device 1 in the seventh embodiment meet relationships shown in Table 7c.

TABLE 7a

EFL = 12.95 FNO = 2.0 FOV = 31.3 TTL = 26.3

| Surface number | Surface name | Surface type | Curvature radius | Thickness | Refractive index | Abbe number | Focal length | Combined focal length |
|---|---|---|---|---|---|---|---|---|
| Object plane | Object plane | Spherical surface | Infinite | Infinite | | | | |
| 1 | L1 | Aspherical surface | −23.39 | −4.90 | 1.76 | 51.17 | 30.80 | 11.52 |
| 2 | | Spherical surface | Infinite | 4.90 | | | | |
| 3 | | Spherical surface | Infinite | 0.05 | | | | |
| 4 | L2 | Spherical surface | 4.69 | 0.50 | 1.69 | 31.16 | 47.14 | |
| 5 | | Spherical surface | 5.23 | 0.79 | | | | |
| STO | Aperture diaphragm | Spherical surface | Infinite | 0.14 | | | | |
| 6 | L3 | Aspherical surface | −20.85 | 0.50 | 1.55 | 56.13 | 19.59 | |
| 7 | | Aspherical surface | −7.13 | 0.24 | | | | |
| 8 | L4 | Spherical surface | −10.15 | 4.20 | 1.96 | 17.94 | −44.98 | |
| 9 | | Spherical surface | −31.46 | 0.00 | | | | |
| 10 | | Spherical surface | −31.46 | 0.74 | 1.69 | 31.16 | | |
| 11 | | Spherical surface | −13.85 | 0.05 | | | | |
| 12 | L5 | Aspherical surface | 7.44 | 0.54 | 1.57 | 37.4 | 44.26 | |
| 13 | | Aspherical surface | 10.26 | 0.27 | | | | |
| 14 | L6 | Aspherical surface | −12.65 | 0.34 | 1.59 | 28.24 | −3.94 | |
| 15 | | Aspherical surface | 2.87 | 0.14 | | | | |
| 16 | L7 | Aspherical surface | 3.45 | 1.00 | 1.57 | 37.4 | 4.81 | |
| 17 | | Aspherical surface | −12.08 | 0.16 | | | | |
| 18 | L8 | Aspherical surface | 3.63 | 1.96 | 1.645 | 23.52 | 46.65 | |
| 19 | | Aspherical surface | 3.25 | 2.30 | | | | |

TABLE 7a-continued

| EFL = 12.95 FNO = 2.0 FOV = 31.3 TTL = 26.3 | | | | | | | | |
|---|---|---|---|---|---|---|---|---|
| Surface number | Surface name | Surface type | Curvature radius | Thickness | Refractive index | Abbe number | Focal length | Combined focal length |
| 20 | Filter 3 | Spherical surface | Infinite | 0.21 | 1.52 | 64.17 | | |
| 21 | | Spherical surface | Infinite | 2.33 | | | | |
| Image plane | Image plane | Spherical surface | Infinite | 0.00 | | | | |

Note:
A reference wavelength is 546 nm

TABLE 7b

| Surface number | K | A4 | A6 | A8 | A10 |
|---|---|---|---|---|---|
| S1 | 5.51263E+00 | −7.93067E−05 | 4.84611E−05 | −1.56150E−05 | 3.10971E−06 |
| S6 | 5.37597E+01 | −9.47524E−05 | 3.42317E−04 | −3.68937E−04 | 2.19109E−04 |
| S7 | −1.21591E+01 | −1.44198E−03 | 2.23965E−04 | −5.67360E−05 | 3.35892E−05 |
| S12 | 4.14489E+00 | 6.34524E−03 | −1.74072E−03 | −1.15344E−03 | 8.92158E−04 |
| S13 | −9.90000E+01 | 4.17254E−02 | −1.49427E−02 | 1.61909E−03 | 2.74660E−04 |
| S14 | 6.13233E+00 | 1.13423E−02 | 9.52512E−03 | −1.18811E−02 | 6.42296E−03 |
| S15 | −7.00040E−01 | −6.79010E−02 | 3.10566E−02 | −9.11211E−03 | 5.13846E−04 |
| S16 | −4.32230E−01 | −2.91490E−02 | −9.22717E−04 | 1.34639E−02 | −8.87120E−03 |
| S17 | −8.13540E−01 | −4.75855E−02 | 4.11566E−02 | −1.77747E−02 | 6.87814E−03 |
| S18 | −1.21540E+00 | −6.83268E−02 | 4.07497E−02 | −1.85621E−02 | 5.98520E−03 |
| S19 | −1.00000E+00 | −2.66317E−02 | 5.85490E−03 | −1.51917E−03 | 2.82217E−04 |

| Surface number | A12 | A14 | A16 | A18 | A20 |
|---|---|---|---|---|---|
| S1 | −3.92829E−07 | 3.12885E−08 | −1.51570E−09 | 4.06747E−11 | −4.62939E−13 |
| S6 | −6.86099E−05 | 1.20715E−05 | −1.13465E−06 | 4.48466E−08 | 0.00000E+00 |
| S7 | −8.95678E−06 | 1.01653E−06 | −4.15319E−08 | 0.00000E+00 | 0.00000E+00 |
| S12 | −2.93735E−04 | 5.29106E−05 | −4.95258E−06 | 1.86006E−07 | 0.00000E+00 |

| Surface number | K | A4 | A6 | A8 | A10 |
|---|---|---|---|---|---|
| S13 | 1.50380E−05 | −4.26277E−05 | 7.70992E−06 | −4.09271E−07 | 0.00000E+00 |
| S14 | −1.89412E−03 | 3.37875E−04 | −3.90837E−05 | 2.82877E−06 | −9.63363E−08 |
| S15 | 6.89451E−04 | −2.65247E−04 | 4.49243E−05 | −3.81118E−06 | 1.32184E−07 |
| S16 | 2.84584E−03 | −5.07894E−04 | 4.92226E−05 | −2.21900E−06 | 2.58307E−08 |
| S17 | −2.53534E−03 | 7.01388E−04 | −1.21944E−04 | 1.16499E−05 | −4.64072E−07 |
| S18 | −1.48257E−03 | 2.83856E−04 | −3.91709E−05 | 3.36123E−06 | −1.30125E−07 |
| S19 | −3.08919E−05 | 8.91369E−07 | 2.31414E−07 | −2.85298E−08 | 9.94292E−10 |

TABLE 7c

| Parameter | fg1/f | fg2/f | fg2/f' | TTL/f | AT34/AT45 | f/EPD | R2/R3 |
|---|---|---|---|---|---|---|---|
| Value | 0.89 | −3.47 | −0.87 | 2.03 | 4.76 | 2.00 | 1.13 |

Figure 18A:
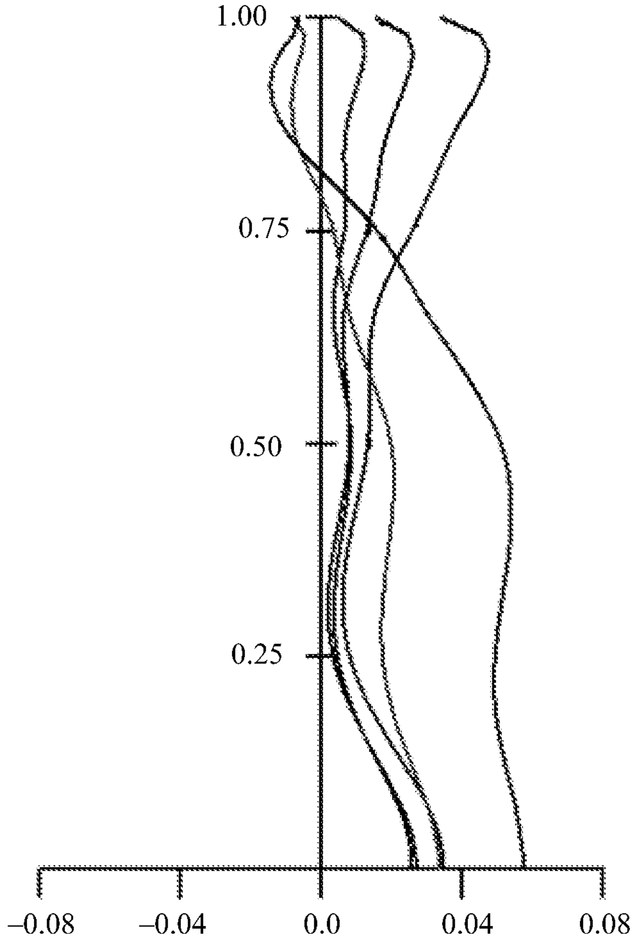
FIG. 18A is a simulation effect diagram 1 (a longitudinal spherical aberration graph) of an optical lens device according to a seventh embodiment of this application.
Figure 18B:
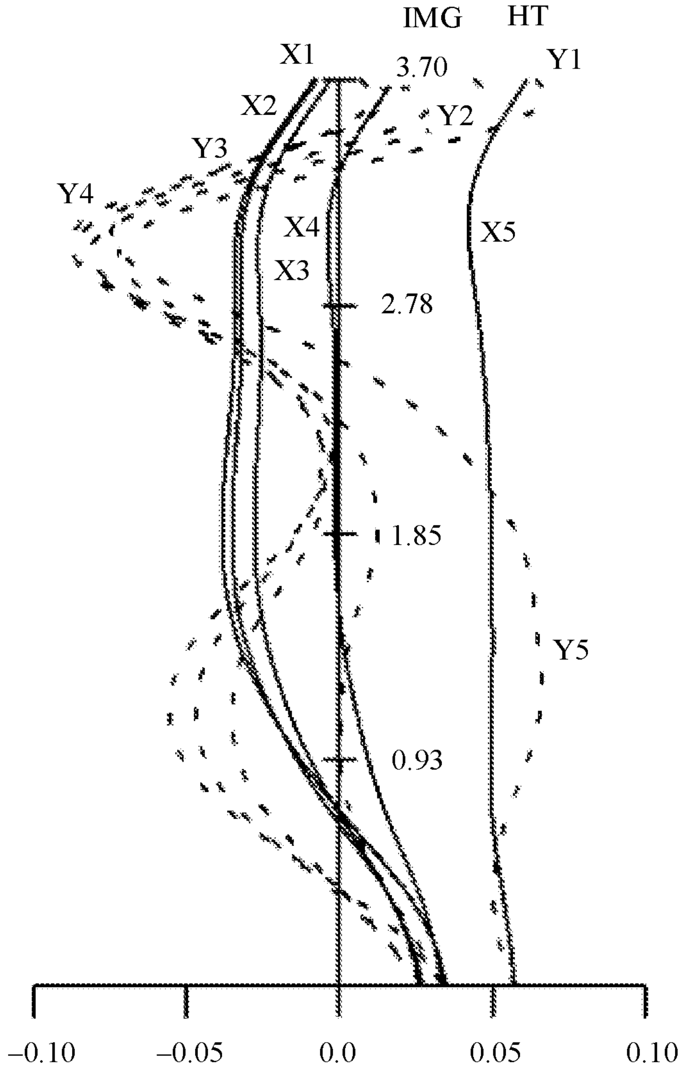
FIG. 18B is a simulation effect diagram 2 (a graph of astigmatic field curves) of an optical lens device according to a seventh embodiment of this application.
Figure 18C:
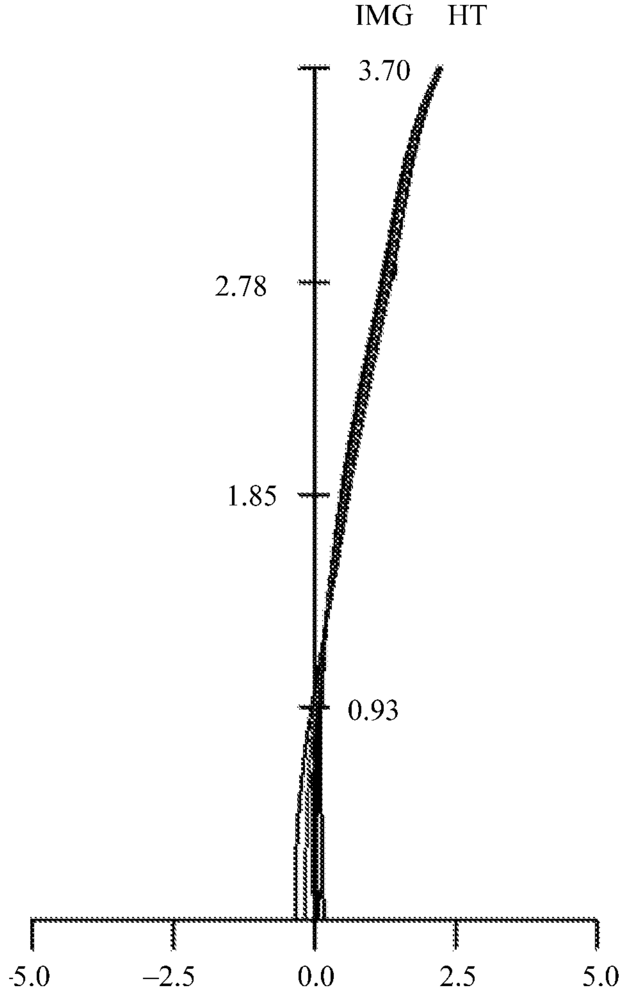
FIG. 18C is a simulation effect diagram 3 (a distortion graph) of an optical lens device according to a seventh embodiment of this application.

A schematic diagram of a structure of the optical lens device 1 in the seventh embodiment provided in FIG. 17 and simulation effect diagrams shown in FIG. 18A, FIG. 18B, and FIG. 18C that are obtained through simulation when main parameters of the optical lens device 1 in the seventh embodiment provided in Table 7a and Table 7b meet the relationships in Table 7c are used for reference. FIG. 18A, FIG. 18B, and FIG. 18C are respectively a longitudinal spherical aberration (Longitudinal Spherical Aberration) graph, a graph of astigmatic field curves (Astigmatic Field Curves), and a distortion (Distortion) graph of the optical lens device 1 in the seventh embodiment.

It can be learned from the longitudinal spherical aberration graph in FIG. 18A that in the optical lens device 1 in the seventh embodiment, a degree of deviation of a convergence focal point of light of each wavelength and a deviation from an ideal image plane fall within quite small ranges, and spherical aberration in an imaged picture is better corrected. It can be learned from the graph of astigmatic field curves and the distortion graph in FIG. 18B and FIG. 18C that both sagittal curvature of field and tangential curvature of field are controlled to be within relatively small ranges, reflecting that bending of an image plane is better controlled. It can be learned from the distortion graph in FIG. 18C that distortion of the optical lens device 1 in the seventh embodiment is relatively small, which means that deformation of an image caused by a main light beam is relatively small, and an imaging distortion effect is low. In conclusion, the optical lens device 1 in the seventh embodiment achieves a long-focus characteristic, structure miniaturization, and high imaging quality.

FIG. 19, FIG. 20A, FIG. 20B, and FIG. 20C are schematic diagrams of structures and simulation effect diagrams of an optical lens device in a camera module 10 in an eighth embodiment.

Figure 19:
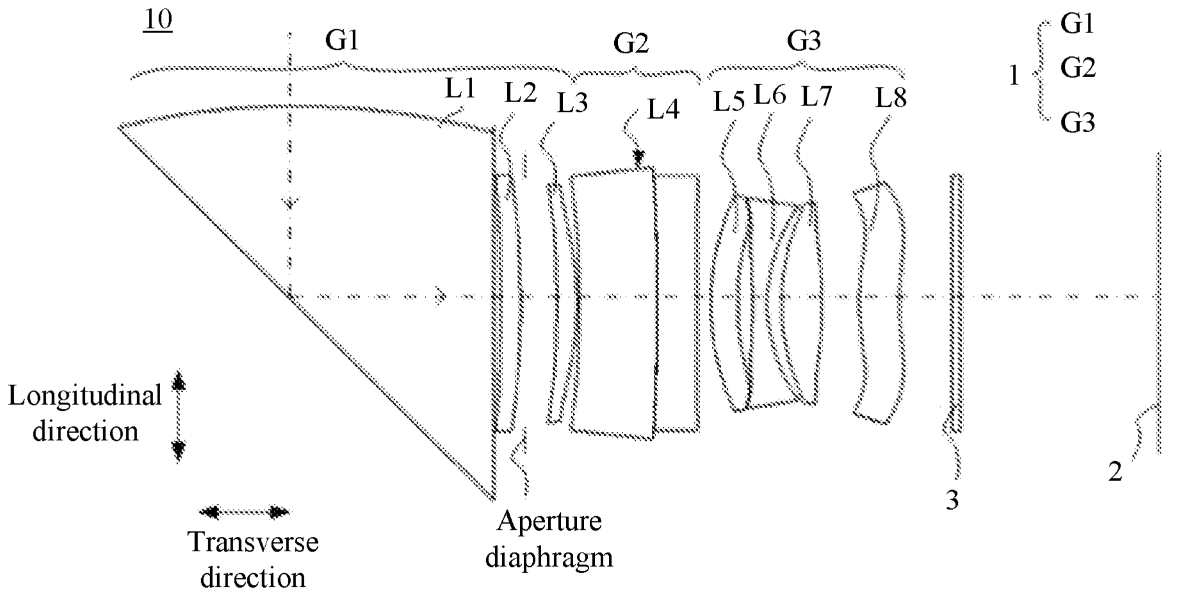
FIG. 19 is a schematic diagram of a structure of an optical lens device according to an eighth embodiment of this application.

As shown in FIG. 19, in the eighth embodiment, the optical lens device 1 includes a lens 1 L1 with positive focal power, a lens 2 L2 with positive focal power, a lens 3 L3 with negative focal power, a lens 4 L4 with negative focal power, a lens 5 L5 with positive focal power, a lens 6 L6 with negative focal power, a lens 7 L7 with positive focal power, and a lens 8 L8 with positive focal power that are arranged from an object side to an image side.

An object-side surface S1 of the lens 1 L1 protrudes toward an image side at an optical axis (briefly referred to as a concave surface), a reflective surface S2 is a plane at the optical axis, and an image-side surface S3 is a plane at the optical axis. The object-side surface S1 protrudes toward an object side at a circumference (briefly referred to as a convex surface), the reflective surface S2 is a plane at the circumference, and the image-side surface S3 is a plane at the circumference.

An object-side surface S4 of the lens 2 L2 is a concave surface at the optical axis, and an image-side surface S5 is a convex surface at the optical axis. The object-side surface S4 is a concave surface at a circumference, and the image-side surface S5 is a concave surface at the circumference. An object-side surface S6 of the lens 3 L3 is a concave surface at the optical axis, and an image-side surface S7 is a concave surface at the optical axis. The object-side surface S6 is a convex surface at a circumference, and the image-side surface S7 is a concave surface at the circumference. An object-side surface S8 of the lens 4 L4 is a concave surface at the optical axis, and an image-side surface S11 is a concave surface at the optical axis. The object-side surface S8 is a concave surface at a circumference, and the image-side surface S11 is a concave surface at the circumference. An object-side surface S12 of the lens 5 L5 is a convex surface at the optical axis, and an image-side surface S13 is a convex surface at the optical axis. The object-side surface S12 is a convex surface at a circumference, and the image-side surface S13 is a convex surface at the circumference. An object-side surface S14 of the lens 6 L6 is a concave surface at the optical axis, and an image-side surface S15 is a convex surface at the optical axis. The object-side surface S14 is a convex surface at a circumference, and the image-side surface S15 is a convex surface at the circumference. An object-side surface S16 of the lens 7 L7 is a convex surface at the optical axis, and an image-side surface S17 is a concave surface at the optical axis. The object-side surface S16 is a concave surface at a circumference, and the image-side surface S17 is a convex surface at the circumference. An object-side surface S18 of the lens 8 L8 is a convex surface at the optical axis, and an image-side surface S19 is a convex surface at the optical axis. The object-side surface S18 is a convex surface at a circumference, and the image-side surface S19 is a convex surface at the circumference.

In conclusion, for details of concave/convex statuses of a surface of each of the eight lens devices in this embodiment at the optical axis and a circumference, refer to the following Table 9~Table 11.

Table 8a and Table 8b provide parameters such as curvature radiuses, intervals, refractive indexes (Nd), Abbe numbers, and focal lengths of the lenses and a filter 3 in the optical lens device 1 in the camera module 10 in the eighth embodiment. The intervals include thicknesses of the lenses and spacings between the lenses. A dispersion coefficient is the Abbe number. Table 8b shows aspherical coefficients of the lenses in the eighth embodiment.

In the eighth embodiment, an effective focal length f of the optical lens device 1 is equal to 14.95 mm, a combined focal length fg1 of a first lens group G1 is equal to 10.88 mm, an effective focal length fg2 of a second lens group G2 is equal to −24.88 mm, an aperture diaphragm FNO is equal to 2.01, a field of view FOV is equal to 24.5°, and a total track length TTL of the optical lens device 1 is equal to 26.3 mm. Parameters of the optical lens device 1 in the eighth embodiment meet relationships shown in Table 8c.

TABLE 8a

EFL = 16 FNO = 1.94 FOV = 24.5 TTL = 26.3

| Surface number | Surface name | Surface type | Curvature radius | Thickness | Refractive index | Abbe number | Focal length | Combined focal length |
|---|---|---|---|---|---|---|---|---|
| Object plane | Object plane | Spherical surface | Infinite | Infinite | | | | |
| 1 | L1 | Aspherical surface | −18.88 | −4.90 | 1.76 | 51.17 | 24.86 | 10.88 |
| 2 | | Spherical surface | Infinite | 4.90 | | | | |
| 3 | | Spherical surface | Infinite | 0.17 | | | | |
| 4 | L2 | Spherical surface | −46.60 | 0.50 | 1.69 | 31.16 | 67.43 | |
| 5 | | Spherical surface | −23.46 | 0.10 | | | | |
| STO | Aperture diaphragm | Spherical surface | Infinite | 0.80 | | | | |
| 6 | L3 | Aspherical surface | −22.23 | 0.50 | 1.55 | 56.13 | 17.01 | |
| 7 | | Aspherical surface | −6.61 | 0.07 | | | | |
| 8 | L4 | Spherical surface | −22.53 | 1.90 | 1.96 | 17.94 | −24.88 | |
| 9 | | Spherical surface | −66.76 | 0.00 | | | | |
| 10 | | Spherical surface | −66.76 | 1.00 | 1.69 | 31.16 | | |

TABLE 8a-continued

| EFL = 16 FNO = 1.94 FOV = 24.5 TTL = 26.3 | | | | | | | | |
|---|---|---|---|---|---|---|---|---|
| Surface number | Surface name | Surface type | Curvature radius | Thickness | Refractive index | Abbe number | Focal length | Combined focal length |
| 11 | | Spherical surface | 417.47 | 0.34 | | | | |
| 12 | L5 | Aspherical surface | 7.14 | 0.66 | 1.57 | 37.4 | 36.80 | |
| 13 | | Aspherical surface | 10.45 | 0.36 | | | | |
| 14 | L6 | Aspherical surface | −10.77 | 0.35 | 1.59 | 28.24 | −3.56 | |
| 15 | | Aspherical surface | 2.64 | 0.36 | | | | |
| 16 | L7 | Aspherical surface | 3.94 | 1.00 | 1.57 | 37.4 | 5.54 | |
| 17 | | Aspherical surface | −14.58 | 0.92 | | | | |
| 18 | L8 | Aspherical surface | 4.29 | 1.00 | 1.645 | 23.52 | 20.72 | |
| 19 | | Aspherical surface | 5.73 | 2.30 | | | | |
| 20 | Filter 3 | Spherical surface | Infinite | 0.21 | 1.52 | 64.17 | | |
| 21 | | Spherical surface | Infinite | 3.90 | | | | |
| Image plane | Image plane | Spherical surface | Infinite | 0.00 | | | | |

Note:
A reference wavelength is 546 nm

TABLE 8b

| Surface number | K | A4 | A6 | A8 | A10 |
|---|---|---|---|---|---|
| S1 | 3.47902E+00 | −5.09704E−05 | 6.82082E−05 | −2.14622E−05 | 3.90304E−06 |
| S6 | 4.90365E+01 | −8.32970E−04 | 1.38584E−03 | −6.87251E−04 | 1.84624E−04 |
| S7 | −1.41273E+01 | −2.83012E−03 | 1.53546E−03 | −5.30746E−04 | 1.06381E−04 |
| S12 | 4.32687E+00 | 4.51526E−03 | 4.37483E−03 | −6.44231E−03 | 3.05636E−03 |
| S13 | −9.90000E+01 | 3.96736E−02 | −1.14809E−03 | −1.31648E−02 | 7.57521E−03 |
| S14 | 1.01472E+01 | 1.75429E−02 | 5.54961E−04 | −3.74817E−03 | 1.87912E−03 |
| S15 | −5.23875E−01 | −6.94838E−02 | 3.13045E−02 | −8.75059E−03 | 2.17834E−03 |
| S16 | −2.20080E−01 | −4.57684E−02 | 1.56004E−02 | 2.20929E−03 | −3.30938E−03 |
| S17 | 3.00700E+01 | −2.51020E−02 | 1.62393E−02 | −4.58694E−03 | 1.10752E−03 |
| S18 | −1.37470E+00 | −3.60677E−02 | 9.19439E−03 | −1.65002E−03 | −2.95736E−04 |
| S19 | −1.00000E+00 | −2.70549E−02 | 5.74681E−03 | −1.53277E−03 | 2.80823E−04 |

| Surface number | A12 | A14 | A16 | A18 | A20 |
|---|---|---|---|---|---|
| S1 | −4.35373E−07 | 3.02358E−08 | −1.27450E−09 | 2.98302E−11 | −2.97218E−13 |
| S6 | −2.89668E−05 | 2.84780E−06 | −1.71503E−07 | 4.93491E−09 | 0.00000E+00 |
| S7 | −1.02784E−05 | 3.68215E−07 | 9.28510E−10 | 0.00000E+00 | 0.00000E+00 |
| S12 | −7.69071E−04 | 1.09500E−04 | −8.29919E−06 | 2.58915E−07 | 0.00000E+00 |
| S13 | −2.00179E−03 | 2.77465E−04 | −1.95076E−05 | 5.50335E−07 | 0.00000E+00 |
| S14 | −3.26409E−04 | −8.05601E−06 | 8.93112E−06 | −9.74461E−07 | 3.37294E−08 |
| S15 | −7.07225E−04 | 1.98408E−04 | −3.36452E−05 | 2.98752E−06 | −1.07202E−07 |
| S16 | 1.18238E−03 | −2.34885E−04 | 2.83758E−05 | −1.98043E−06 | 6.18269E−08 |
| S17 | −2.41981E−04 | 3.51206E−05 | −2.39395E−06 | −4.90234E−09 | 6.75335E−09 |

| Surface number | K | A4 | A6 | A8 | A10 |
|---|---|---|---|---|---|
| S18 | 2.61975E−04 | −7.43168E−05 | 1.11500E−05 | −8.64928E−07 | 2.71719E−08 |
| S19 | −3.10452E−05 | 9.23664E−07 | 2.32553E−07 | −2.85298E−08 | 9.94292E−10 |

TABLE 8c

| Parameter | fg1/f | fg2/f | fg2/f | TTL/f | AT34/AT45 | f/EPD | R2/R3 |
|---|---|---|---|---|---|---|---|
| Value | 0.68 | −1.56 | −0.95 | 1.64 | 0.19 | 1.94 | 0.76 |

A schematic diagram of a structure of the optical lens device 1 in the eighth embodiment provided in FIG. 19 and simulation effect diagrams shown in FIG. 18A, FIG. 18B, and FIG. 18C that are obtained through simulation when main parameters of the optical lens device 1 in the eighth embodiment provided in Table 8a and Table 8b meet the relationships in Table 8c are used for reference. FIG. 18A, FIG. 18B, and FIG. 18C are respectively a longitudinal spherical aberration (Longitudinal Spherical Aberration) graph, a graph of astigmatic field curves (Astigmatic Field Curves), and a distortion (Distortion) graph of the optical lens device 1 in the eighth embodiment.

Figure 20A:
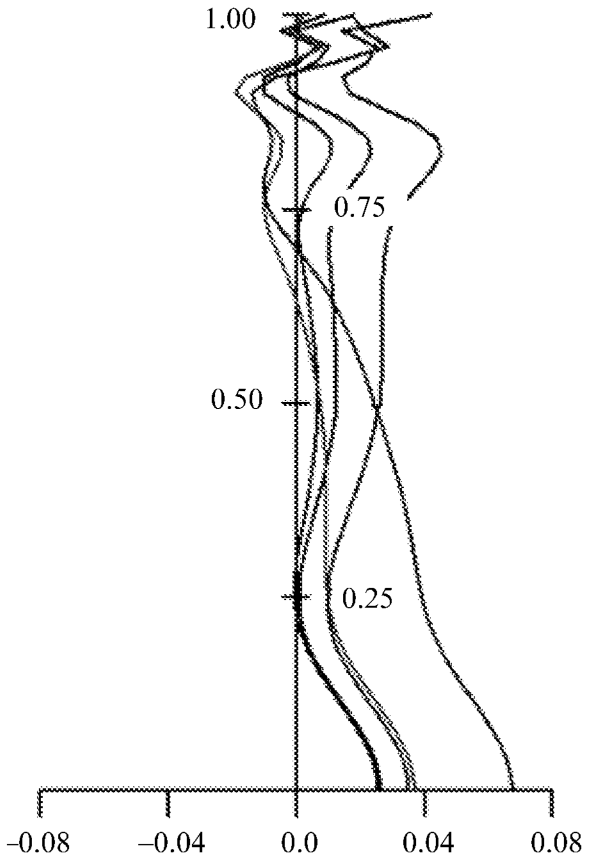
FIG. 20A is a simulation effect diagram 1 (a longitudinal spherical aberration graph) of an optical lens device according to an eighth embodiment of this application.
Figure 20B:
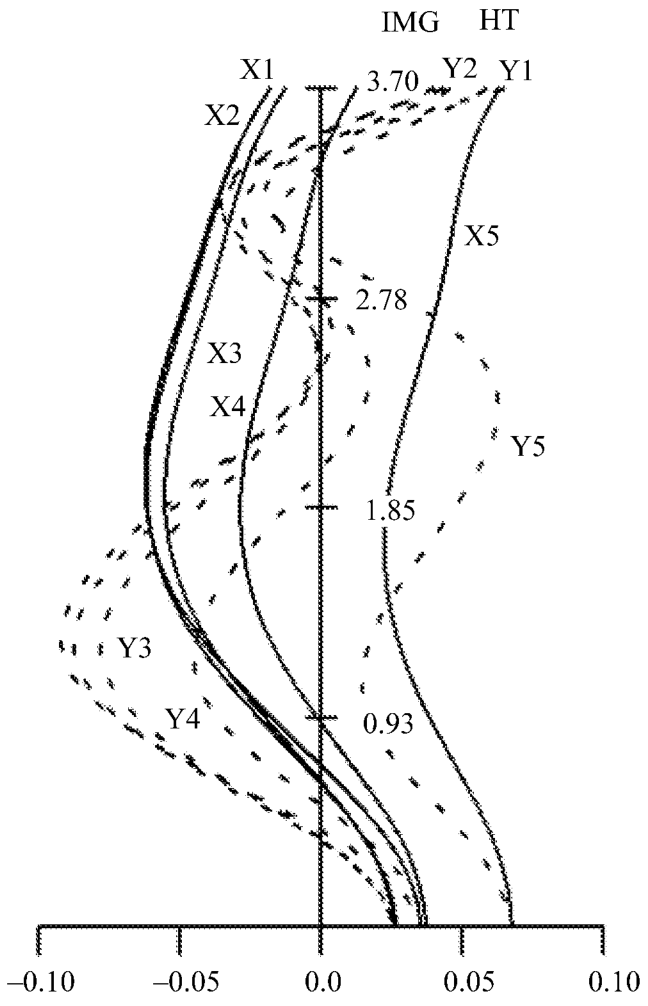
FIG. 20B is a simulation effect diagram 2 (a graph of astigmatic field curves) of an optical lens device according to an eighth embodiment of this application.
Figure 20C:
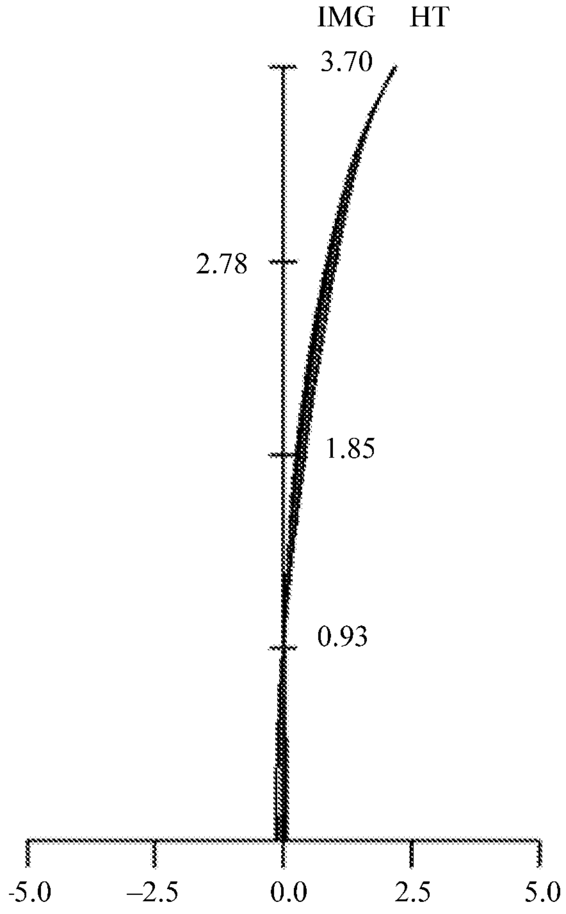
FIG. 20C is a simulation effect diagram 3 (a distortion graph) of an optical lens device according to an eighth embodiment of this application.

It can be learned from the longitudinal spherical aberration graph in FIG. 20A that in the optical lens device 1 in the eighth embodiment, a degree of deviation of a convergence focal point of light of each wavelength and a deviation from an ideal image plane fall within quite small ranges, and spherical aberration in an imaged picture is better corrected. It can be learned from the graph of astigmatic field curves and the distortion graph in FIG. 18B and FIG. 18C that both sagittal curvature of field and tangential curvature of field are controlled to be within relatively small ranges, reflecting that bending of an image plane is better controlled. It can be learned from the distortion graph in FIG. 20C that distortion of the optical lens device 1 in the eighth embodiment is relatively small, which means that deformation of an image caused by a main light beam is relatively small, and an imaging distortion effect is low. In conclusion, the optical lens device 1 in the eighth embodiment achieves a long-focus characteristic, structure miniaturization, and high imaging quality.

In conclusion, in addition to the foregoing differences, structures and main parameters of the optical lens devices 1 in the first embodiment to the eighth embodiment are also different in terms of focal power and surface orientations of the lenses in the optical lens devices 1. Details are shown in Table 9~Table 11. Table 9 shows positive/negative statuses of focal power of a lens 1 L1 to a lens 8 L8 included in each of the eight optical lens devices 1 in the first embodiment to the eighth embodiment. Table 10 shows concave/convex statuses, at the optical axis, of object-side surfaces or image-side surfaces of the lens 1 L1 to the lens 8 L8 included in each of the eight optical lens devices 1 in the first embodiment to the eighth embodiment. Table 11 shows concave/convex statuses, at a circumference, of object-side surfaces or image-side surfaces of the lens 1 L1 to the lens 8 L8 included in each of the eight optical lens devices 1 in the first embodiment to the eighth embodiment.

TABLE 9

| Focal power | First embodiment | Second embodiment | Third embodiment | Fourth embodiment | Fifth embodiment | Sixth embodiment | Seventh embodiment | Eighth embodiment |
|---|---|---|---|---|---|---|---|---|
| L1 | + | + | + | + | + | + | + | + |
| L2 | − | − | + | − | − | − | + | + |
| L3 | + | + | − | + | + | + | + | + |
| L4 | − | − | − | − | − | − | − | − |
| L5 | + | + | + | + | + | − | + | + |
| L6 | − | − | − | − | − | − | − | − |
| L7 | + | + | + | + | + | + | + | + |
| L8 | − | − | − | − | + | + | + | + |

"+" and "−" in Table 9 represent a positive/negative status of focal power of each lens device. "+" represents that the lens device has positive focal power, and "−" represents that the lens device has negative focal power.

TABLE 10

| Surface orientation | First embodiment | Second embodiment | Third embodiment | Fourth embodiment | Fifth embodiment | Sixth embodiment | Seventh embodiment | Eighth embodiment | At an optical axis |
|---|---|---|---|---|---|---|---|---|---|
| L1 | −∞ | −∞ | −∞ | −∞ | −∞ | −∞ | −∞ | −∞ | |
| L2 | ∞+ | ∞+ | −− | ++ | ++ | ++ | ++ | −+ | |
| L3 | +− | +− | −− | +− | +− | +− | −− | −− | |
| L4 | −+ | −+ | ++ | −+ | −+ | −+ | −− | −+ | |
| L5 | +− | ++ | ++ | ++ | ++ | ++ | ++ | ++ | |
| L6 | −+ | −+ | ++ | −+ | −+ | −+ | −+ | −+ | |
| L7 | +− | +− | +− | −− | +− | +− | +− | +− | |
| L8 | ++ | ++ | ++ | ++ | ++ | ++ | ++ | ++ | |

It should be noted that "−∞", "∞+", "+−", "−+", "++", and "−−" in Table 10 represent a concave/convex status of an object-side surface or an image-side surface in each lens device at the optical axis. "−∞" represents that the object-side surface of the lens device protrudes toward an image side at the optical axis, and the image-side surface is a plane at the optical axis. "∞+" represents that the object-side surface of the lens device is a plane at the optical axis, and the image-side surface protrudes toward an object side at the optical axis. "+−" represents that the object-side surface of the lens device protrudes toward the object side at the optical axis, and the image-side surface protrudes toward the image side at the optical axis. "−+" represents that the object-side surface of the lens device protrudes toward the image side at the optical axis, and the image-side surface protrudes toward the object-side surface at the optical axis. "++" represents that both the object-side surface and the image-side surface of the lens device protrude toward the object side at the optical axis. "−−" represents that both the object-side surface and the image-side surface of the lens device protrude toward the image side at the optical axis.

TABLE 11

| Surface orientation | First embodiment | Second embodiment | Third embodiment | Fourth embodiment | Fifth embodiment | Sixth embodiment | Seventh embodiment | Eighth embodiment | At a circumference |
|---|---|---|---|---|---|---|---|---|---|
| L1 | (– | (– | (– | (– | (– | (– | (– | (– | |
| L2 | –( | –( | )) | (( | (( | (( | (( | )) | |
| L3 | ( ) | ( ) | )) | ( ) | ( ) | ( ) | )) | )) | |
| L4 | )( | )( | )( | )( | )( | )( | )) | )) | |
| L5 | ( ) | (( | (( | (( | (( | (( | (( | (( | |
| L6 | )( | )( | )( | )( | )( | )( | )( | )( | |
| L7 | ( ) | ( ) | ( ) | )) | ( ) | ( ) | ( ) | ( ) | |
| L8 | (( | (( | (( | (( | (( | (( | (( | (( | |

It should be noted that "–(", "(–", ")(", and "( )" in Table 11 represent a concave/convex status of an object-side surface or an image-side surface in each lens device at a circumference. "(–" represents that the object-side surface of the lens device protrudes toward an object side at the circumference, and the image-side surface is a plane at the circumference. "–(" represents that the object-side surface of the lens device is a plane, and the image-side surface protrudes toward the object side at the circumference. ")(" represents that the object-side surface of the lens device protrudes toward an image side at the circumference, and the image-side surface protrudes toward the object side at the circumference. "( )" represents that the object-side surface of the lens device protrudes toward the object side at the circumference, and the image-side surface protrudes toward the object side at the circumference.

In conclusion, main parameters of the optical lens devices 1 in the foregoing eight embodiments of this application meet the following relationships:

In some embodiments, the effective focal length fg1 of the first lens group G1 of the optical lens device 1 and the effective focal length f of the optical lens device 1 meet $0.65<fg1/f<5.6$.

It should be noted that fg1/f is an important parameter of the optical lens device 1. Values of the parameter in the first embodiment to the eighth embodiment are shown in Table 12.

TABLE 12

| | First embodi-ment | Second embodi-ment | Third embodi-ment | Fourth embodi-ment | Fifth embodi-ment | Sixth embodi-ment | Seventh embodi-ment | Eighth embodi-ment |
|---|---|---|---|---|---|---|---|---|
| f | 14.95 | 14.95 | 14.93 | 15.2 | 15.1 | 14.95 | 12.95 | 16 |
| fg1 | 84.39 | 41.23 | 15.97 | 20.65 | 14.63 | 9.72 | 11.52 | 10.88 |
| fg1/f | 5.64 | 2.76 | 1.07 | 1.36 | 0.97 | 0.65 | 0.89 | 0.68 |

A value of the parameter in the eighth embodiment is the smallest, and is 0.68. A value of the parameter in the first embodiment is the largest, and is 5.64.

With reference to the values of the parameter in the first embodiment to the eighth embodiment and corresponding simulation effect diagrams, it may be deduced that when the value of the parameter is excessively large, and the optical lens device 1 meets the long-focus characteristic, a transverse size of the lens 1 L1, namely, the curved prism, in the first lens group G1 along the optical axis becomes larger, and consequently, a transverse size of the optical lens device 1 along the optical axis becomes larger. When the value of the parameter is excessively small, the effective focal length f of the optical lens device 1 becomes smaller, and compensation of the second lens group G2 and the third lens group G3 is insufficient. Therefore, a value of the effective focal length f decreases, and the long-focus characteristic cannot be achieved. The value of the parameter is properly controlled, so that when the value of the parameter meets the foregoing relationship, the effective focal length f of the optical lens device 1 in each of the eight embodiments is approximately 13 mm~16 mm, and the optical lens device 1 has the long-focus characteristic, to conveniently balance the positive focal power of the first lens group G1, the negative focal power of the second lens group G2, and a lens with positive focal power in the third lens group G3, and aberration of the optical lens devices 1 in the eight embodiments is well controlled, thereby effectively improving imaging quality of the optical lens device 1. In this way, imaging quality of the optical lens device 1 is effectively improved while the optical lens device 1 meets the long-focus characteristic, so that both the long-focus characteristic and high imaging quality are taken into account.

In some embodiments, the effective focal length fg1 of the first lens group G1 of the optical lens device 1 and the effective focal length f of the optical lens device 1 meet fg1/f<1. When fg1/f meets the relationship fg1/f<1, for example, in optical lens devices 1 in the fifth embodiment to the eighth implementation, it can be learned from corresponding simulation effect diagrams that the optical lens devices 1 in the fifth embodiment to the eighth implementation have reduced spherical aberration of the optical lens device 1 compared with optical lens devices 1 in the first embodiment to the fourth implementation, so that imaging quality is improved.

In some embodiments, the effective focal length fg2 of the second lens group G2 of the optical lens device 1 and the effective focal length f of the optical lens device 1 meet-3.5<fg2/f<0.

It should be noted that fg2/f is an important parameter of the optical lens device 1. Values of the parameter in the first embodiment to the eighth embodiment are shown in Table 13.

TABLE 13

| | First embodi-ment | Second embodi-ment | Third embodi-ment | Fourth embodi-ment | Fifth embodi-ment | Sixth embodi-ment | Seventh embodi-ment | Eighth embodi-ment |
|---|---|---|---|---|---|---|---|---|
| f | 14.95 | 14.95 | 14.93 | 15.2 | 15.1 | 14.95 | 12.95 | 16 |
| fg2 | −40.82 | −24.64 | −7.58 | −8.84 | −23.05 | −23.28 | −44.98 | −24.88 |
| fg2/f | −2.73 | −1.65 | −0.51 | 058 | −1.53 | −1.56 | −3.47 | −1.56 |

A value of the parameter in the third embodiment is the largest, and is −0.51, and a corresponding total track length TTL of the optical lens device 1 is equal to 23.3 mm. A value of the parameter in the seventh embodiment is the smallest, and is −3.47, and a corresponding total track length TTL of the optical lens device 1 is equal to 26.3 mm.

With reference to the values of the parameter in the first embodiment to the eighth embodiment and corresponding simulation effect diagrams, it may be deduced that when the value of the parameter is excessively small, the effective focal length f of the optical lens device 1 is reduced, and the total track length TTL is excessively large. This is not conducive to the long-focus characteristic and miniaturization design of the optical lens device 1. When the parameter meets the foregoing relationship, the value of the parameter is properly controlled to effectively balance the positive focal power of the first lens group G1 in the optical lens device 1, so that the long-focus characteristic is achieved. In addition, the total track length TTL is prevented from being excessively large because a transverse size of the third lens group G3 in the optical lens device 1 along the optical axis is excessively large. Therefore, the optical lens device 1 can take both the long-focus characteristic and miniaturization design into account.

In some embodiments, a sum f' of effective focal lengths of the third lens of the optical lens device 1 and the fourth lens of the optical lens device 1 and the effective focal length fg2 of the second lens group G2 of the optical lens device 1 meet −1.2<fg2/f'<8.5.

It should be noted that fg2/f is an important parameter of the optical lens device 1. fg2 is the effective focal length of the second lens group G2, namely, the focal length of the lens 4 L4. f' is the sum of the focal length of the third lens and the fourth lens in the third lens group G3, namely, the sum of the focal length f7 of the lens 7 L7 and the focal length f8 of the lens 8 L8, in other words, f'=f7+f8. Values of the parameter in the first embodiment to the eighth embodiment are shown in Table 14.

TABLE 14

| | First embodiment | Second embodiment | Third embodiment | Fourth embodiment | Fifth embodiment | Sixth embodiment | Seventh embodiment | Eighth embodiment |
|---|---|---|---|---|---|---|---|---|
| f | −4.95 | −4.42 | −6.65 | −10.27 | 19.69 | 29.43 | 51.46 | 26.26 |
| fg2 | −40.82 | −24.64 | −7.58 | −8.84 | −23.05 | −23.28 | −44.98 | −24.88 |
| fg2/f' | 8.25 | 5.57 | 1.14 | 0.86 | −1.17 | −0.79 | −0.87 | −0.95 |

It can be learned from Table 14 that a value of the parameter in the fifth embodiment is the smallest, and is −1.17, and a value of the parameter in the first embodiment is the largest, and is 8.25.

With reference to the values of the parameter in the first embodiment to the eighth embodiment and corresponding simulation effect diagrams, it may be deduced that when the parameter meets the foregoing relationship, f' of the optical lens devices 1 in the eight embodiments changes greatly from −10.27 mm in the fourth embodiment to 51.46 mm in the seventh embodiment, in other words, the parameter named the sum f' of the focal length f7 of the lens 7 L7 and the focal length f8 of the lens 8 L8 in the optical lens device 1 slightly affects performance of the optical lens device 1. Therefore, it can be learned that when the parameter meets the foregoing relationship, focal lengths of lenses in the third lens G3 can be adjusted within a relatively large space range, so that focal power of the lens groups can be effectively balanced while the optical lens device 1 minimizes impact on the performance of the optical lens device 1, thereby reducing spherical aberration and improving imaging quality.

In some embodiments, the total track length TTL of the optical lens device 1 and the effective focal length f of the optical lens device 1 meet TTL/f<2.1.

It should be noted that TTL/f is an important parameter of the optical lens device 1. Values of the parameter in the first embodiment to the eighth embodiment are shown in Table 15.

TABLE 15

| | First embodiment | Second embodiment | Third embodiment | Fourth embodiment | Fifth embodiment | Sixth embodiment | Seventh embodiment | Eighth embodiment |
|---|---|---|---|---|---|---|---|---|
| f | 14.95 | 14.95 | 14.93 | 15.2 | 15.1 | 14.95 | 12.95 | 16 |
| TTL | 25.63 | 25.4 | 23.3 | 24.4 | 24.5 | 26.2 | 26.3 | 26.3 |
| TTL/f | 1.71 | 1.70 | 1.56 | 1.61 | 1.74 | 1.75 | 2.03 | 1.64 |

It can be learned from Table 15 that a value of the parameter in the fourth embodiment is the smallest, and is 1.61, and a corresponding total track length TTL is 24.4 mm; and a value of the parameter in the seventh embodiment is the largest, and is 2.03, a corresponding total track length TTL is 26.3 mm, and the effective focal length f of the optical lens device 1 is approximately 13 mm, and is approximately 2 mm less than the effective focal length f, which is approximately 15 mm, of the optical lens device 1 in each of the other embodiments. It may be deduced that when the parameter is excessively large, it means that the total track length TTL of the optical lens device 1 increases, and the effective focal length f decreases relatively. This is not conducive to the long-focus characteristic and miniaturization design of the optical lens device 1. When the parameter meets the foregoing relationship, the optical lens device 1 can effectively take objectives of meeting the long-focus characteristic and miniaturization design into account.

In some embodiments, the entrance pupil diameter EPD of the optical lens device 1 and the effective focal length f of the optical lens device 1 meet F/EPD<2.1.

It should be noted that f/EPD is an important parameter of the optical lens device 1, and is the aperture diaphragm FNO. Values of the parameter in the first embodiment to the eighth embodiment are shown in Table 16.

TABLE 16

| | First embodiment | Second embodiment | Third embodiment | Fourth embodiment | Fifth embodiment | Sixth embodiment | Seventh embodiment | Eighth embodiment |
|---|---|---|---|---|---|---|---|---|
| f | 14.95 | 14.95 | 14.93 | 15.2 | 15.1 | 14.95 | 12.95 | 16 |
| EPD | 7.44 | 7.44 | 7.47 | 7.6 | 7.51 | 7.12 | 6.48 | 8.25 |
| f/EPD | 2.01 | 2.01 | 2.00 | 2.00 | 2.00 | 2.10 | 2.00 | 1.94 |

Note:
The EDP is an aperture diaphragm, in other words, f/EPD = FNO

It can be learned from Table 16 that the parameter is approximately 2 in each of the first embodiment to the eighth embodiment, and is effectively reduced compared with a value 2.8 of a conventional optical lens device 1. A smaller value of the parameter indicates a smaller aperture diaphragm, a larger depth of field, and a clearer background. With reference to the values of the parameter in the first embodiment to the eighth embodiment and corresponding simulation effect diagrams, it may be deduced that when the parameter meets the foregoing relationship, the effective focal length f and the entrance pupil diameter EPD are controlled to be within the foregoing range, so that the optical lens device 1 can increase large luminous flux of an optical system while having the long-focus characteristic, thereby effectively improving imaging quality. In other words, a clear imaging effect can be achieved even if photographing is performed in a relatively dark environment.

In some embodiments, the spacing AT12 between the first lens group G1 of the optical lens device 1 and the second lens group G2 of the optical lens device 1 on the optical axis and the spacing AT23 between the second lens group G2 of the optical lens device 1 and the third lens group G3 of the optical lens device 1 on the optical axis meet 0.1<AT12/AT23<4.76.

It should be noted that AT12/AT23 is an important parameter of the optical lens device 1. Values of the parameter in the first embodiment to the eighth embodiment are shown in Table 17.

TABLE 17

| | First embodiment | Second embodiment | Third embodiment | Fourth embodiment | Fifth embodiment | Sixth embodiment | Seventh embodiment | Eighth embodiment |
|---|---|---|---|---|---|---|---|---|
| AT12/AT23 | 0.21 | 0.69 | 0.28 | 0.68 | 0.12 | 1.63 | 4.76 | 0.19 |

It can be learned from Table 17 that a value of the parameter in the fifth embodiment is the smallest, and is 0.19, and a value of the parameter in the seventh embodiment is the largest, and is 4.76. With reference to the values of the parameter in the first embodiment to the eighth embodiment and corresponding simulation effect diagrams, it may be deduced that performance such as curvature of field and distortion of the optical lens device 1 is degraded regardless of whether the value of the parameter is excessively large or small. When the value of the parameter meets the foregoing relationship, control over aberration of the optical lens device 1 is facilitated, so that imaging quality is improved.

In some embodiments, a sum ct2 of center thicknesses of lenses in the second lens group G2 of the optical lens device 1 and a sum ct3 of center thicknesses of lenses in the third lens group G3 of the optical lens device 1 meet ct2/ct3≤1.3.

It should be noted that ct2/ct3 is an important parameter of the optical lens device 1. Values of the parameter in the first embodiment to the eighth embodiment are shown in Table 18.

TABLE 18

| | First embodiment | Second embodiment | Third embodiment | Fourth embodiment | Fifth embodiment | Sixth embodiment | Seventh embodiment | Eighth embodiment |
|---|---|---|---|---|---|---|---|---|
| ct2 | 1.33 | 1.14 | 0.65 | 0.61 | 0.71 | 1.06 | 4.93 | 2.902 |
| ct3 | 3.9 | 4.836 | 4.836 | 3.675 | 3.677 | 3.563 | 3.852 | 3.017 |
| ct2/ct3 | 0.34 | 0.23 | 0.14 | 0.17 | 0.19 | 0.30 | 1.28 | 0.96 |

It can be learned from Table 18 that a value of the parameter in the third embodiment is the smallest, and is 0.14, and a value of the parameter in the third embodiment is the largest, and is 1.28. With reference to the values of the parameter in the first embodiment to the eighth embodiment and corresponding simulation effect diagrams, it may be deduced that when the value of the parameter increases, control over curvature of field and distortion becomes worse, and therefore, it may be deduced that when the value of the parameter is excessively large, one or more lenses in the optical lens device 1 become thinner, and performance such as curvature of field and distortion is affected. When the value of the parameter of the optical lens device 1 meets the foregoing relationship, control over aberration of the optical lens device 1 is facilitated, so that imaging quality is improved.

In some embodiments, a sum R2 of curvature radiuses of an object-side surface and an image-side surface of the second lens in the third lens group G3 of the optical lens device 1 and a sum R3 of curvature radiuses of an object-side surface and an image-side surface of the third lens in the third lens group G3 of the optical lens device 1 meet $-1.5<R2/R3<12.5$.

It should be noted that R2/R3 is an important parameter of the optical lens device 1. Values of the parameter in the first embodiment to the eighth embodiment are shown in Table 19.

TABLE 19

| | First embodiment | Second embodiment | Third embodiment | Fourth embodiment | Fifth embodiment | Sixth embodiment | Seventh embodiment | Eighth embodiment |
|---|---|---|---|---|---|---|---|---|
| R2 | −3.95 | −4.38 | 59.697 | 29.039 | −4.338 | −12.604 | −9.781 | −8.127 |
| R3 | 5.08 | 5.357 | 4.889 | −24.078 | −2.891 | −1.008 | −8.631 | −10.638 |
| R2/R3 | −0.78 | −0.82 | 12.21 | −1.21 | 1.50 | 12.50 | 1.13 | 0.76 |

It can be learned from Table 19 that a value of the parameter in the fourth embodiment is the smallest, and is −1.12, and a value of the parameter in the third embodiment is the largest, and is 12.21. Control over curvature of field and distortion becomes worse when the value of the parameter increases. With reference to the schematic diagrams of the structures of the optical lens devices 1 in the first embodiment to the eighth embodiment, values of the parameter corresponding to the optical lens devices 1, and corresponding simulation effect diagrams, it may be deduced that when the value of the parameter is excessively small, object-side surfaces or image-side surfaces of a plurality of lenses in the third lens G3 in the optical lens device 1 are approximately planes, in other words, focal lengths of the plurality of lenses are relatively small, and a light convergence or divergence capability is weakened. Consequently, spacings between a plurality of lenses in the optical lens device 1 are reduced, and the plurality of lenses are arranged relatively densely along the optical axis, making it more difficult to design the optical lens device 1.

When the value of the parameter is excessively large, at least one of the plurality of lenses in the third lens G3 in the optical lens device 1 is relatively thin. With reference to the structure of the optical lens device 1 in the third embodiment shown in FIG. 9, the first lens, namely, the lens 5 L5, in the third lens group G3 is relatively thin, and has a relatively large bending degree, and therefore is difficult to process. In addition, a size of a lens closer to the image-side surface in a direction perpendicular to the optical axis is relatively large. This leads to an excessively large overall size of the optical lens device 1 in the direction perpendicular to the optical axis, and is not conducive to miniaturization design of the optical lens device 1. It can be indirectly learned that after light passes through the second lens group G2, a deflection angle of the light passing through the third lens group G3 at a circumference is relatively large, and consequently, the size of the lens close to the image-side surface in the direction perpendicular to the optical axis further increases, and effective light that correspondingly enters the image-side surface decreases. This is not conducive to eliminating aberration.

In conclusion, when the value of the parameter meets the foregoing relationship, a shape and parameters of each lens in the optical lens device 1 are properly designed conveniently, so that the optical lens device 1 has the long-focus characteristic, eliminates aberration, and improves imaging quality, and controls costs.

In the descriptions of this specification, specific features, structures, materials, or characteristics may be properly combined in any one or more embodiments or examples.

Different line types of cross-sectional lines in the accompanying drawings of this application are mainly used to distinguish between different parts, and should not be understood as a limitation on materials of the parts.

Finally, it should be noted that the foregoing embodiments are merely used to describe the technical solutions of this application, but are not intended to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An optical lens device, comprising exactly three lens groups that are arranged from an object side to an image side, wherein the three lens groups comprise a first lens group on the object side, a second lens group between the first lens group and a third lens group, and the third lens group on the image side, wherein the first lens group comprises a prism and at least one lens disposed on an image side of an emergent surface of the prism, the second lens group consists of two spherical lenses which are cemented together, the third lens group consists of four lenses, wherein the first lens group has positive focal power, the second lens group has negative focal power, the third lens group has focal power, the second lens group is configured to move relative to the first lens group in a direction perpendicular to an optical axis, and an effective focal length fg1 of the first lens group and an effective focal length f of the optical lens device meet $0.65<fg1/f<5.6$; and wherein in the four lenses of the third lens group, in a direction from the object side to the image side, both the first lens and the fourth lens have focal power, the second lens has negative focal power, and the third lens has positive focal power.

2. The optical lens device according to claim 1, wherein the effective focal length fg1 of the first lens group and the effective focal length f of the optical lens device meet $0.65<fg1/f<1$.

3. The optical lens device according to claim 1, wherein an effective focal length fg2 of the second lens group and the effective focal length f of the optical lens device meet $-3.5<fg2/f<0$.

4. The optical lens device according to claim 1, wherein a total track length (TTL) of the optical lens device and the effective focal length f of the optical lens device meet $TTL/f<2.1$.

5. The optical lens device according to claim 1, wherein an entrance pupil diameter (EPD) of the optical lens device and the effective focal length f of the optical lens device meet $f/EPD\leq 2.1$.

6. The optical lens device according to claim 1, wherein a spacing AT12 between the first lens group and the second lens group on the optical axis and a spacing AT23 between the second lens group and the third lens group on the optical axis meet $0.1<AT12/AT23<4.76$.

7. The optical lens device according to claim 1, wherein a sum ct2 of center thicknesses of lenses in the second lens group and a sum ct3 of center thicknesses of lenses in the third lens group meet $ct2/ct3\leq 1.3$.

8. The optical lens device according to claim 7, wherein the prism of the first lens group comprises a curved prism, the curved prism comprises an incident surface, the emergent surface, and a reflective surface, an included angle between the reflective surface and the emergent surface is an acute angle, the incident surface is connected between the reflective surface and the emergent surface, and the incident surface is a convex surface, and/or the incident surface is an aspherical surface.

9. The optical lens device according to claim 1, wherein a sum f' of effective focal lengths of the third lens and the fourth lens and an effective focal length fg2 of the second lens group meet $-1.2<fg2/f'<8.5$; and/or a sum R2 of curvature radiuses of an object-side surface and an image-side surface of the second lens and a sum R3 of curvature radiuses of an object-side surface and an image-side surface of the third lens meet $-1.5<R2/R3<12.5$.

10. The optical lens device according to claim 9, wherein the prism of the first lens group comprises a curved prism, the curved prism comprises an incident surface, the emergent surface, and a reflective surface, an included angle between the reflective surface and the emergent surface is an acute angle, the incident surface is connected between the reflective surface and the emergent surface, and the incident surface is a convex surface, and/or the incident surface is an aspherical surface.

11. The optical lens device according to claim 10, wherein the prism is a glass prism, and a lens closest to the prism in the at least one lens is a spherical lens.

12. The optical lens device according to claim 1, wherein the prism of the first lens group comprises a curved prism, the curved prism comprises an incident surface, the emergent surface, and a reflective surface, an included angle between the reflective surface and the emergent surface is an acute angle, the incident surface is connected between the reflective surface and the emergent surface, and the incident surface is a convex surface, and/or the incident surface is an aspherical surface.

13. The optical lens device according to claim 12, wherein the prism is a glass prism, and a lens closest to the prism in the at least one lens is a spherical lens.

14. The optical lens device according to claim 1, wherein the two spherical lenses of the second lens group are glass lenses.

15. A camera module, comprising a photosensitive element and an optical lens device, the photosensitive element is disposed on an image side of the optical lens device, wherein the optical lens device comprises exactly three lens groups that are arranged from an object side to the image side, wherein the three lens groups comprise a first lens group on the object side, a second lens group between the first lens group and a third lens group, and the third lens group on the image side, wherein the first lens group comprises a prism and at least one lens disposed on an image side of an emergent surface of the prism, the second lens group consists of two spherical lenses which are cemented together, and the third lens group consists of four lenses, wherein the first lens group has positive focal power, the second lens group has negative focal power, the third lens group has focal power, the second lens group is configured to move relative to the first lens group in a direction perpendicular to an optical axis, and an effective focal length fg1 of the first lens group and an effective focal length f of the optical lens device meet $0.65<fg1/f<5.6$; and wherein in the four lenses of the third lens group, in a direction from the object side to the image side, both the first lens and the fourth lens have focal power, the second lens has negative focal power, and the third lens has positive focal power.

16. An electronic device, comprising a housing and the camera module according to claim 15, wherein the camera module is mounted on the housing.

17. The camera module according to claim 15, wherein a sum ct2 of center thicknesses of lenses in the second lens group and a sum ct3 of center thicknesses of lenses in the third lens group meet $ct2/ct3 \leq 1.3$.

18. The camera module according to claim 15, wherein the prism of the first lens group comprises a curved prism, the curved prism comprises an incident surface, the emergent surface, and a reflective surface, an included angle between the reflective surface and the emergent surface is an acute angle, the incident surface is connected between the reflective surface and the emergent surface, and the incident surface is a convex surface, and/or the incident surface is an aspherical surface.

19. The camera module according to claim 18, wherein the lens closest to the prism in the at least one lens is a spherical lens, and a surface of the spherical lens that faces the image side is a concave surface.

20. The camera module according to claim 18, wherein the two spherical lenses of the second lens group are glass lenses.

* * * * *